(12) United States Patent
Heffner et al.

(10) Patent No.: US 7,991,300 B2
(45) Date of Patent: *Aug. 2, 2011

(54) OPTICAL RECEIVER HAVING BANDWIDTH CONTROL FOR INTERSYMBOL INTERFERENCE COMPENSATION

(75) Inventors: Brian L. Heffner, Los Altos, CA (US); Christian Malouin, San Jose, CA (US); Theodore J. Schmidt, Gilroy, CA (US)

(73) Assignee: Opnext Subsystems, Inc., Los Gatos, CA (US)

( * ) Notice: Subject to any disclaimer, the term of this patent is extended or adjusted under 35 U.S.C. 154(b) by 687 days.

This patent is subject to a terminal disclaimer.

(21) Appl. No.: 11/935,345

(22) Filed: Nov. 5, 2007

(65) Prior Publication Data

US 2009/0116851 A1 May 7, 2009

(51) Int. Cl.
*H04B 10/06* (2006.01)
(52) U.S. Cl. ........ 398/202; 398/188; 398/208; 398/209; 398/213
(58) Field of Classification Search .......... 398/202, 398/206, 297, 208, 209, 210, 213, 214, 203, 398/204, 205, 188, 183, 102
See application file for complete search history.

(56) References Cited

U.S. PATENT DOCUMENTS

| | | | |
|---|---|---|---|
| 6,587,204 B2 | 7/2003 | Hsieh | |
| 6,867,852 B2 | 3/2005 | Hunsche | |
| 6,911,645 B2 | 6/2005 | Beger et al. | |
| 7,233,430 B2 | 6/2007 | Caplan | |
| 7,266,311 B2 | 9/2007 | Haunstein et al. | |
| 7,324,713 B2 | 1/2008 | Jang et al. | |
| 7,411,725 B2 | 8/2008 | Suzuki et al. | |
| 7,460,793 B2 | 12/2008 | Taylor | |
| 7,477,848 B2 * | 1/2009 | Ooi et al. | 398/147 |
| 7,477,852 B2 * | 1/2009 | Agarwal et al. | 398/210 |
| 7,526,210 B2 | 4/2009 | Liu | |
| 7,606,504 B2 | 10/2009 | Onaka et al. | |
| 7,609,982 B2 | 10/2009 | Ikeuchi | |
| 7,613,403 B2 | 11/2009 | Hironishi et al. | |

(Continued)

FOREIGN PATENT DOCUMENTS

EP 1 686 709 8/2006

OTHER PUBLICATIONS

International Preliminary Report on Patentability dated Sep. 15, 2009 for International Application No. PCT/US2008/057157, filed Mar. 14, 2008 (6 pages).

(Continued)

*Primary Examiner* — Hanh Phan
(74) *Attorney, Agent, or Firm* — Fish & Richardson P.C.

(57) ABSTRACT

Apparatus and techniques for receiving and processing an optical signal. In one implementation, an optical receiver is provided to include a delay line interferometer, an etalon, and a data estimator for estimating the data carried on a differentially modulated optical input signal. The delay line interferometer receives the input signal and issues differentially decoded constructive and destructive signals. The etalon filters the constructive signal with a transmission stopband imposed over the passband of the constructive signal. The bandwidth of the etalon stopband is selected based on the bandwidth of the modulation of the input signal in order to maximize received signal quality. The data estimator uses a difference between signals derived from the filtered constructive signal and the destructive signal for estimating data.

25 Claims, 32 Drawing Sheets

U.S. PATENT DOCUMENTS

| | | | |
|---|---|---|---|
| 7,679,755 | B1 | 3/2010 | Tischhauser et al. |
| 2002/0180981 | A1 | 12/2002 | Ducellier et al. |
| 2003/0016901 | A1 | 1/2003 | Cormack |
| 2004/0131109 | A1 | 7/2004 | Kim et al. |
| 2004/0258423 | A1 | 12/2004 | Winzer |
| 2005/0135518 | A1 | 6/2005 | Vallet et al. |
| 2006/0115029 | A1 | 6/2006 | Marrow |
| 2006/0274320 | A1 | 12/2006 | Caplan |
| 2007/0196110 | A1 | 8/2007 | Mikkelsen et al. |
| 2008/0002987 | A1 | 1/2008 | Tian et al. |
| 2008/0225380 | A1 | 9/2008 | Heffner et al. |
| 2008/0225381 | A1 | 9/2008 | Heffner et al. |
| 2008/0226306 | A1* | 9/2008 | Heffner et al. ............... 398/202 |
| 2008/0231941 | A1 | 9/2008 | Malouin et al. |
| 2008/0232821 | A1 | 9/2008 | Malouin et al. |
| 2010/0111540 | A1* | 5/2010 | Caplan et al. ............... 398/140 |

OTHER PUBLICATIONS

Betti, S., et al., "A Novel Multilevel Coherent Optical System: 4-Quadrature Signaling," *Journal of Lightwave Technology*, 9(4):514-523, Apr. 1991.

Derr, F., "Coherent Optical QPSK Intradyne System: Concept and Digital Receiver Realization," *Journal of Lightwave Technology*, 10(9):1290-1296, Sep. 1992.

Kahn, J.M., et al., "Heterodyne Detection of 310-Mb/s Quadriphase-Shift Keying Using Fourth-Power Optical Phase-Locked Loop," *IEEE Photonics Technology Letters*, 4(12):1397-1400, Dec. 1992.

Yoshikane, N., et al., "Benefit of Half-Bit Delay Demodulation for Severely Bandlimited RZ-DPSK Signal," *Proceedings ECOC-IOOC 2003 Conference*, vol. 3, pp. 522-523, Sep. 2003.

International Search Report and Written Opinion dated Aug. 18, 2008 for International Application No. PCT/US2008/057157, filed Mar. 14, 2008 (8 pages).

Mikkelsen, B. Rasmussen, C. Mamyshev, P. Liu, F. "Partial DPSK with excellent filter tolerance and OSNR sensitivity"; Electronics Letters, Nov. 9, 2006, vol. 42, Issue 23; pp. 1363-1364.

Xiang Liu Gnauck, A.H. Xing Wei Hsieh, J. Ai, C. Chien, V. "Athermal optical demodulator for OC-768 DPSK and RZ-DPSK signals" Photonics Technology Letters, IEEE, Dec. 2005, vol. 17, Issue 12, pp. 2610-2612.

Hsieh, J.Y.C. Ai, C. Chien, V. Liu, X. Gnauck, A.H. Wei, X. "Athermal demodulator for 42.7-Gb/s DPSK signals", Optical Communication, 2005 ECOC 2005 $31^{st}$ European Conference on, Sep. 2005; vol. 4, pp. 827-828.

Agarwal, A.; Chandrasekhar, S.; Winzer, P.J.; "Experimental study of photocurrent imbalance in a 42.7-Gb/s DPSK receiver under strong optical filtering"; Optical Fiber Communication Conference, 2005. Technical Digest. OFC/NFOEC, vol. 5, Iss , 6-11 Mar. 2005 3pp.

Malouin, C.; Bennike, J.; Schmidt, T.; DPSK Receiver Design—Optical Filtering Considerations; Optical Fiber Communication Conference, 2007. OFC/NFOEC.

Dingel B. B. et al.: "Multifunction Optical Filter with a Michelson-Gires-Tournois Interferometer for Wavelength-Division-Multiplexed Network System Applications" Optics Letters, US, Optical Society of America, Washington, vol. 23, No. 14, Jul. 15, 1998, pp. 1099-1101.

Domash, L., "Tunable Thin Film Filters Using Thermo-Optic Silicon"; Optical Society of America Conference, 2004.

Office Action in U.S. Appl. No. 11/807,840 mailed Oct. 8, 2010, 14 pages.

* cited by examiner

GT DECODER TRANSFER FUNCTION

FREE SPECTRAL RANGE TRANSFER FUNCTION
STANDARD DELAY LINE INTERFEROMETER
(prior art)

OPTICAL RECEIVER HAVING BANDWIDTH CONTROL FOR INTERSYMBOL INTERFERENCE COMPENSATION

TECHNICAL FIELD

This specification relates to apparatus and methods for adjusting constructive and destructive transfer functions of a differentially encoded phase shift keyed receiver for reducing inter-symbol interference in optical systems.

BACKGROUND

For an optical system with filters, the effective concatenated bandwidth of the filters induces intersymbol interference (ISI). The ISI causes distortion of the signal and reduces the decision quality (the ability to accurately detect if a bit is a logical "1" or "0") at a receiver. This decision quality may be quantified by counting the number of error bits and dividing it by the total number of transmitted bits. The resulting ratio is called bit error ratio (BER). Another way of discussing the quality of the signal at the receiver involves translating the BER to a parameter called Q using the equation $Q=20 \log [\sqrt{2} \mathrm{erfc}^{-1}(2\,\mathrm{BER})]$ where $\mathrm{erfc}^{-1}$ is the inverse complementary error function. The distortion effect of ISI on signal quality may be viewed in a general way in a baseband eye diagram of the modulated signal where ISI causes the space between "1" and "0" symbol levels to be partially filled by the trailing and leading edges of the symbols.

Optical signals commonly use binary phase shift keyed (BPSK) modulation where a carrier is modulated for data bits for logical "0" and "1" with phase shifts of 0 and $\pi$ radians. The logical "0" or "1" is decoded at the receiver by determining whether the detected signal is to the left or right of a vertical imaginary axis of a signal vector diagram, sometimes called an IQ diagram. A detector viewed as a polar detector determines whether the absolute value of the received phase is greater than $\pi/2$ for "0" and less than $\pi/2$ for "1". A detector viewed as a rectangular detector determines whether the cosine of the phase of the signal is negative or positive for "0" or "1".

The BPSK optical signals may use a differentially-encoded phase shift keyed (DeBPSK, or DPSK) modulation format. The DPSK modulation format encodes input data as the difference between two consecutive transmitted symbols. The input data is differentially pre-coded using the preceding symbol as a reference with an electrical "delay+add" function so that an input data bit of logical "0" or "1" is encoded as a change of carrier phase of 0 or $\pi$ radians relative to the preceding bit. At the detector the process is reversed by comparing a current bit to the preceding bit.

The DPSK decoding function may be performed using a delay line interferometer (DLI) and a balanced detector. The interferometer works on the principle that two waves that coincide with the same phase will add to each other while two waves that have opposite phases will tend to cancel each other. The interferometer has an input port for receiving the optical signal and two output ports—a constructive output port for issuing the waves that add and a destructive output for issuing the waves that tend to cancel.

The delay line interferometer (DLI) for DPSK signals has an additional element of an internal delay difference between the two waves that is about equal to the symbol time T of the DPSK modulation. The constructive output port issues a signal $Ec=E(t)+E(t-T)$ and the destructive output port issues a signal $Ed=E(t)-E(t-T)$. The effect of the time T is to reverse the signals at the two output ports so that the waves add at the destructive output port and cancel at the constructive output port when consecutive bits differ by $\pi$ radians. The difference between Ec and Ed can be detected with a direct detection intensity receiver to determine when there is a change in phase in the signal between two consecutive bits and thereby estimate the logical bits carried by the DPSK modulation.

It is an effect of this delay difference to impose a transfer function having a sinusoidal amplitude response (in the frequency domain) from the input port to each output port. The spectral period of a cycle of the transfer function, equal to 1/T, is termed the free spectral range (FSR). The sinusoidal width proportional to the FSR effectively limits the frequency band of the signals that can be passed from the DLI input to the constructive and destructive outputs. The phase of the frequency domain cycle of the transfer function is termed the FSR phase.

SUMMARY

This application includes apparatus and techniques for receiving and processing an optical signal. Optical receivers can be constructed based on the described apparatus and techniques to mitigate intersymbol interference (ISI) in a differentially-encoded modulation transmission system by controlling constructive and destructive transfer functions.

In one example, an optical receiver is configured to estimate data carried by a modulated optical input signal through a communication system having carrier frequencies separated by a channel spacing, comprising: a delay line interferometer (DLI) having a DLI free spectral range about equal to the channel spacing to provide periodic transmission passbands at the carrier frequencies for issuing a differentially decoded constructive interference signal; an etalon having an etalon free spectral range about equal to the channel spacing to provide periodic transmission stopbands at the carrier frequencies to filter the constructive interference signal; and a data estimator configured to use the filtered constructive interference signal to estimate the data.

In another example, an optical receiver is configured to estimate data carried by a modulated optical input signal through a communication system, comprising: a delay line interferometer (DLI) configured to receive the input signal and issue a differentially decoded constructive interference signal having a transmission passband at a carrier frequency of the input signal; an optical filter having a transmission stopband at the carrier frequency to filter the constructive interference signal; and a data estimator configured to use the filtered constructive interference signal to estimate the data.

In another example, a method for estimating data carried by a modulated optical input signal through a communication system having carrier frequencies separated by a channel spacing is provided to include: differentially decoding the input signal with a free spectral range about equal to the channel spacing and using optical interference to provide periodic transmission passbands at the carrier frequencies for issuing a differentially decoded constructive interference signal; filtering the constructive interference signal with a free spectral range about equal to the channel spacing for providing periodic stopbands at the carrier frequencies; and using the filtered constructive interference signal for estimating the data.

In another example, a method for estimating data carried by a modulated optical input signal through a communication system is provided to include: differentially decoding and using optical interference on the input signal for issuing a differentially decoded constructive interference signal having a transmission passband at a carrier frequency of the input signal; optically filtering the constructive interference signal with a transmission stopband at the carrier frequency; and using the filtered constructive interference signal for estimating the data.

In yet another example, an optical receiver for receiving an optical transmission signal in optical communications includes an optical delay interferometer which includes an optical splitter to split the received optical transmission signal into a first optical signal and a second optical signal, a first optical path to receive the first optical signal, a second optical path to receive the second optical signal, an optical coupler that combines the first and second optical paths to cause optical interference between the first and second optical path to produce an optically constructive interference signal and an optically destructive interference signal, a constructive output port that receives the optically constructive interference signal, a destructive output port that receives the optically destructive interference signal, and a mechanism to control a relative phase delay between the first and second optical paths to make the optically constructive interference signal have a transmission passband at a carrier frequency of said optical transmission signal. An optical filter is located in one of the first and second optical paths to filter light and configured to have a transmission stopband at the carrier frequency. The optical receiver also includes a first optical detector to convert the optically constructive signal into a first electrical detector output, a second optical detector to convert the optically destructive signal into a second electrical detector output; and an electrical signal combiner in communication with the first and second optical detectors to receive the first and second electrical detector outputs and to produce a difference between the first and second electrical detector outputs as an electrical signal that carries data carried in the optical transmission signal.

These and other examples and implementations of the apparatus and techniques are described in detail in the accompanying drawings, the detailed description and the claims.

BRIEF DESCRIPTIONS OF THE DRAWINGS

Figure 6A:
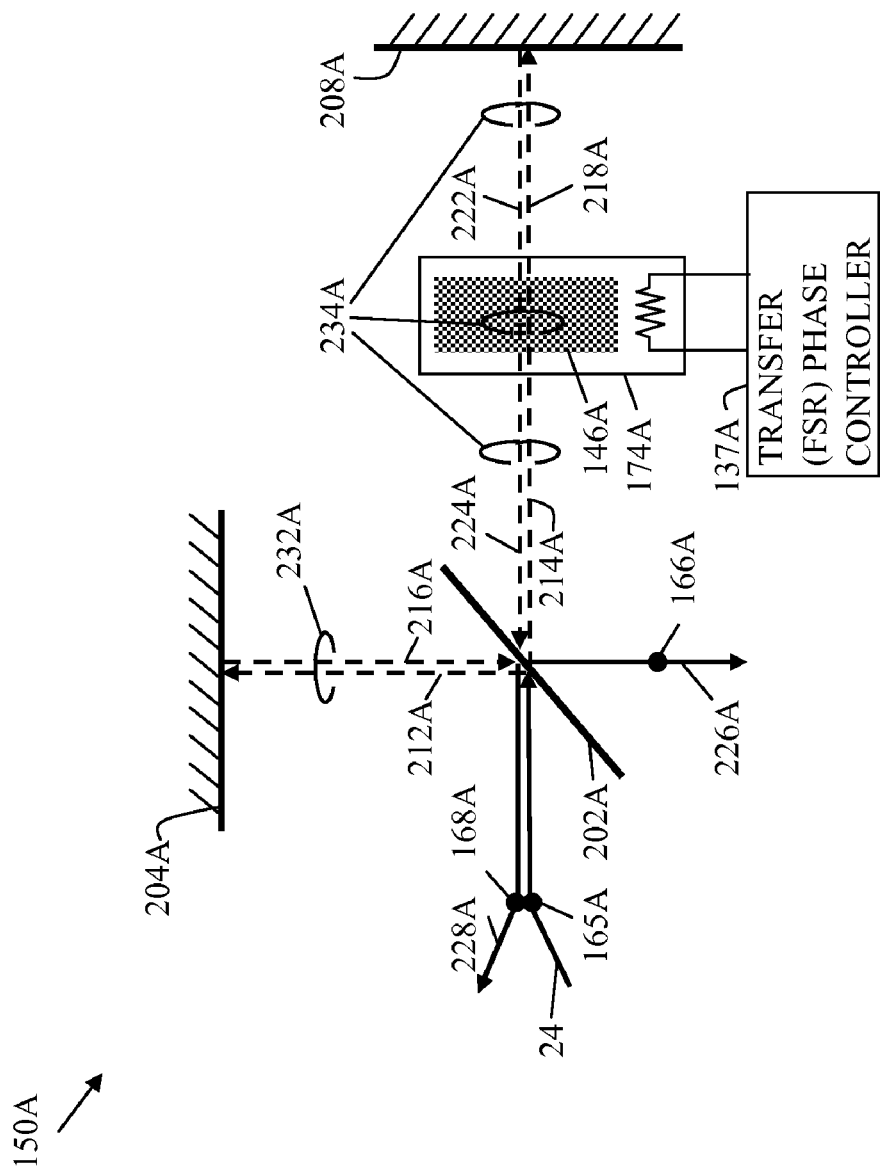
FIGS. 6A, 6B and 6C illustrate delay line interferometers (DLI)s for the receiver of FIG. 5.
Figure 6B:
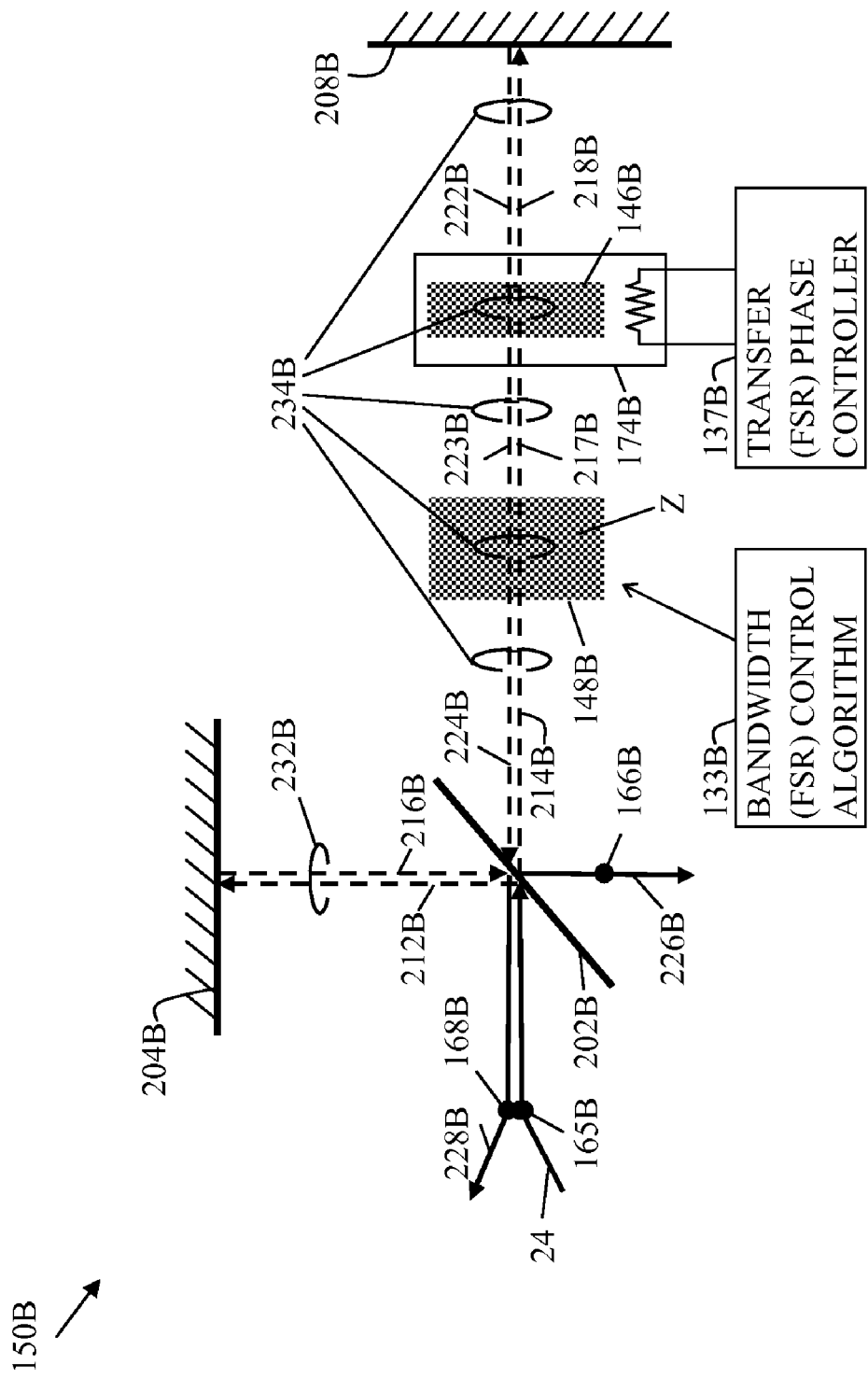
Figure 6C:
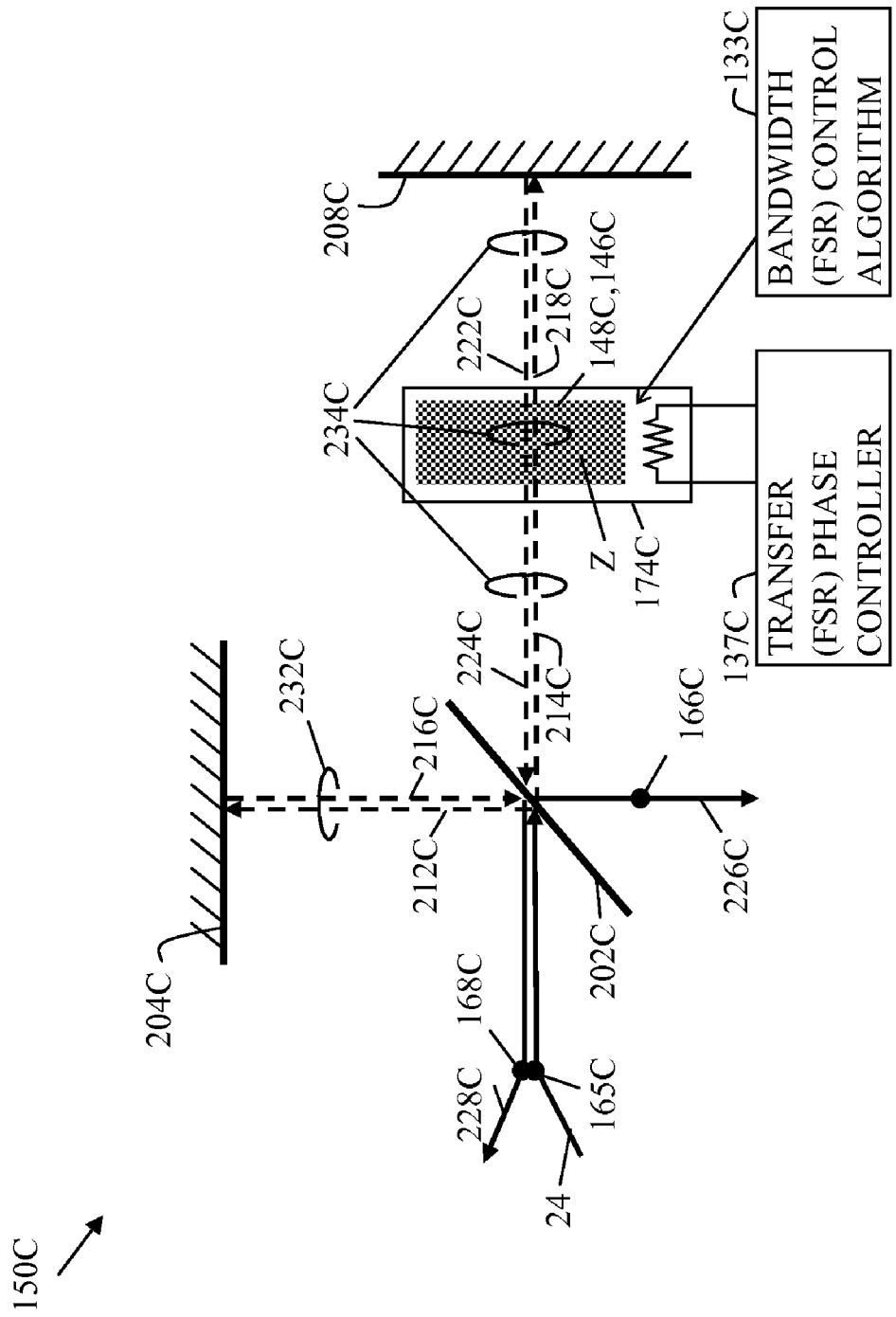
Figure 6D:
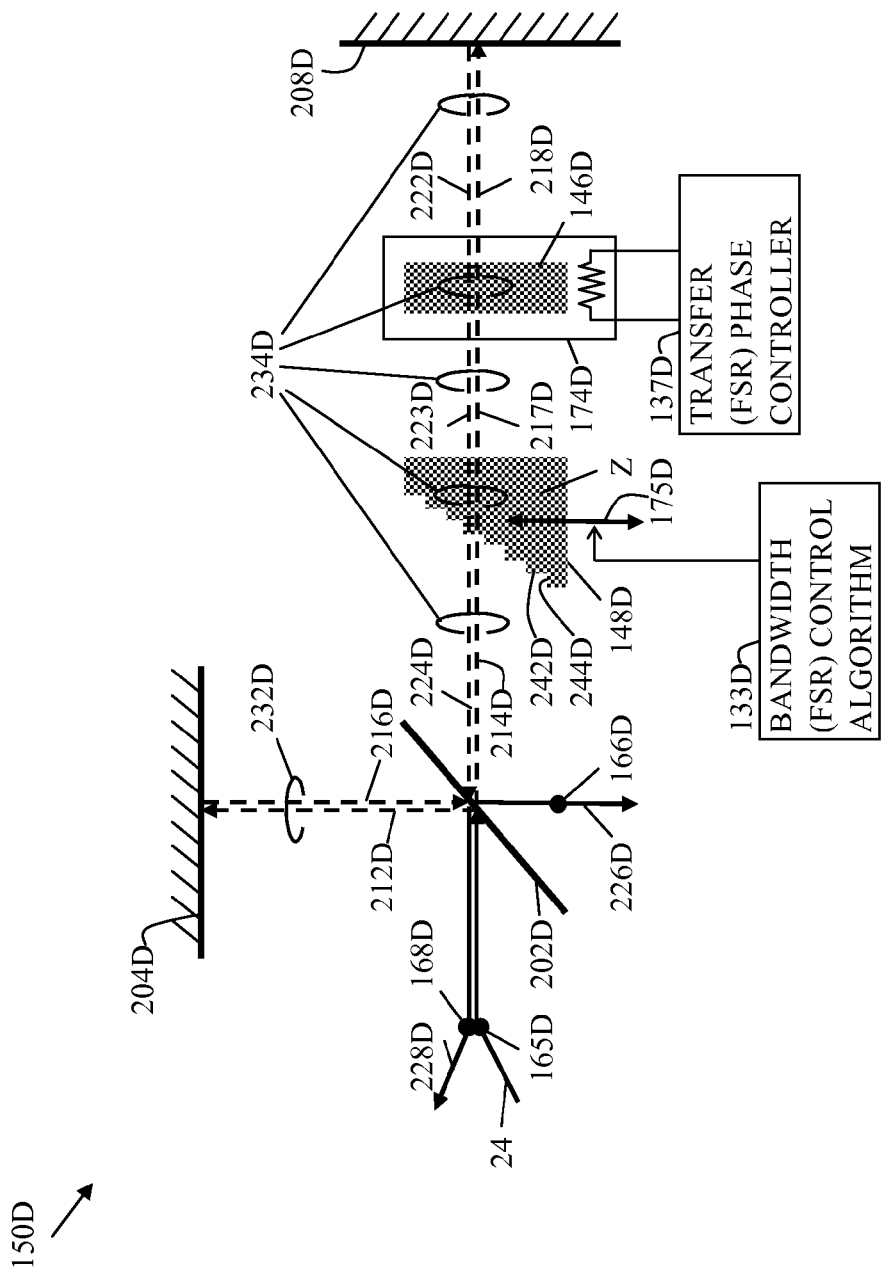
FIG. 6D illustrates a DLI for the receiver of FIG. 5 having a stepped gradient of free spectral ranges.
Figure 6E:
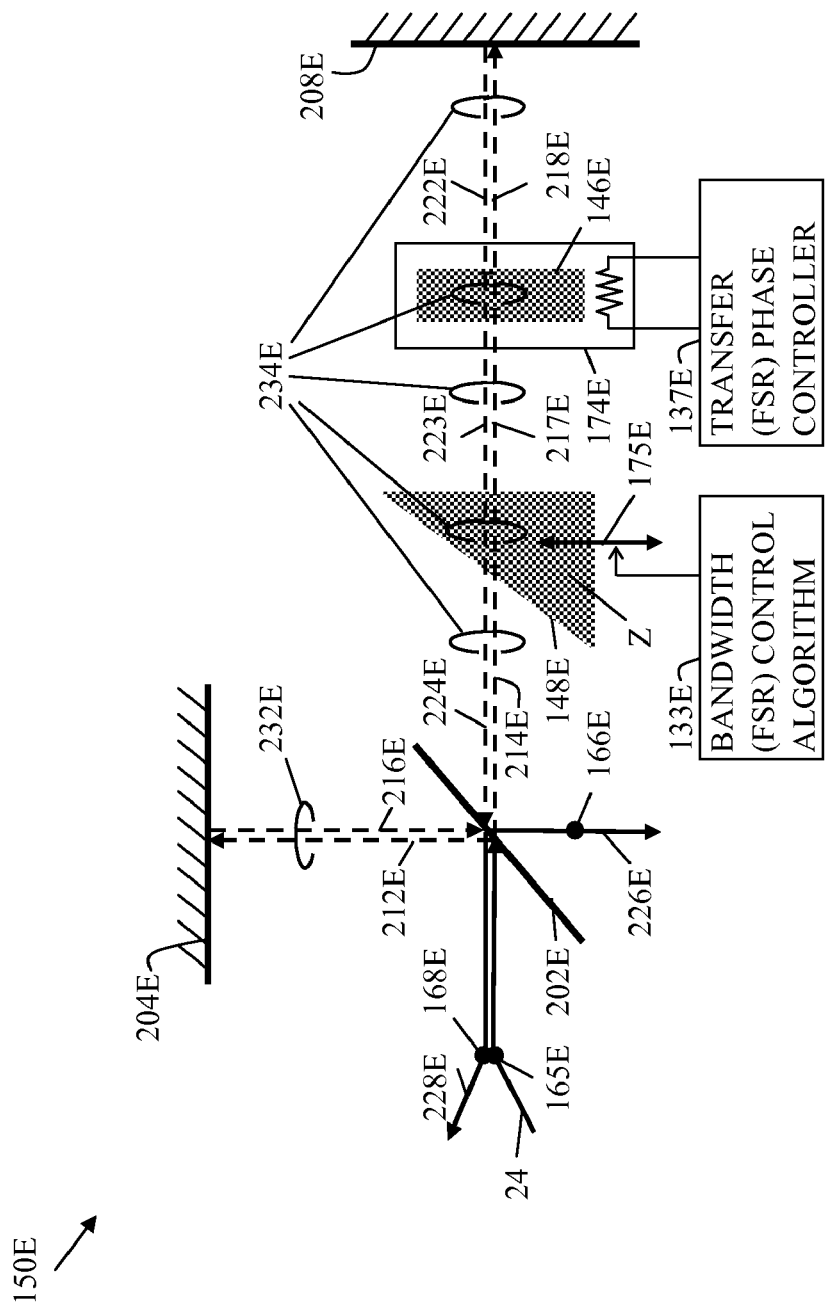
FIG. 6E illustrates a DLI for the receiver of FIG. 5 having a smooth gradient of free spectral ranges.
Figure 6F:
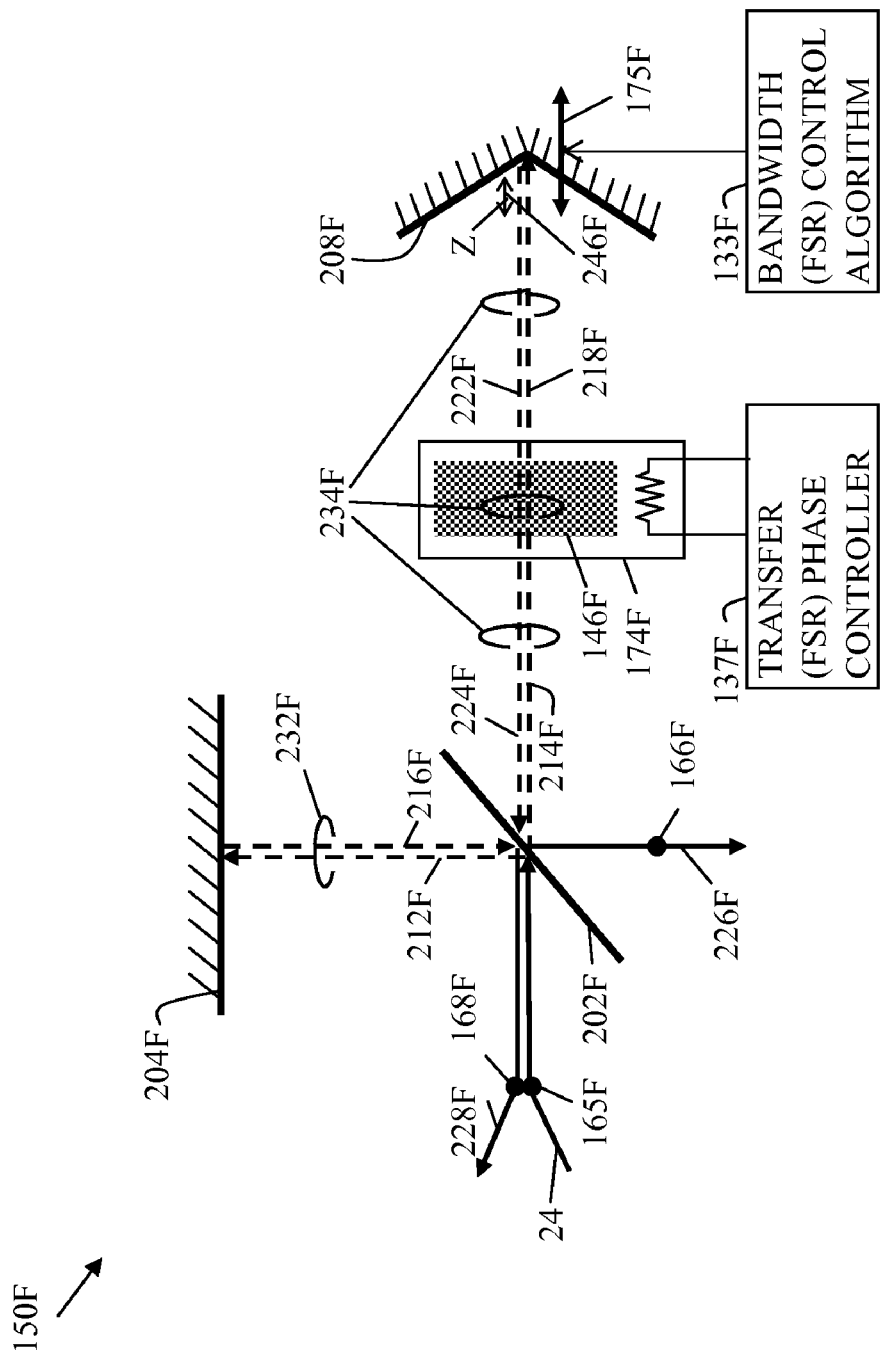
FIG. 6F illustrates a DLI for the receiver of FIG. 5 having a movable mirror for selecting a free spectral range.
Figure 6H:
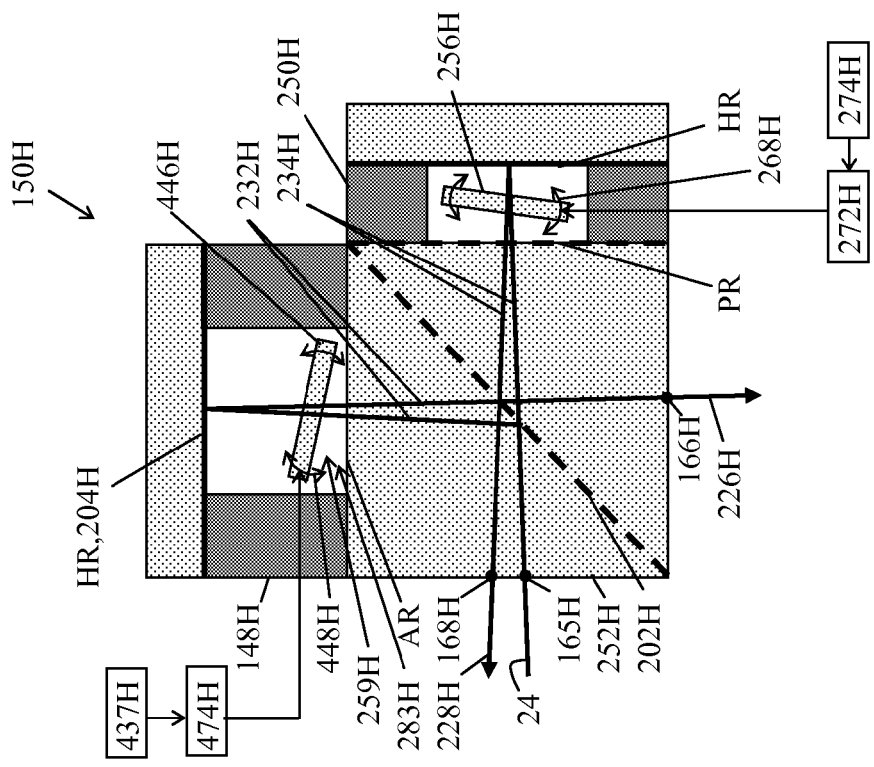
FIGS. 6G and 6H illustrate examples of first and second GT decoders that can be used for the delay line interferometer of FIG. 5.
Figure 6G:
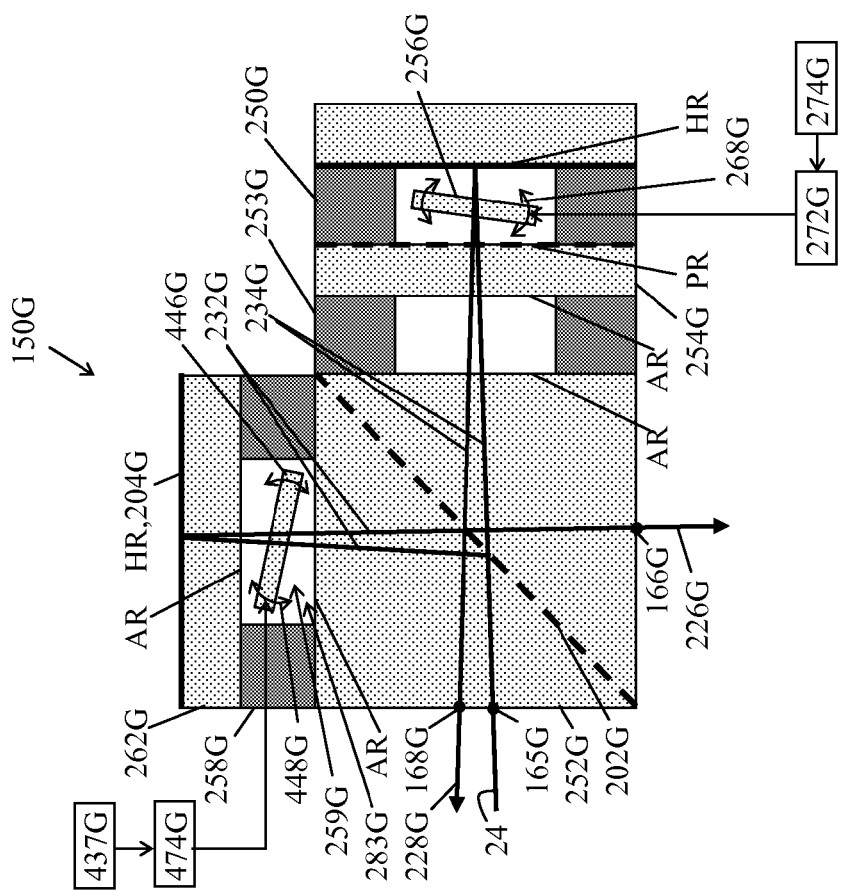
Figure 12:
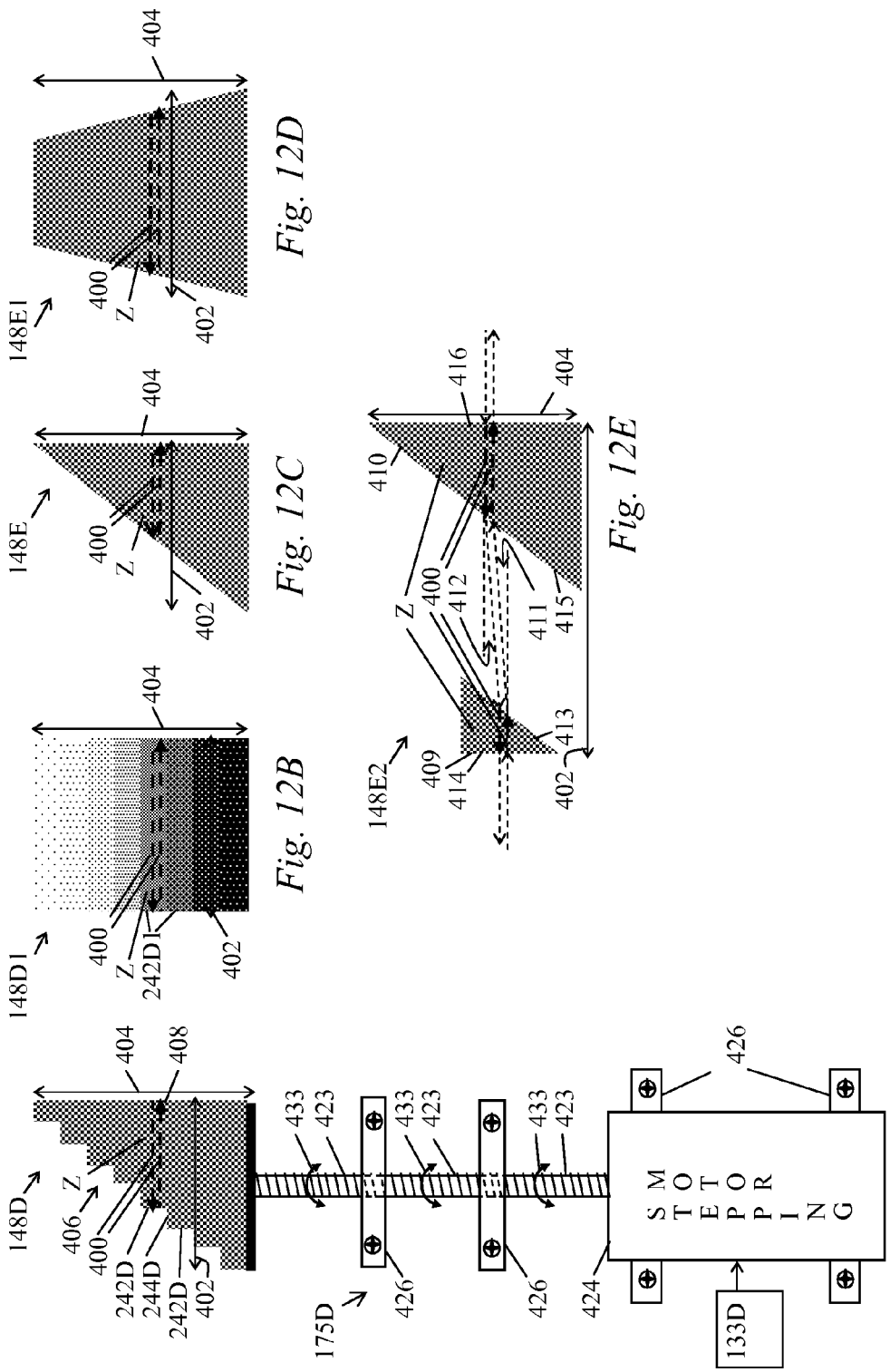
Figure 13:
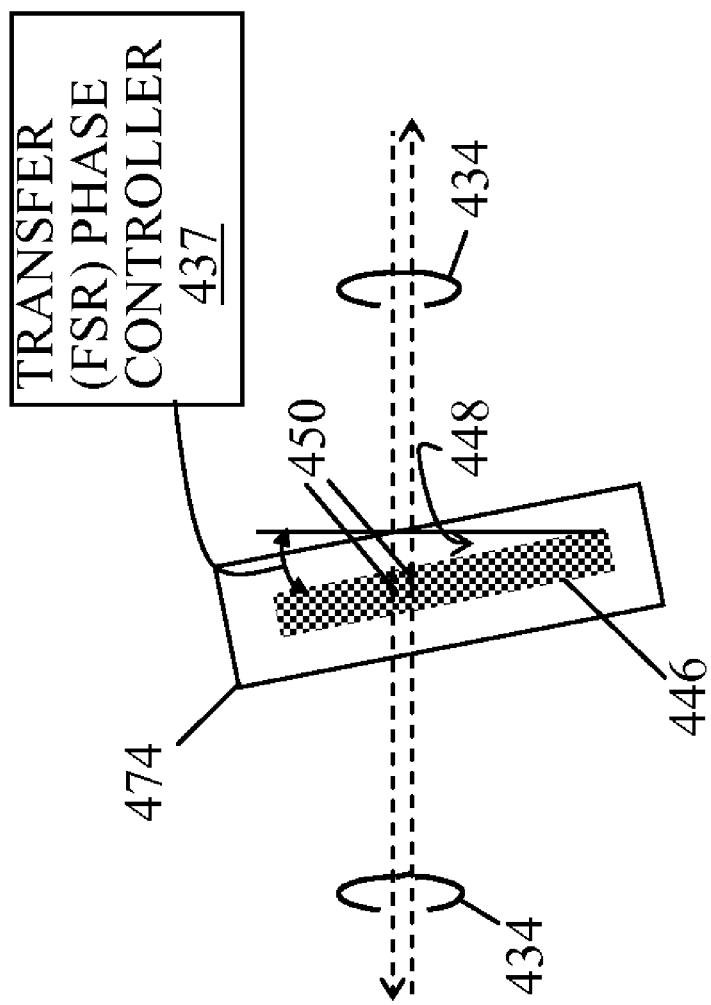
Figure 14:
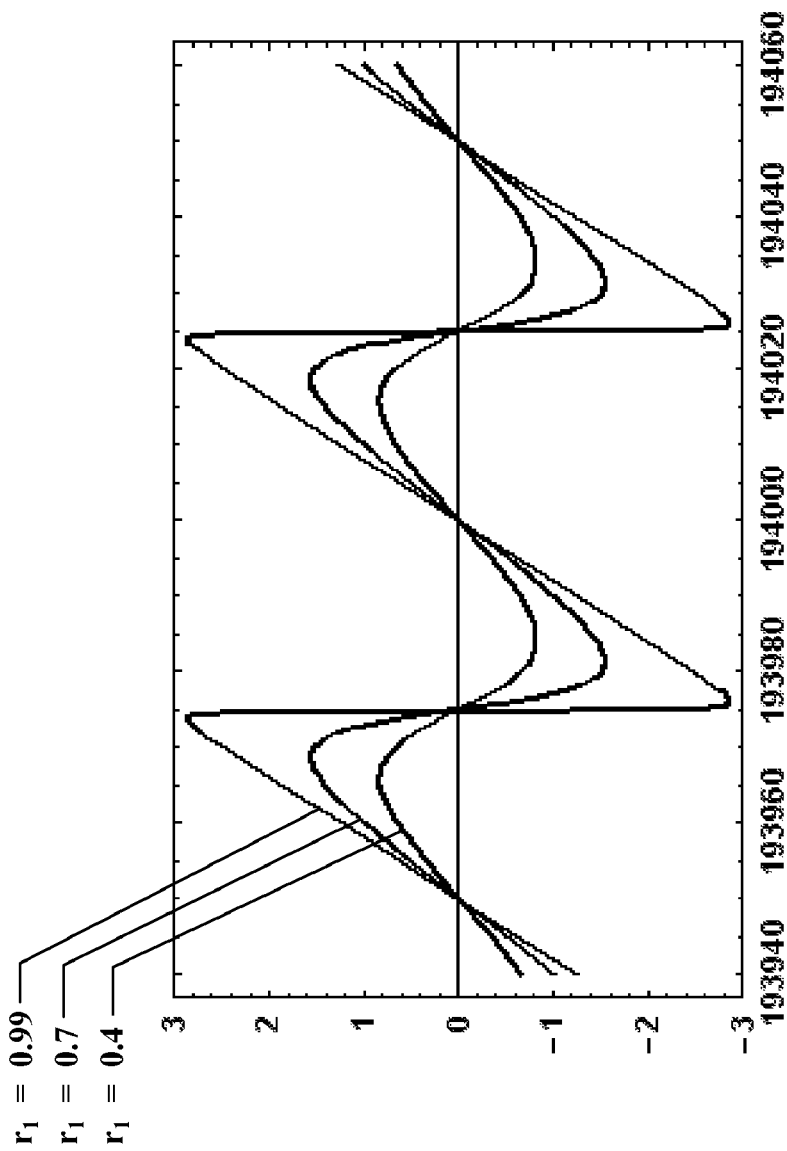
Figure 15:
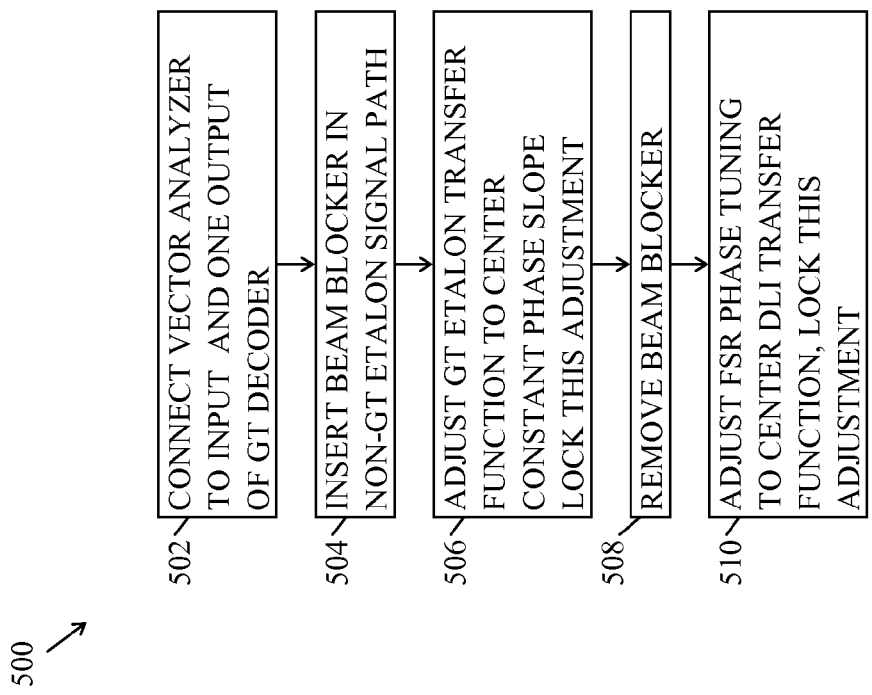
Figure 16B:
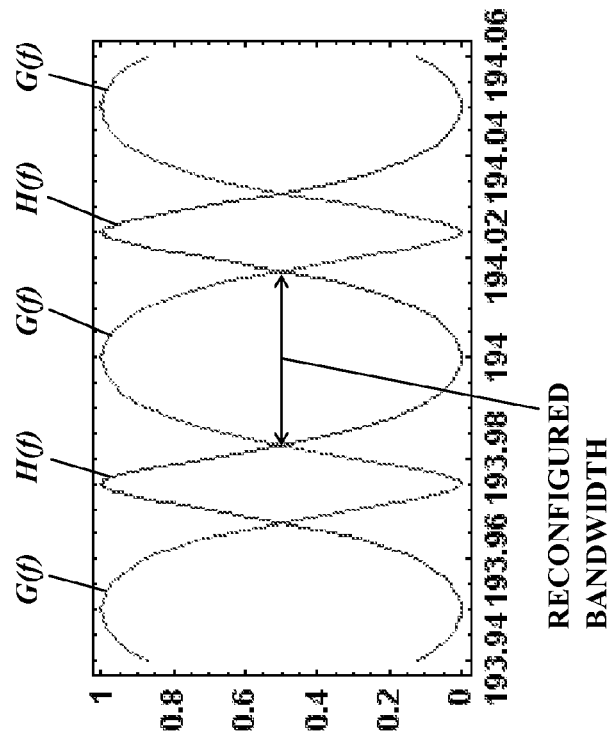
Figure 16A:
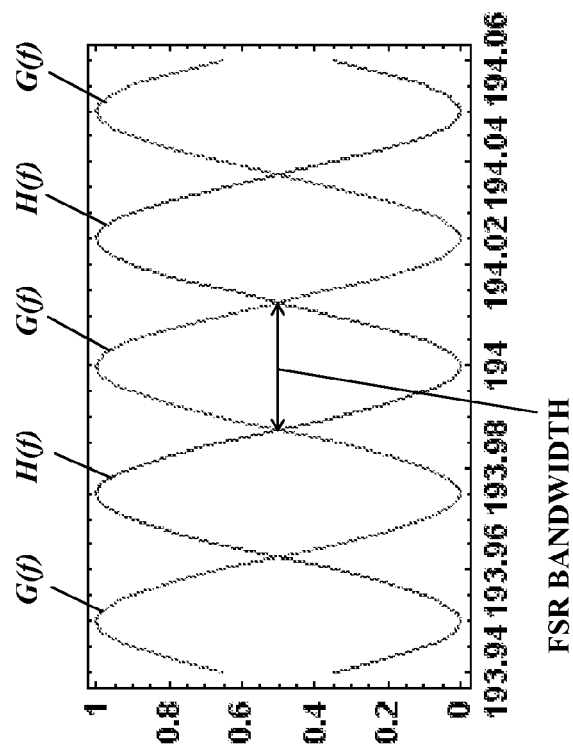

FIGS. 12A-B illustrate examples of stepped gradient FSR delay elements for the DLI of FIG. 6D;

FIGS. 12C-E illustrate examples of smooth gradient FSR delay elements for the DLI of FIG. 6E;

FIG. 13 illustrates a transfer (FSR) phase element using tilt for adjusting FSR phase for the DLIs of FIGS. 6A-G;

FIG. 14 is a chart of periodic phase responses for etalon filters in the GT decoders of FIGS. 6G and 6H;

FIG. 15 is a flow chart of a method for tuning the GT decoders of FIGS. 6G and 6H;

FIG. 16A is chart of a transfer function for a standard delay line interferometer; and FIG. 16B is a chart of a reconfigured transfer function for the GT decoders of FIGS. 6G and 6H.

Figure 3:
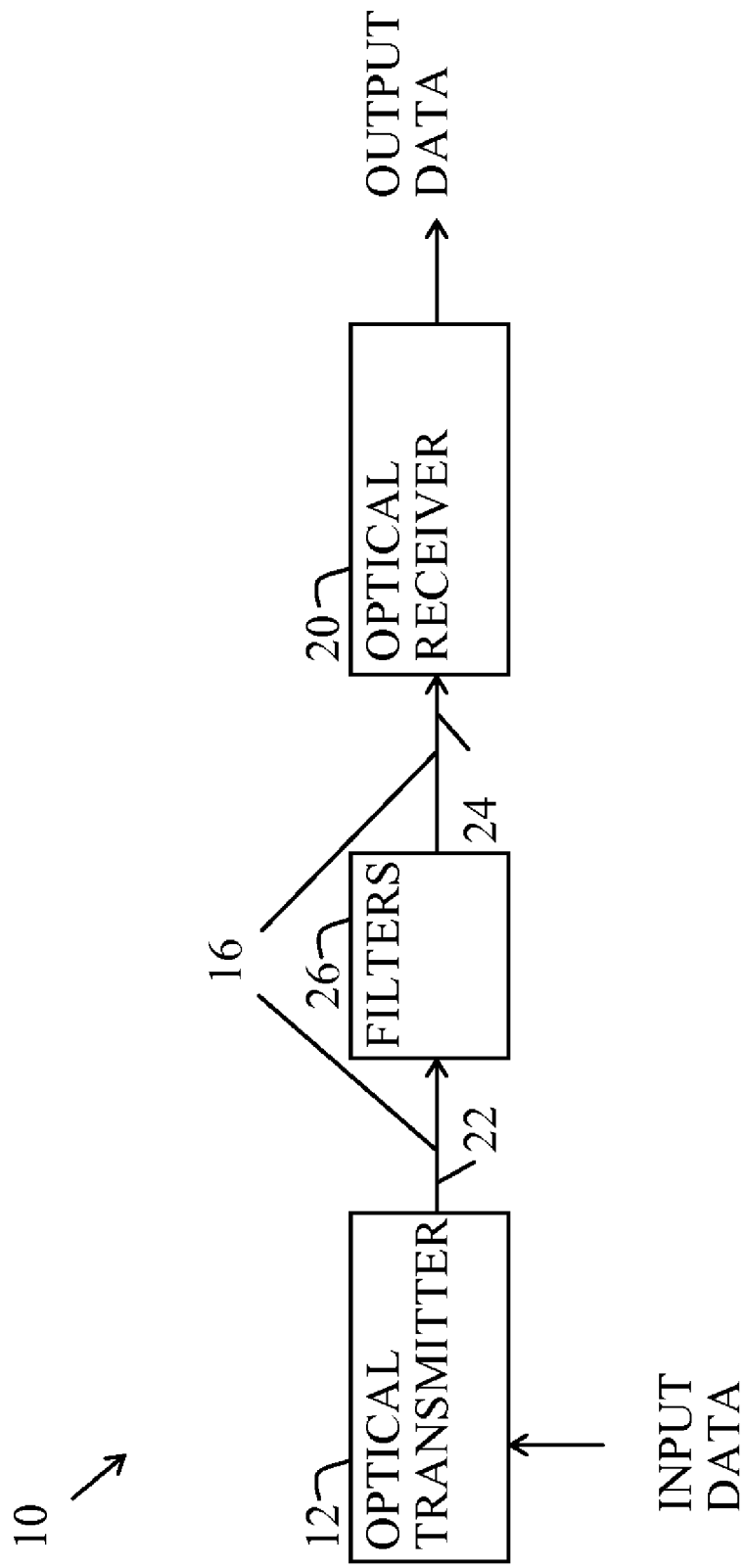
FIG. 3 is a block diagram of an exemplary optical transmission system for receiving a modulated optical signal.
Figure 6I:
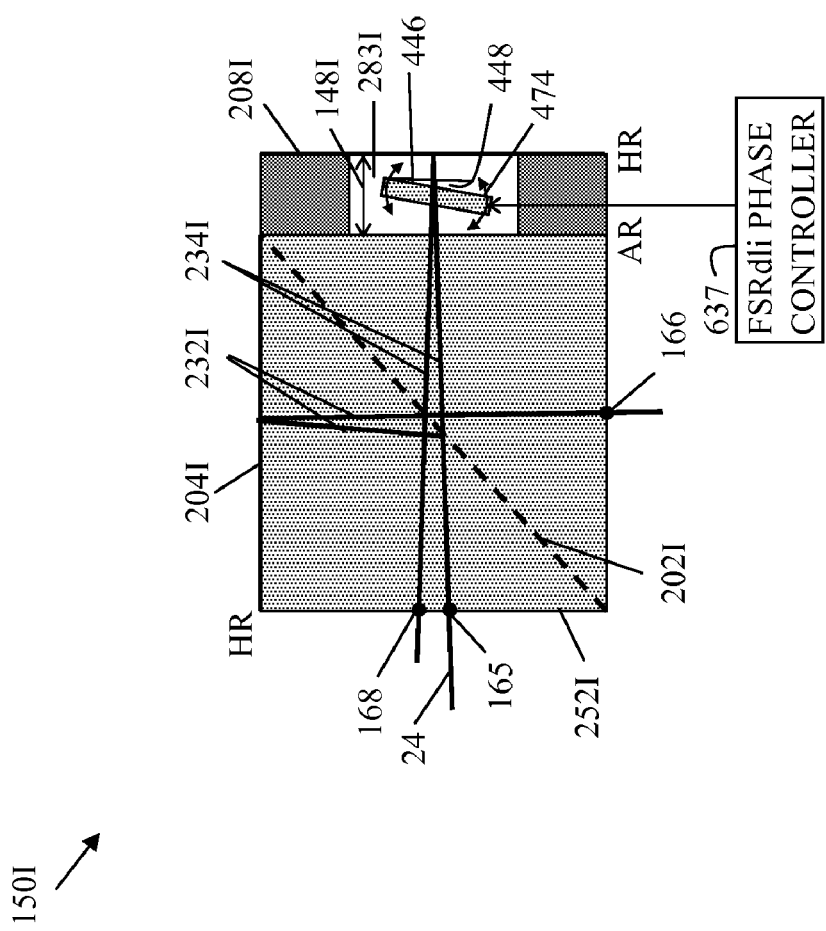
FIG. 6I illustrates a delay line interferometer (DLI) for the optical receiver of FIG. 17.
Figure 17:
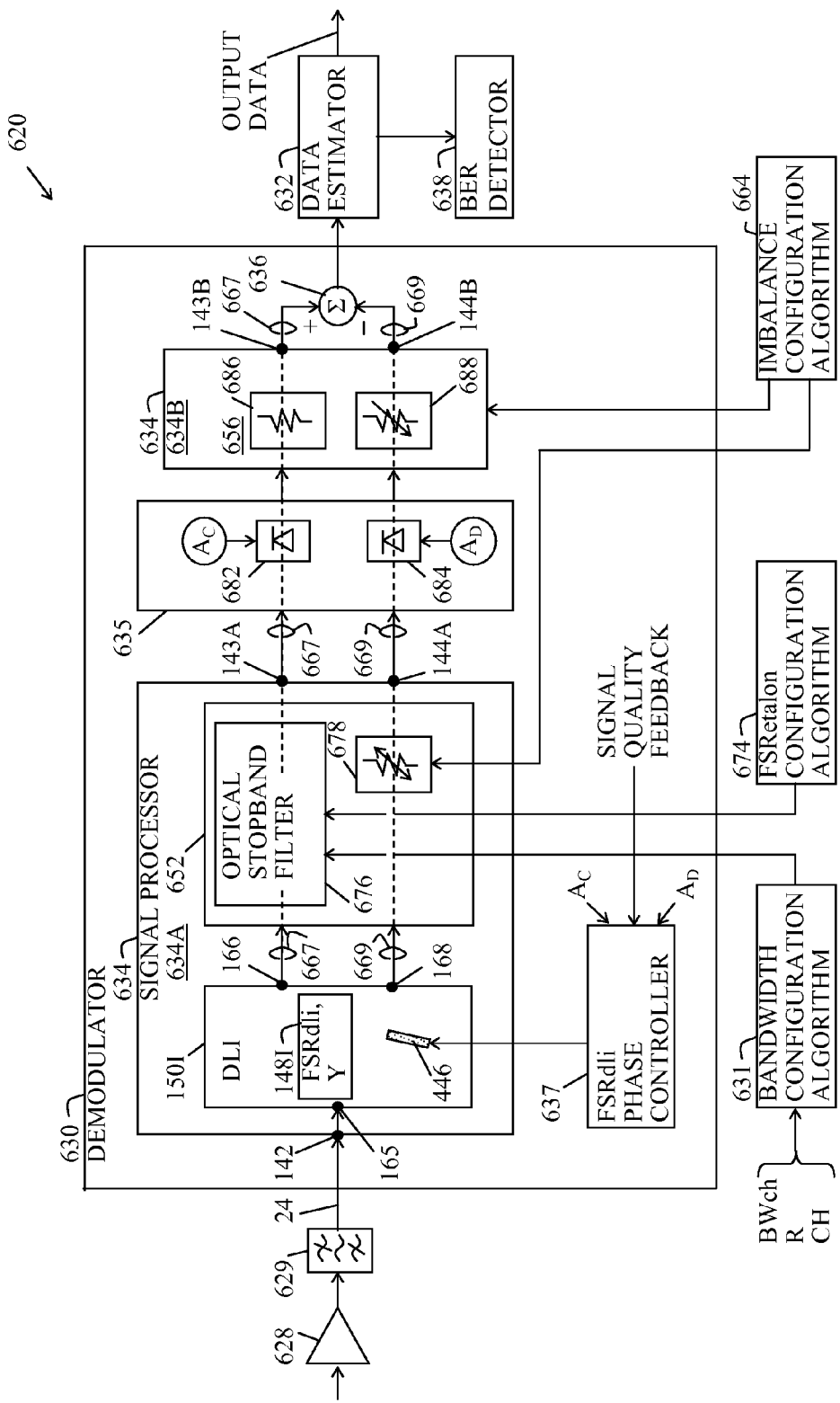
Figure 18C:
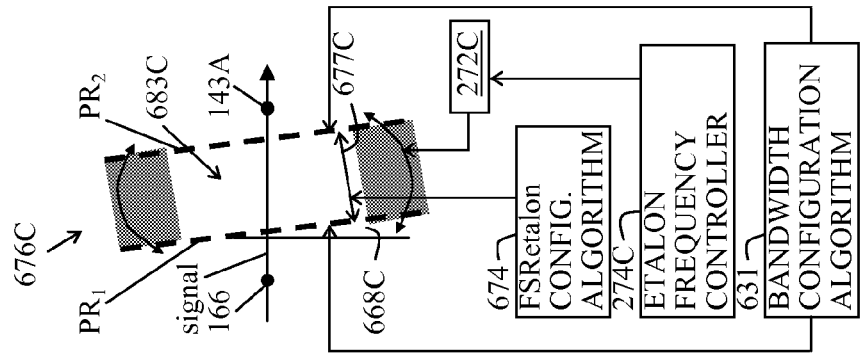
Figure 18B:
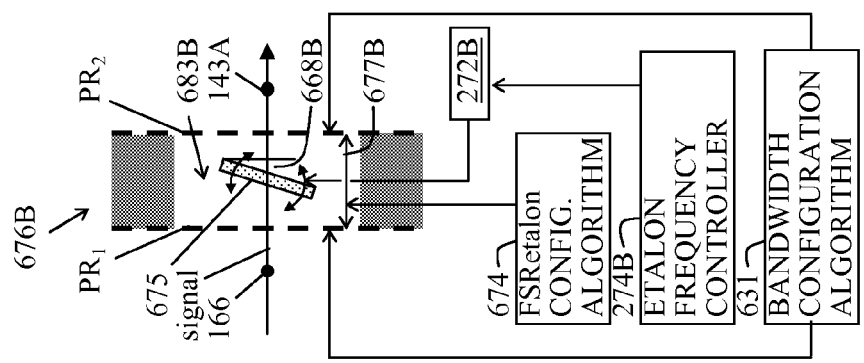
Figure 18A:
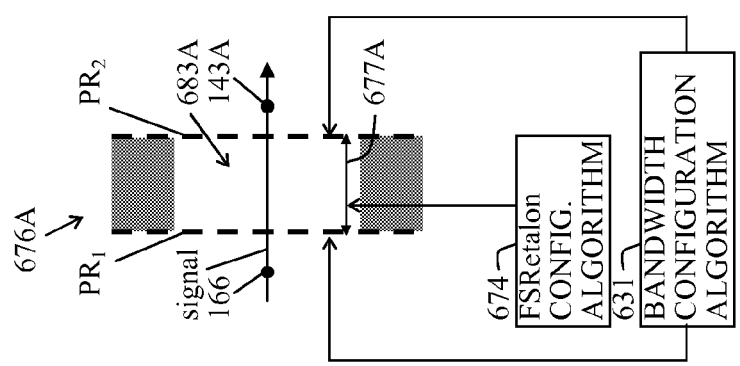
Figure 19A:
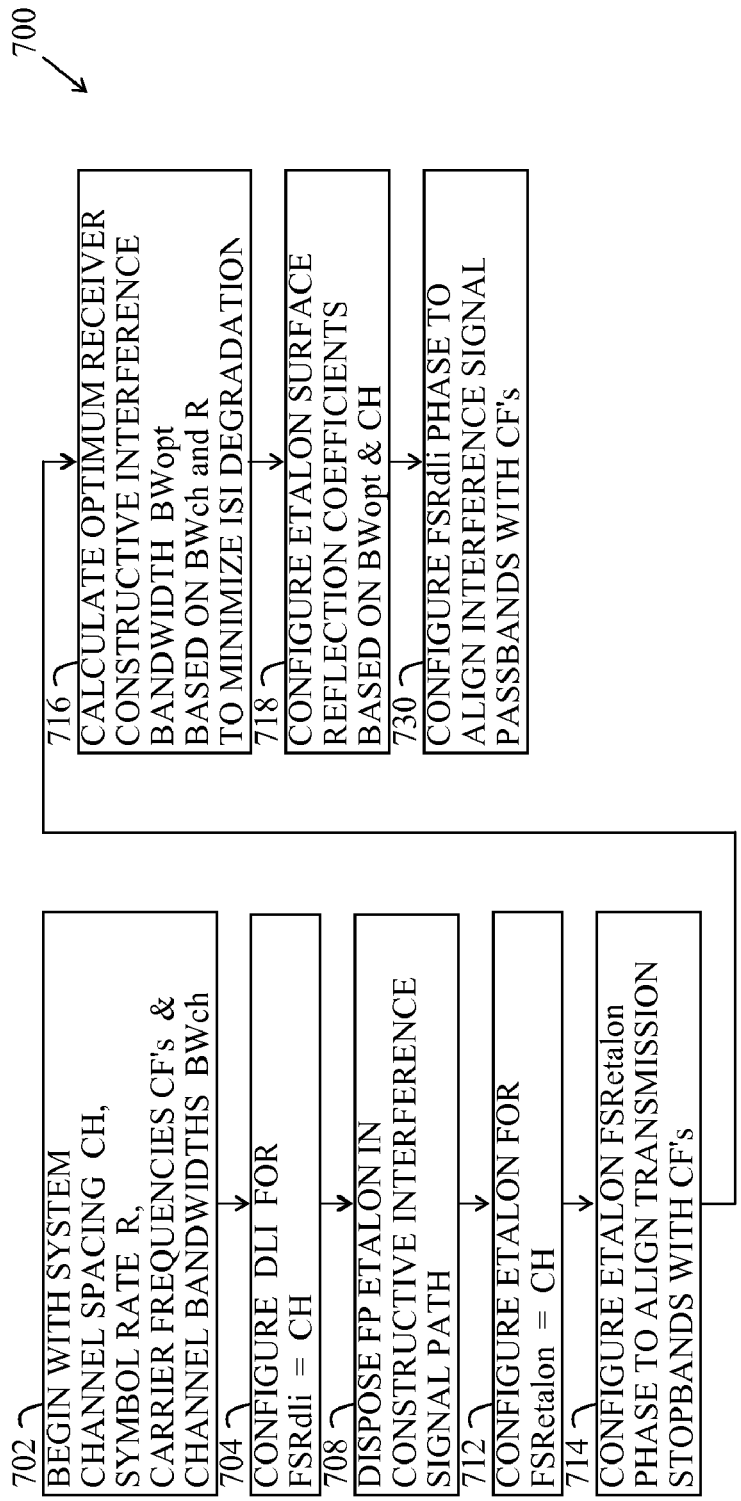
Figures 19B, 19C:
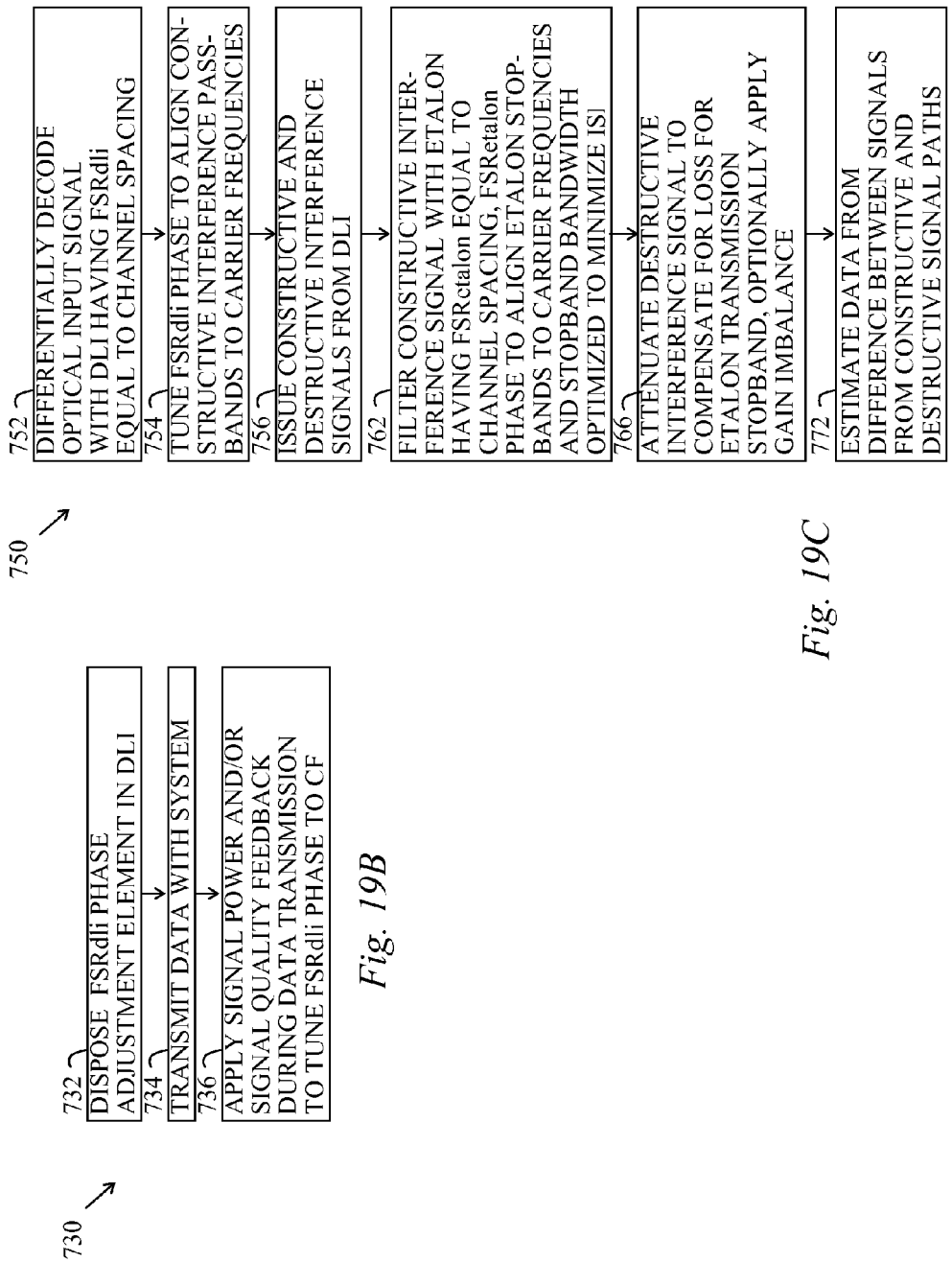
Figure 20:
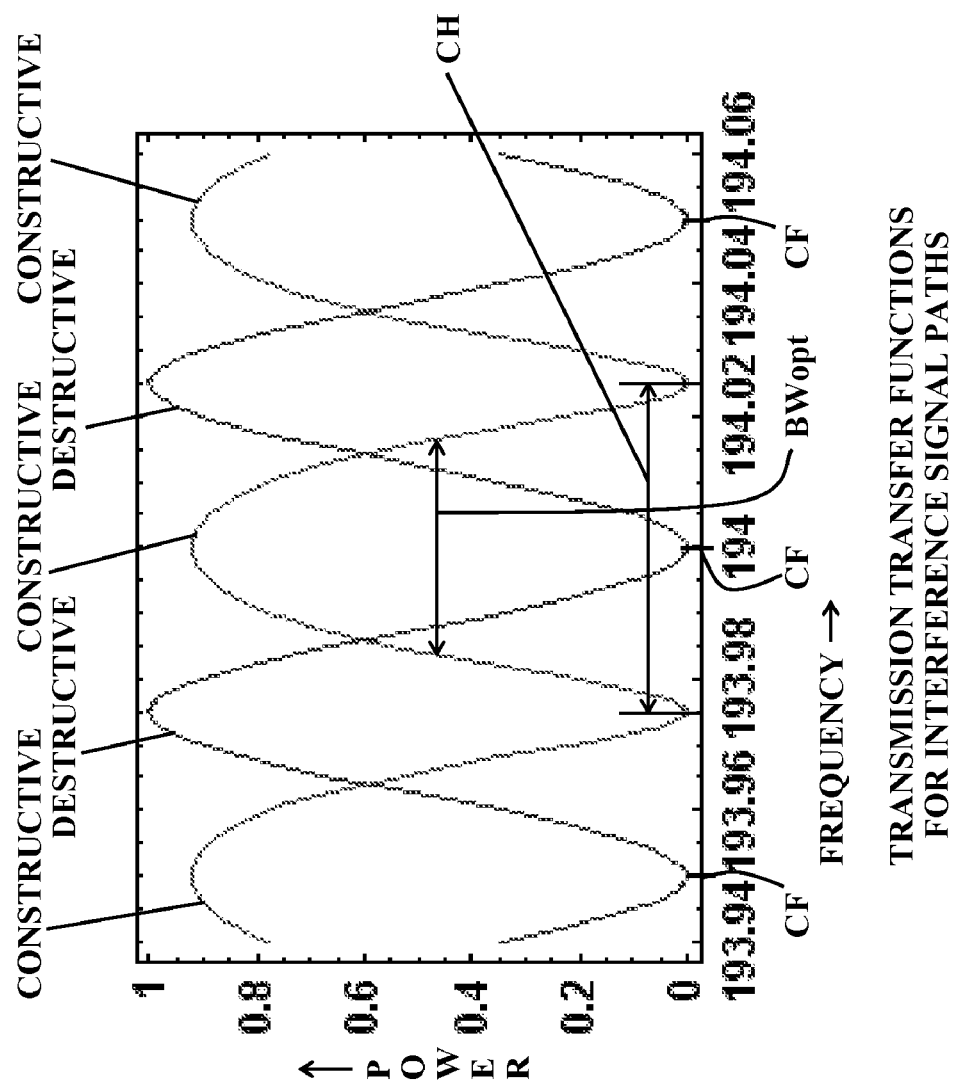
Figure 21:
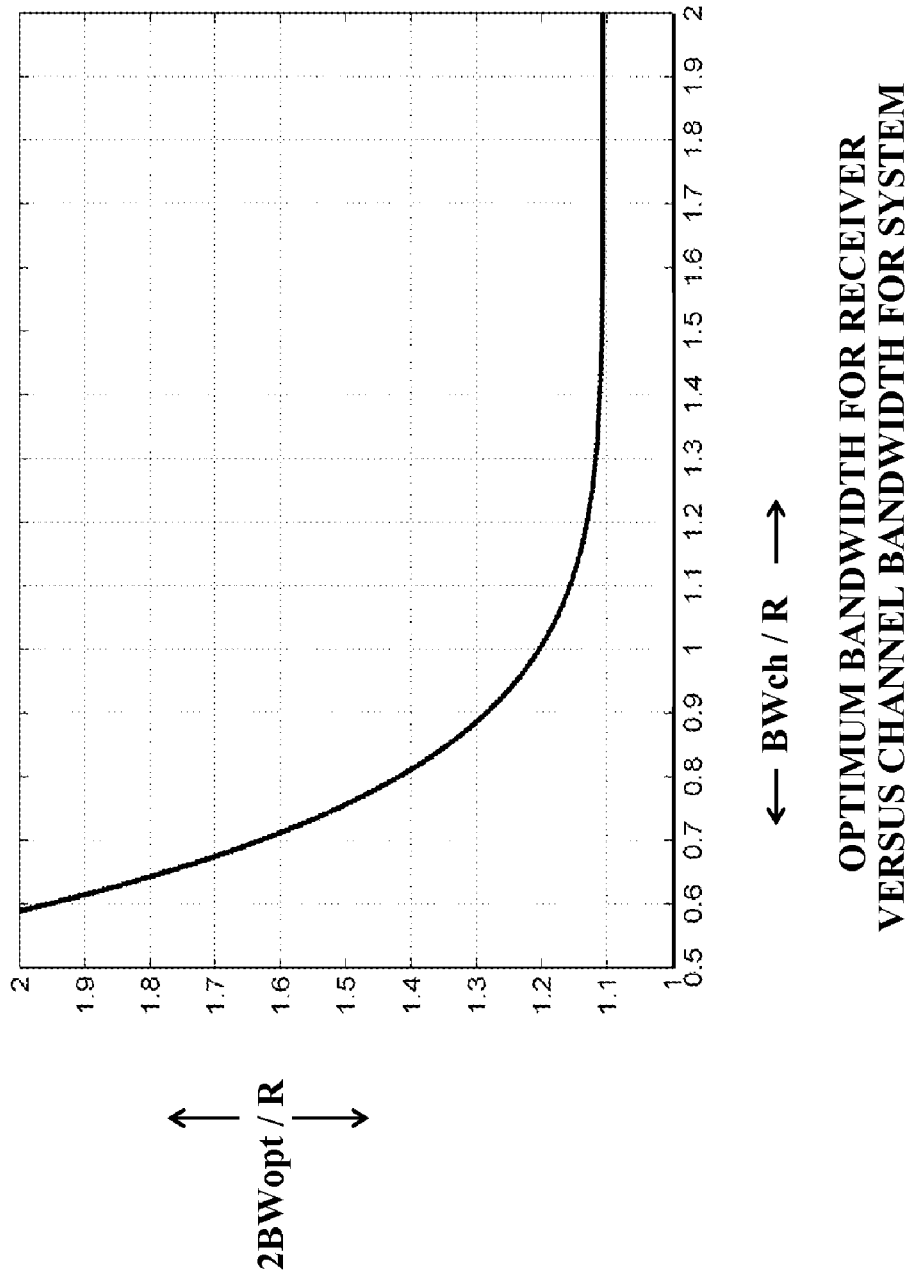
Figure 22:
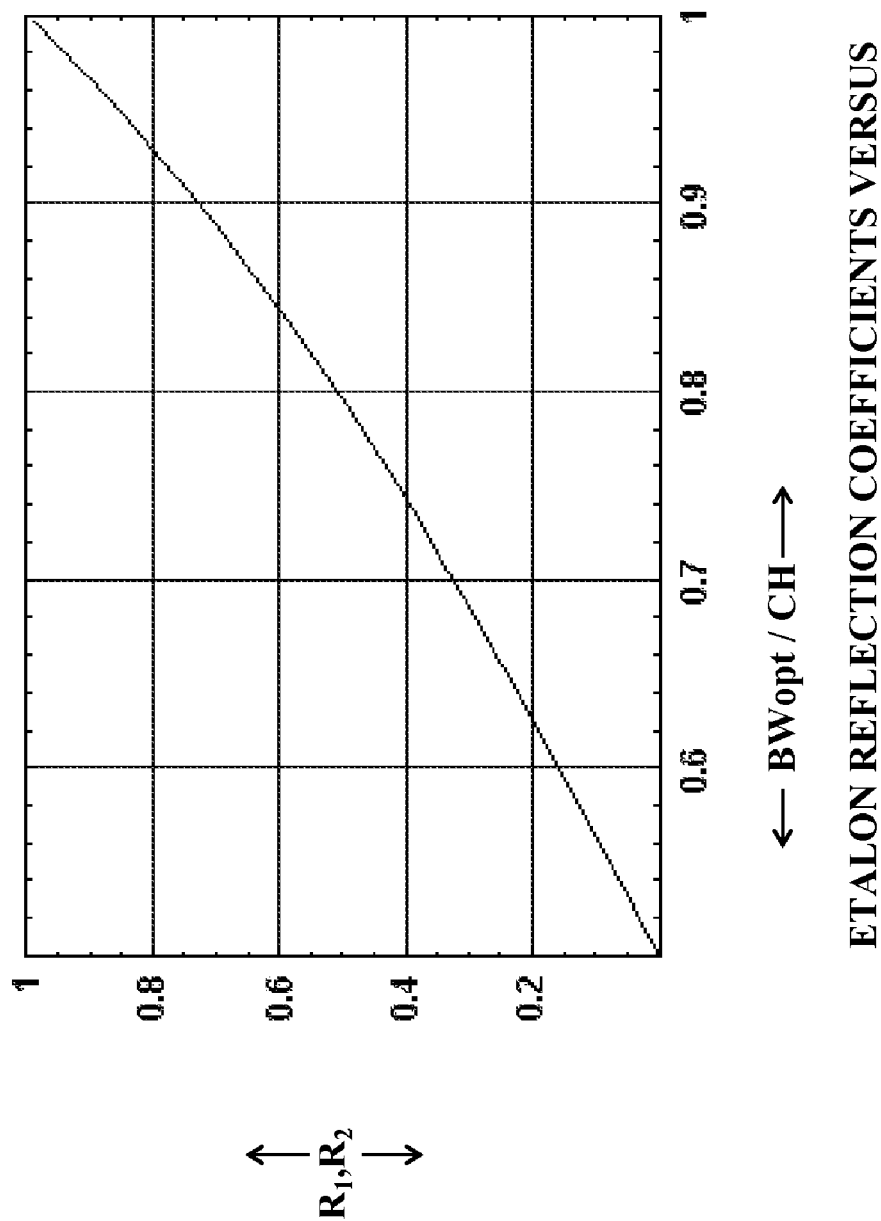
Figure 23:
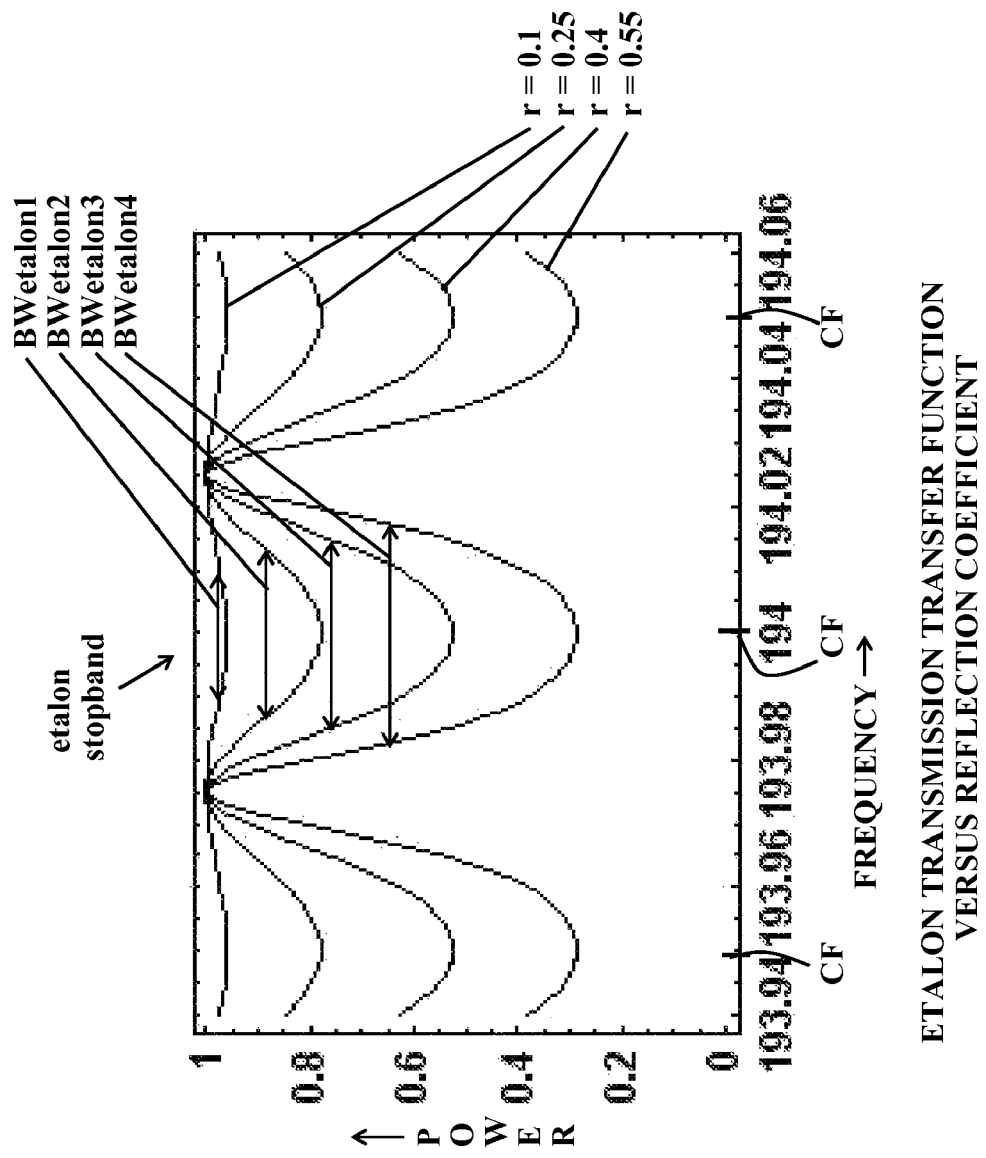
Figure 24:
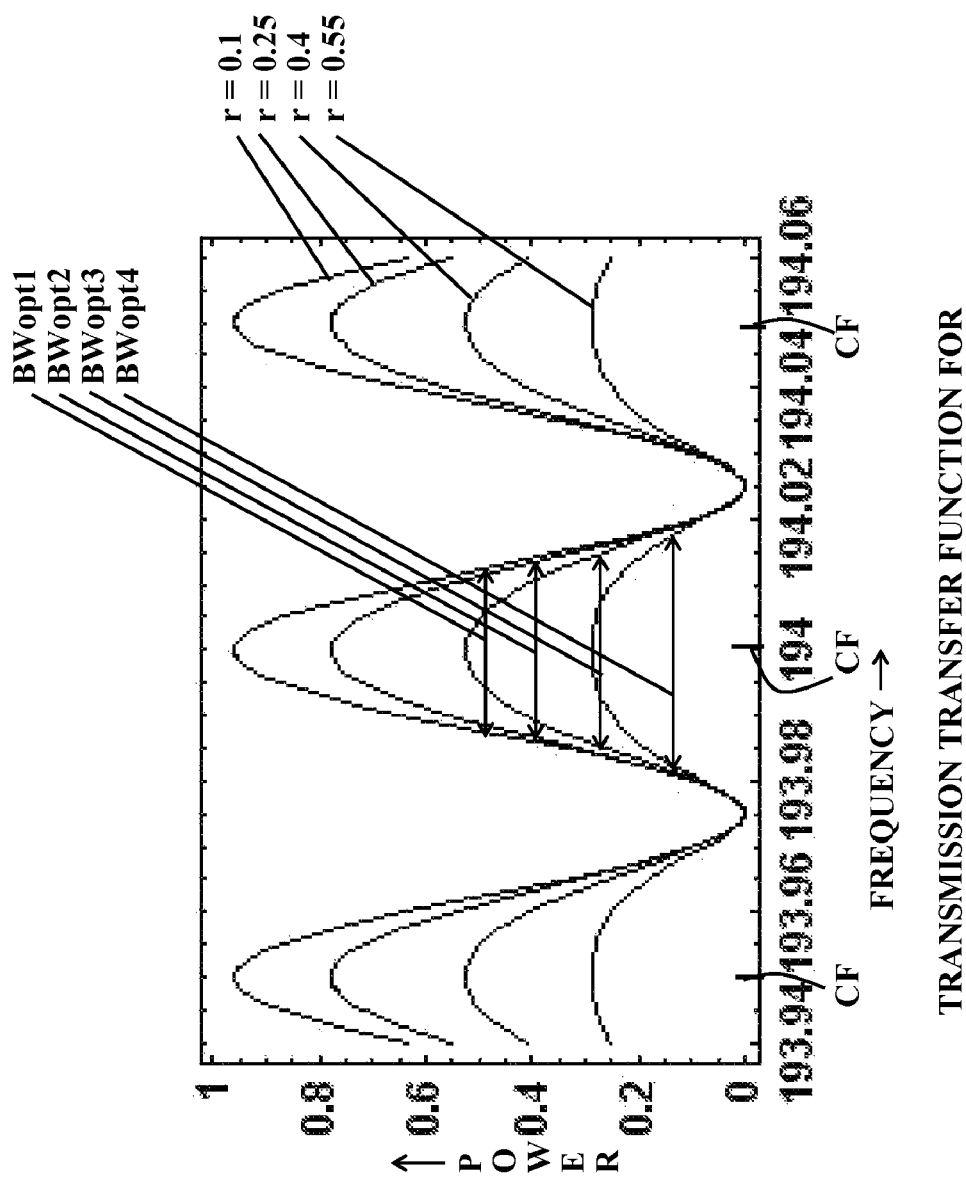

FIG. 17 is a detailed block diagram of an exemplary optical receiver including an etalon notch filter for the system of FIG. 3;

FIGS. 18A-C are illustrations for first, second, and third examples for the etalon filter in the receiver of FIG. 17;

FIG. 19A is a flow chart of an exemplary method for configuring the optical receiver of FIG. 17;

FIG. 19B is a flow chart of a method for aligning a free spectral range phase for the DLI of FIG. 6I;

FIG. 19C is a flow chart of a method for estimating data in the receiver of FIG. 17;

FIG. 20 is a chart showing transmission transfer functions for constructive and destructive interference signals in the receiver of FIG. 17;

FIG. 21 is a chart for determining an optimum bandwidth for a constructive interference signal in the receiver of FIG. 17;

FIG. 22 is a chart for configuring reflection coefficients for the etalon of FIG. 17;

FIG. 23 is a chart showing optimum bandwidths for the etalon of FIG. 17; and FIG. 24 is a chart showing optimum bandwidths for a constructive interference signal path for the receiver of FIG. 17.

DETAILED DESCRIPTION

Various examples and implementations of apparatus, systems and techniques for receiving optical signals in optical communications are described. It should be understood that it is not necessary to employ all of the technical details of the features described in receiving and detecting an optical signal. Described technical details may be mixed and matched for a particular implementation based on the specific requirements or needs in the implementation.

Specific examples and implementations described below use binary phase shift keyed (BPSK) signals using a differentially-encoded BPSK (DeBPSK, or DPSK) modulation format. However, other modulation formats, including higher order modulation formats such as quadrature phase shift keyed (QPSK), 4QAM, 8PSK, 16QAM and so on, may also be used to implement one or more technical features described in this application. As a specific example, differentially-encoded QPSK (DQPSK) may be used.

Figure 1:
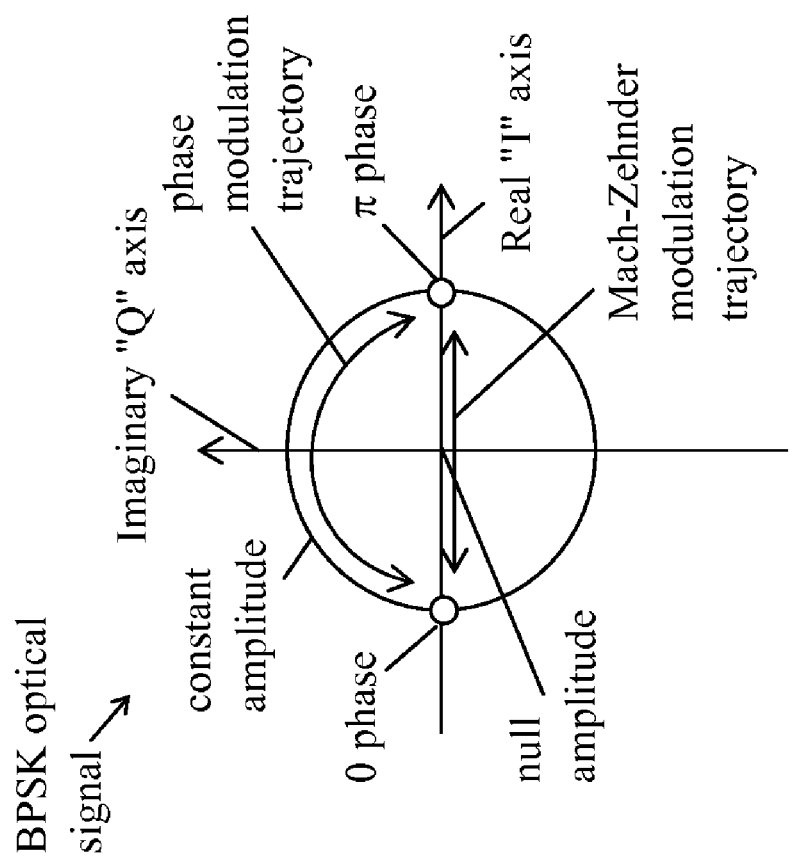
FIG. 1 is a vector diagram of a BPSK signal.

FIG. 1 is a vector representation of a binary phase shift keyed (BPSK) optical signal having phase states of 0 and π radians. Real (in-phase or "I") and imaginary (quadrature phase or "Q") parts of the complex BPSK optical signal are shown on horizontal and vertical axes, respectively. The BPSK signal between phase states of 0 and π may have a trajectory in the IQ plane of pure phase modulation (continuously changing phase with constant amplitude); or a trajectory in the IQ plane of Mach-Zehnder modulation (continuously changing amplitude through an amplitude null); or anything in between. For a DPSK modulation format, the logical bits are encoded as the differences between consecutive phase states.

Figure 2:
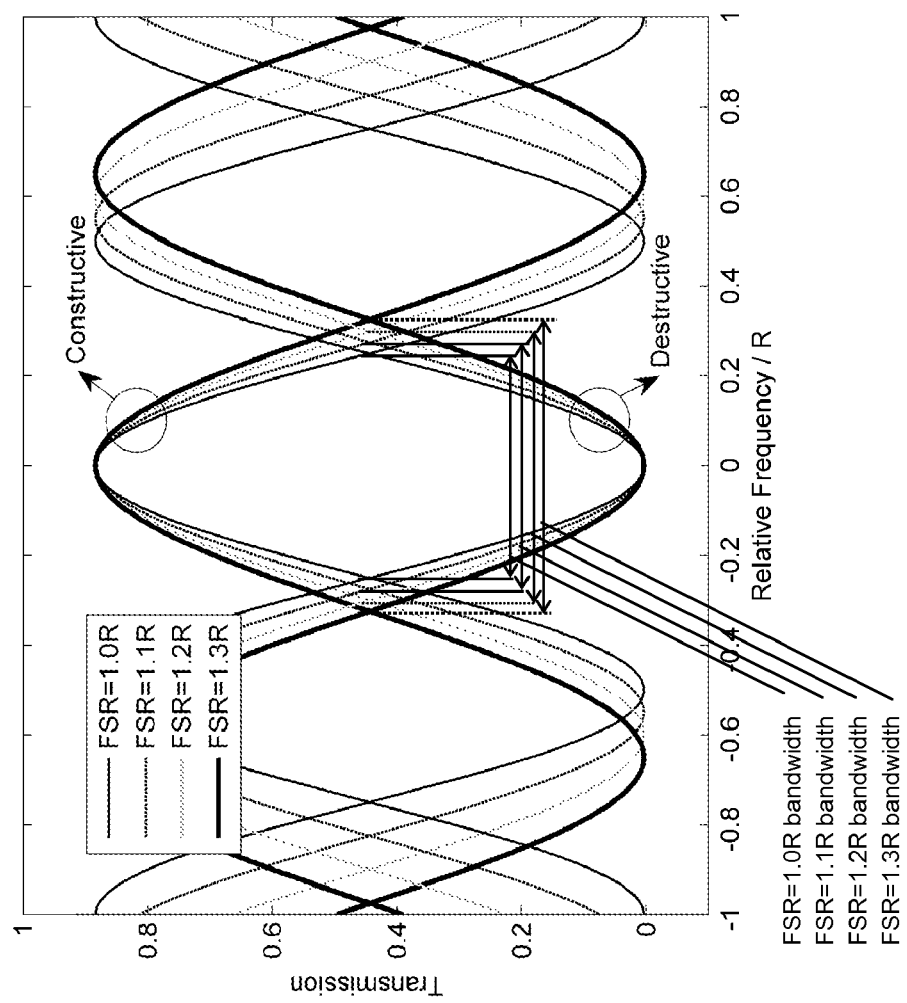
FIG. 2 is a chart of constructive and destructive transfer functions in a delay line interferometer (DLI) for an adjustable free spectral range (FSR)

FIG. 2 is a chart showing exemplary constructive and destructive transfer functions, referred to below as $G(f)$ and $H(f)$, between an input port and constructive and destructive output ports for a signal processor having a delay line interferometer (DLI). The transfer functions $G(f)$ and $H(f)$ are frequency responses of transmitted optical power versus frequency. The vertical axis of the chart shows power transmission. The horizontal axis of the chart shows frequency for an optical input signal scaled to modulation symbol rate R, relative to a center frequency of the transfer functions. The center frequency of the transfer functions is shown as zero. The scale factor R is the inverse of the symbol time T for modulation phase states carried by the optical signal.

The DLI has a transit time difference Y for demodulating a differentially modulated signal. The transit time difference Y (FIGS. 4 and 5) is also referred to in some places as the differential transit time Y or simply as the time Y. The inverse of the time Y is the free spectral range (FSR) of the DLI. Looked at another way, the FSR of the DLI is defined as the period of the transfer functions $G(f)$ and $H(f)$. The constructive and destructive transfer functions $G(f)$ and $H(f)$ are shown for free spectral ranges (FSR)s of 1.0 R, 1.1 R, 1.2 R and 1.3 R. Increasing the FSR effectively increases the bandwidth of the constructive and destructive transfer functions. The bandwidth of the constructive transfer function in this case is the frequency spectrum between points at one-half the maximum amplitude or where the constructive and destructive transfer functions cross. The bandwidth of the destructive transfer function is understood to be the bandwidth of the stop band of the constructive transfer function or where the constructive and destructive transfer functions cross. Equations 1 and 2 show constructive and destructive transfer functions $G(f)$ and $H(f)$, respectively, for the DLI.

$$G(f)=[1+\cos(2\pi fY)]/2 \qquad (1$$

$$H(f)=[1-\cos(2\pi fY)]/2 \qquad (2)$$

It can be seen that the FSR transfer functions $G(f)$ and $H(f)$ are periodic in the frequency domain. Phase of the periodic transfer function (offset in the frequency domain) is known as an FSR phase. In an optical system using differential modulation, best signal quality may be obtained when the FSR phase is adjusted so that the transfer functions $G(f)$ and $H(f)$ have a maximum ratio or normalized difference (difference scaled by the sum) at the carrier frequency of the optical signal or the center of the energy in the spectrum of the modulated optical signal. FIG. 2 shows the correct adjustment for the transfer function phase or FSR phase for maximum transfer function difference with the center frequency of the transfer functions aligned to the center frequency and carrier frequency of the received optical input signal for a symmetrical optical input signal spectrum.

FIG. 3 is a block diagram of an example of a data transmission system referred to with a reference number 10. The system 10 includes an optical transmitter 12 and an optical receiver 20. The transmitter 12 and the receiver 20 are connected through an optical transmission link 16. The transmission link 16 may use wavelength division multiplexing (WDM) for carrying several optical signals simultaneously using different optical carrier frequencies.

The transmitter 12 transmits an optical signal using a differentially-encoded phase shift keyed (DPSK) modulation format where logical 1's and 0's of input data are encoded as phase differences between adjacent (consecutive in time) phase states. For example for DPSK, adjacent phase states of 0 radians and adjacent phase states of π radians both carry a data bit having a logical "0"; and a phase state of 0 radians following a phase state of π radians and a phase state of π radians following a phase state of 0 radians both carry a data bit having a logical "1". Of course, the logical "0" and logical "1" may be reversed without loss of generality. It should also be noted that any two phase states that are separated by π radians may be used for the DPSK modulation.

The transmitter 12 illuminates one end of the link 16 with a modulated optical signal 22 having differentially-encoded phase shift keyed (DPSK) modulation for the logical bits of input data. The signal 22 passes through the link 16 and emerges at the other end of the link 16 as a modulated optical signal 24 to be received by the receiver 20. The link 16 has a frequency response having an effective optical bandwidth caused by one or more filters represented by filters 26. The optical bandwidth of the link 16 results in an effective optical bandwidth of the spectrum of the input signal 24.

The receiver 20 demodulates the signal 24 for providing output data that is its best estimate of the input data. The output data is desired to be an exact replica of the input data. However, the transmission link 16 degrades or impairs the quality of the received signal 24 and this degradation or impairment in signal quality causes the receiver 20 to occasionally make errors in the output data that it provides. One of the primary causes of the signal degradation is intersymbol interference (ISI) in the link 16 induced by the filters 26. The receiver 20 is designed to compensate for the quality degradation in the link 16, especially the ISI, in order to reduce the errors in the output data.

The apparatus and methods of the receiver 20 use measurements of signal quality and calculations based on the effective optical bandwidth of the link 16 and/or the effective optical bandwidth of the input signal 24 for compensating for one or more signal degradations or impairments in the input signal that may include but are not limited to ISI, signal-dependent noise and signal independent noise. The signal quality measurements may be bit error ratio (BER) measurements or eye opening ratio measurements. In some cases the signal quality measurements may use signal-to-noise measurements taken from optical or electrical constructive and destructive path signals in the receiver 20. In one example, the receiver 20 uses calculations based on the effective optical bandwidth of the link 16 for minimizing the BER for the received input signal 24.

Figure 4:
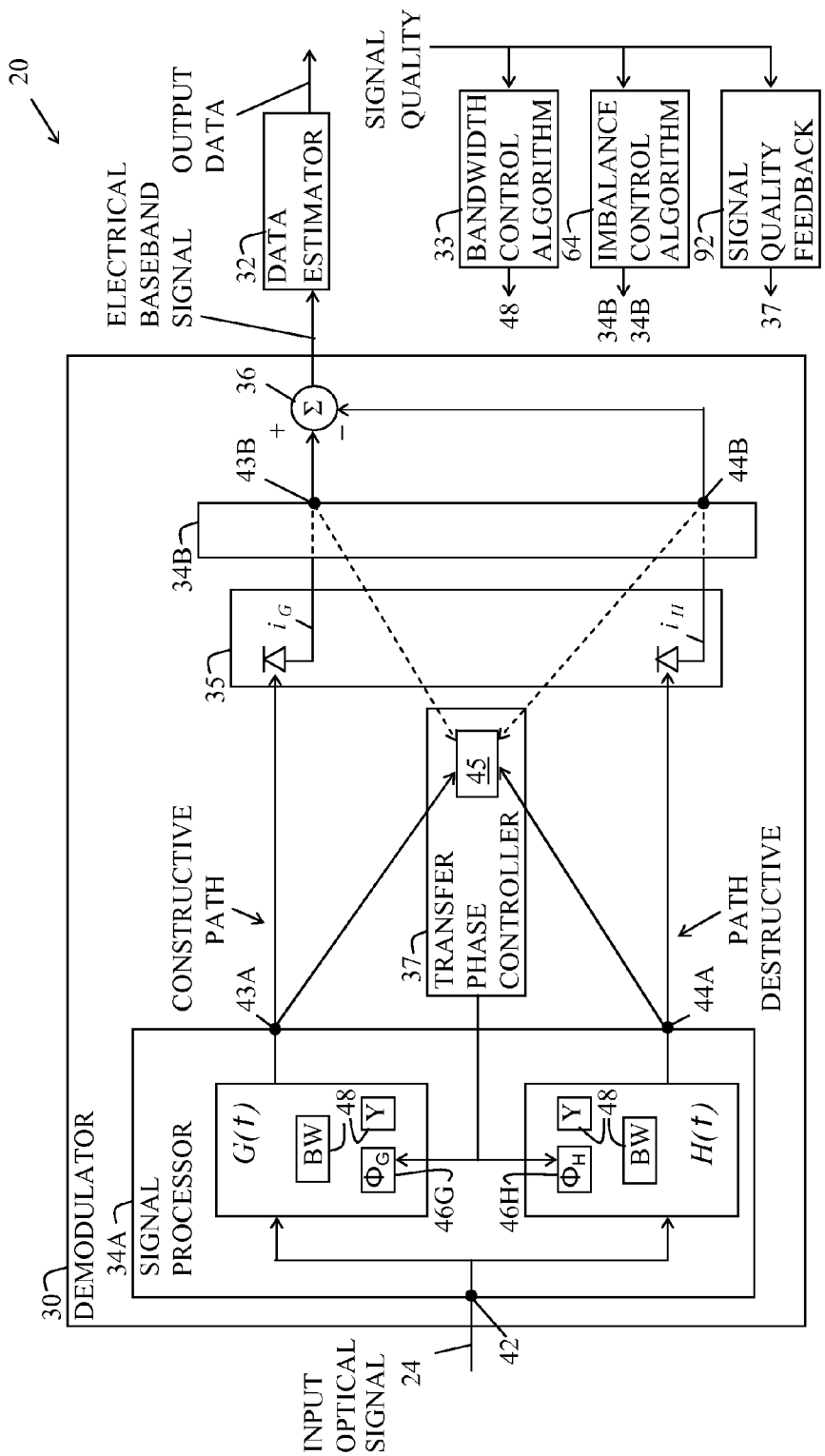
FIG. 4 is a general block diagram of an optical receiver for the system of FIG. 3.

FIG. 4 is a block diagram of an example of an optical receiver referred to with the reference number 20. The receiver 20 receives the optical signal 24 and provides output data that is its best estimate of the input data that was transmitted by the transmitter 12.

The receiver 20 includes a demodulator 30 and a data estimator 32. The receiver 20 or an external computer includes a bandwidth control algorithm 33. The demodulator 30 demodulates the optical input signal 24 and issues an electrical baseband signal. The data estimator 32 processes the baseband signal and issues the output data. The receiver 20 may also include an input optical filter for filtering the optical signal 24 into a channel when the optical signal 24 is wavelength division multiplexed (WDM) and contains multiple channels.

The demodulator 30 includes a signal processor 34, a detector apparatus 35, a combiner 36, and a transfer phase controller 37. The signal processor 34 has two parts, an optical signal processor 34A and an electrical signal processor 34B. The optical signal processor 34A receives the signal 24 at an input port 42; separates the signal 24 into optical constructive and destructive interference signals; differentially demodulates the signal 24 with a differential transit time Y; and issues the signals at constructive and destructive output ports 43A and 44A, respectively. The detector apparatus 35 receives the optical constructive and destructive paths signals from the ports 43A and 44A and converts photons to electrons for providing electrical constructive and destructive path signals shown as electrical currents $i_G$ and $i_H$ for the modulations on the optical signals.

The signal processor 34B processes the electrical signals and passes the processed electrical signals through constructive and destructive output ports 43B and 44B, respectively, to the combiner 36. The combiner 36 takes a difference between the instantaneous signal level of the constructive path signal and the instantaneous signal level of the destructive path signal for providing the baseband signal. In a variation of the receiver 20, the data estimator 32 connects to the ports 43B and 44B for receiving differential electrical signals.

The separation of the input signal 24 using optical interference into the constructive and destructive paths provides the constructive and destructive transfer functions $G(f)$ and $H(f)$, respectively, in the signal processor 34A. The transfer functions $G(f)$ and $H(f)$ are a part of the constructive and destructive transfer functions provided by the signal processor 34 and the detector apparatus 35 from the input port 42 to the constructive and destructive output ports 43B and 44B, respectively. In one example, the constructive and destructive transfer functions can be primarily determined within the signal processor 34A to the output ports 43A and 44A.

The transfer phase controller 37 includes a detector 45 for measuring and averaging power-related levels for the signals at the output ports 43A and 44A (or 43B and 44B). The power-related levels that are measured are indicative of, or have a monotonic relationship to, the signal powers at the output ports 43A and 44A (or the output ports 43B and 44B). For example, the measurements may be signal power, average signal magnitude, squared signal level, or absolute value of signal level with an arbitrary exponent. The transfer phase controller 37 uses the measurements for providing a feedback signal that maximizes the ratio of the signal power for the port 43A to the signal power for the port 44A (or the signal power for the port 43B to the signal power for the port 44B). The idea may also be used in an inverted mode for maximizing the ratio of the signal power for the port 44A to the signal power for the port 43A (or the signal power for the port 44B to the signal power for the port 43B).

The signal processor 34A has controllable transfer phase elements 46G and 46H for providing adjustable phase shifts $\Phi_G$ and $\Phi_H$ for the constructive and destructive transfer functions. The elements 46G and 46H may be the same physical element 46 and the phase shifts $\Phi_G$ and $\Phi_H$ may be the same phase shift $\Phi$. The transfer phase controller 37 uses the power-related measurements from the detection 45 for controlling the elements 46G and 46H, or the element 46, for adjusting the phases $\Phi_G$ and $\Phi_H$, or the phase $\Phi$, for shifting the phases of the transfer functions for a maximum normalized signal power difference between the signals at the constructive port 43A (or 43B) and the destructive port 44A (or 44B). This process may be used to tune the transfer functions $G(f)$ and $H(f)$ relative to the carrier frequency of the modulated optical signal 24 and at the center frequency of the energy in the modulated optical signal 24.

The signal processor 34A has a transfer bandwidth element 48 for providing a selectable or controllable bandwidth (BW). At least one of the constructive and destructive transfer functions depends, at least in part, upon this bandwidth. In one example the optical signal processor 34A can include a delay line interferometer (DLI). In this case the bandwidth is defined or modified by the inverse of the time Y.

Figure 10:
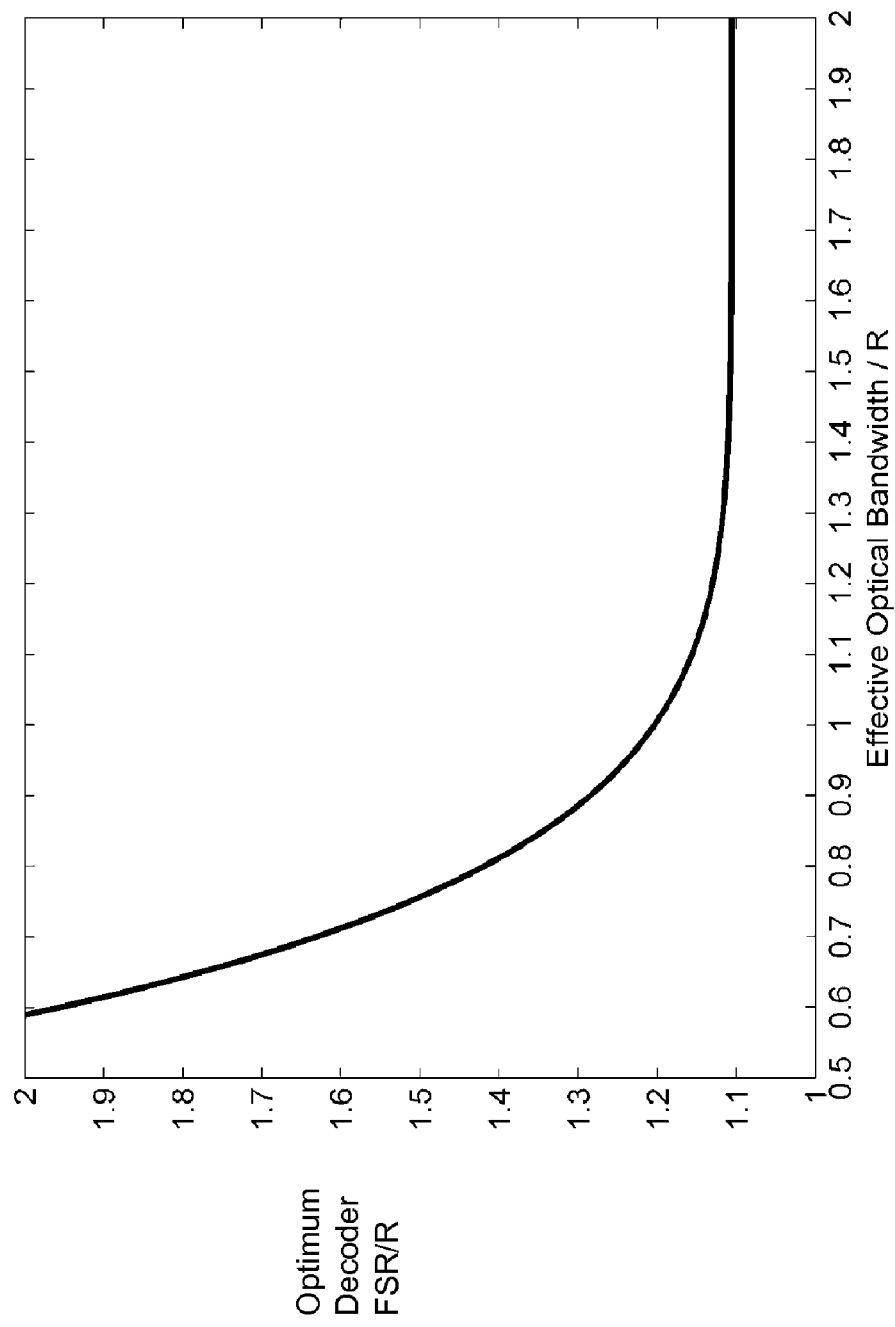
FIG. 10 is a chart showing a calculation of FSR based on system bandwidth in order to compensate for the ISI in the system of FIG. 3.

During the design or installation of the receiver 20, or when the receiver 20 is in operation, a calculation or test is made, or active feedback is provided, for signal quality or a bit error ratio of the output data. A primary degradation of the signal quality in the system 10 is intersymbol interference (ISI) caused by the filters 26. The bandwidth control algorithm 33 calculates or provides feedback for determining or controlling the transfer bandwidth element 48 as shown in the chart of FIG. 10. The calculation or test, or active feedback, is used for selecting or controlling the element 48 in order to select or adjust the bandwidth for providing the best signal quality or minimum ISI for the system 10. The signal quality may be measured on the optical or electrical signals, by measuring eye opening in a baseband signal or by measuring bit error ratio (BER).

An imbalance control algorithm 64 may be included for calculating a gain imbalance or providing feedback from signal quality data to the signal processor 34 to either the optical processor 34A or the electrical processor 34B or both for optimizing signal quality. The signal processor 34 uses the gain imbalance calculations or feedback to imbalance the gains between the constructive and destructive path signals. The gain imbalance calculations may be based on the effective optical bandwidth of the link 16 and the input signal 24.

A side effect of changing the selection of the transit time difference Y is that the transfer function phase or FSR phase of the transfer functions $G(f)$ and $H(f)$ may slide many cycles with respect to the frequency of the input signal 24. In a general rule, whenever the FSR delay is changed, the transfer function phase shift $\Phi$, or phase shifts $\Phi_G$ and $\Phi_H$, must be re-adjusted by the transfer (FSR) phase controller 37 by adjusting the transfer (FSR) phase element 46, or 46G and 46H, for re-centering the transfer functions $G(f)$ and $H(f)$ to its optimal frequency position. When the received optical spectrum is symmetrical, the optimal position coincides with the carrier frequency of the input optical signal 24. On the other hand the effect of changing the phase shift $\Phi$, or phase shifts $\Phi_G$ and $\Phi_H$, on the FSR bandwidth is so small that is insignificant.

The receiver 20 may also include a path for signal quality feedback 92. Data for signal quality is processed through the signal quality feedback 92 and passed to the transfer phase controller 37. The transfer phase controller 37 uses the processed signal quality data for fine tuning the phase delay of the transfer phase element 46 for improving and optimizing the signal quality. Preferably, the element 46 is first tuned in a feedback loop according to the power-related measurements and then fine tuned in a second feedback loop for minimizing a bit error ratio (BER). The signal quality data may be obtained by measuring BER directly, by measuring an eye opening ratio of a baseband signal, and/or by measuring a signal to noise ratio (SNR) of the optical or electrical constructive and destructive path signals.

Figure 5:
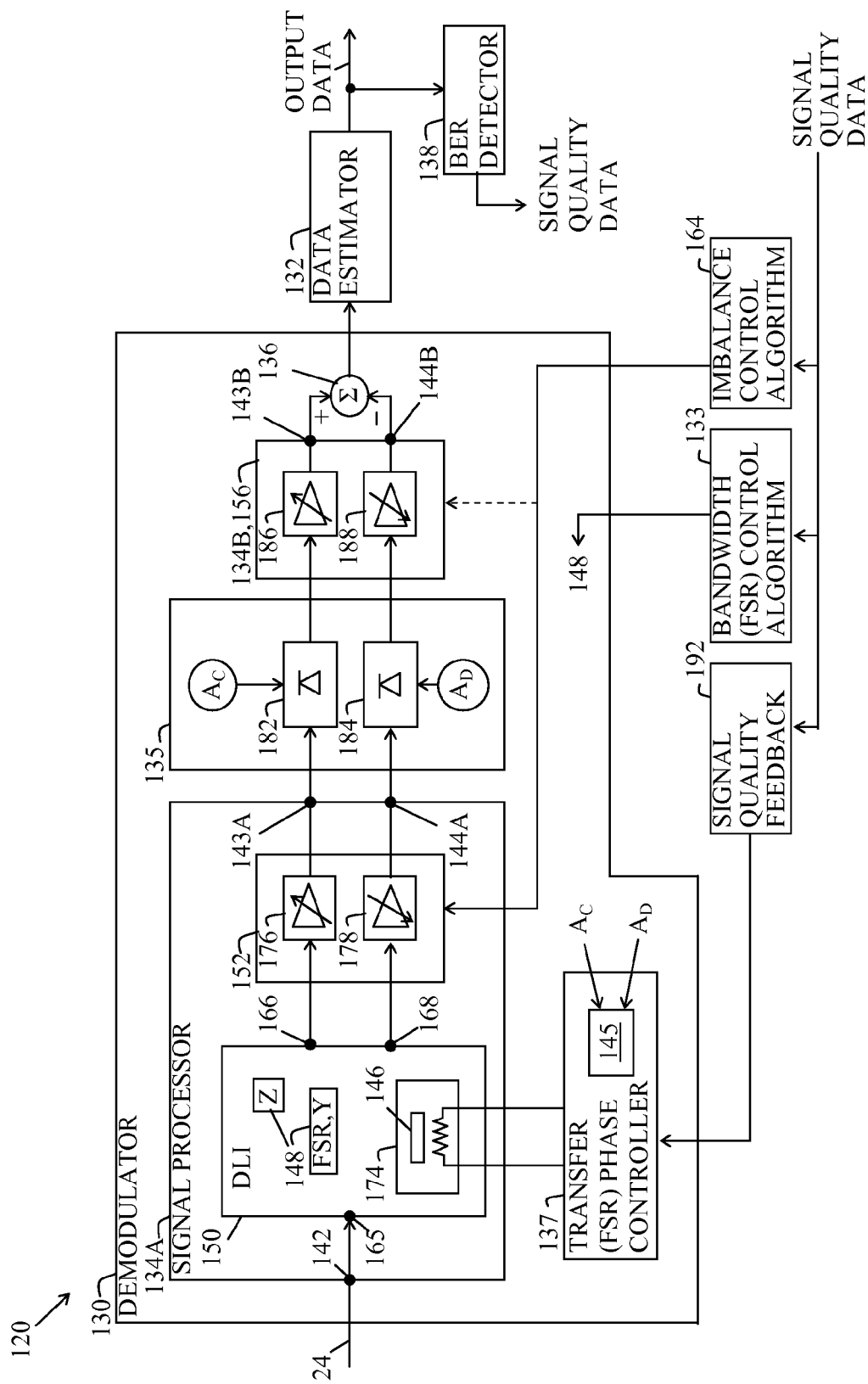
FIG. 5 is a detailed block diagram of an optical receiver including a delay line interferometer (DLI) for the system of FIG. 3.

FIG. 5 is a detailed block diagram of an example of an optical receiver referred to with a reference number 120. The receiver 120 is an example of the receiver 20 described above for the system 10. Elements of the receiver 120 that are analogous to, or embodiments of, elements of the receiver 20 are denoted by incrementing the reference identification numbers by 100.

The receiver 120 includes a demodulator 130, a data estimator 132 and a bit error ratio (BER) detector 138. The receiver 120, or an external computer, also includes a bandwidth (FSR) control algorithm 133, and an imbalance control algorithm 164. The demodulator 130 demodulates the optical signal 24 and passes the demodulated electrical signal to the data estimator 132. The data estimator 132 processes the electrical signal for making a best estimate of the original input data and issues its best estimated input data as output data. The BER detector 138 estimates a BER for the output data. The BER may be used as signal quality data. The demodulator 130 uses the signal quality data through the algorithms 133, 164 and 192.

The demodulator 130 includes a signal processor 134, a detector apparatus 135, a combiner 136 and a transfer free spectral range (FSR) phase controller 137. The signal processor 134 includes an optical signal processor 134A and an electrical signal processor 134B. The optical signal processor 134A receives the optical input signal 24 at an input signal port 142; separates the signal 24 into optical constructive and destructive interference signals; differentially demodulates the signal 24 with the differential time Y; and issues signals from constructive and destructive output ports 143A and 144A, respectively, to the detector apparatus 135.

The detector apparatus 135 converts the modulations on the optical constructive and destructive path signals to electrical signals and passes the electrical signals to the electrical signal processor 134B. The electrical signal processor 134B processes the electrical signals and issues the processed electrical signals at constructive and destructive output ports 143B and 144B, respectively, to the combiner 136. The combiner 136 takes a difference between the instantaneous signal level of the constructive path signal and the instantaneous signal level of the destructive path signal for providing the baseband signal. In a variation of the receiver 120, the data estimator 132 connects to the ports 143B and 144B for receiving differential electrical signals.

The optical signal processor 134A includes a delay line interferometer (DLI) 150 and an optical imbalancer 152. The electrical signal processor 134B includes an electrical imbalancer 156. The DLI 150 has an input port 165 connected to the input port 142 of the demodulator 130 for receiving the signal 24. The constructive transfer function of the DLI 150 between the input port 165 and its constructive output port 166 includes the transfer function G(f) of the equation 1. The destructive transfer function of the DLI 150 between the input port 165 and its destructive output port 168 includes the transfer function H(f) of the equation 2.

The constructive transfer function of the signal processor 134 between the input port 142 and the constructive output port 143B includes the constructive transfer function of the DLI 150 and the transfer functions in the constructive signal path of the optical imbalancer 152, the detector apparatus 135 and the electrical imbalancer 156. Similarly, the destructive transfer function of the signal processor 134 between the input port 142 and the destructive output port 144B includes the destructive transfer function of the DLI 150 and the transfer functions in the destructive signal path of the optical imbalancer 152, the detector apparatus 135 and the electrical imbalancer 156.

The signals at the constructive and destructive output ports 166 and 168 may be created with optical interference by separating the input signal at the port 165 into two paths and then recombining the signals. The DLI 150 has a first signal delay element referred to as a transfer free spectral range (FSR) bandwidth element 148 and a second signal delay element referred to as a transfer (FSR) phase element 146. The FSR phase element 146 provides a delay difference between the signal transit times in the signal paths in the DLI 150 and also provides a transfer function phase shift $\Phi$ to the constructive and destructive free spectral range transfer functions for the DLI 150. The FSR bandwidth element 148 provides a signal delay Z (FIGS. 6A-C) between the signal transit times in the signal paths in the DLI 150.

The signal delay Z provided by the FSR bandwidth element 148 is called an FSR delay to distinguish it from the signal delay difference provided by the FSR phase element 146 called an FSR phase delay. The reader should be aware that two different types of phases are being described here—the phases of the periodic signals and the phases of the periodic transfer functions G(f) and H(f). The FSR delay Z is a major contributor to the signal transit time difference Y for differentially demodulating the input signal 24. It should be noted that for the receiver 120, the time difference Y will not, in general, be the same as the symbol time T of the modulated signal 24. In a typical system 10, the time difference Y of the receiver 120 is less than about 83% of the symbol time T.

The inverse of the time difference Y defines the free spectral range (FSR) and the bandwidth of the constructive and destructive transfer functions of the DLI 150. The free spectral range of the DLI 150 determines or is a contributor to the constructive and destructive transfer functions G(f) and H(f) for the DLI 150. The FSR delay Z of the FSR bandwidth element 148 is selected or adjusted based on known or measured characteristics of the link 16 to provide the time difference Y that provides a desired free spectral range (FSR) for the DLI 150 for improving the performance of the system 10, and especially for reducing the signal quality degradation due to intersymbol interference (ISI) caused by the filters 26. The bandwidth (FSR) control algorithm 133 calculates or provides feedback for determining or controlling the element 148 as shown in the chart of FIG. 10. In some embodiments the FSR bandwidth element 148 and the FSR phase element 146 may be combined as a single element having a large delay Z having a small adjustable range for providing the phase shift $\Phi$.

The FSR phase element 146 is used for fine tuning the phase $\Phi$ of the cyclic frequency response of the transfer functions G(f) and H(f) to tune the transfer functions G(f) and H(f) relative to the carrier frequency of the modulated input signal 24. In general, the FSR phase must be re-adjusted each time a new FSR delay Z is selected or adjusted. The FSR phase element 146 may be controlled by a mechanism 174 included in the DLI 150 where the mechanism 174 is controlled by the FSR phase controller 137. The mechanism 174 may be an oven for controlling the temperature of the element 146.

The receiver 120 may include an input optical filter for filtering the optical signal 24 into a channel when the optical signal 24 has multiple channels that are wavelength division multiplexed (WDM). The input optical filter may be viewed as one of the filters 26 in the link 16. It is desirable for cost and convenience that the same processor 134, and the same DLI 150 be used for any channel.

In an exception to the general rule stated above, the FSR phase controller 137 and FSR phase element 146 may not be necessary when the FSR bandwidth element 148 is selected for providing the time difference Y exactly equal to the inverse of the frequency spacing of the channels. For example, for a channel spacing of 50 GHz and a symbol time of 23 picoseconds, the time difference Y might be 20 picoseconds. However, in this special case, the FSR of the DLI 150 may not be optimized for best BER. In the receiver 120, the FSR bandwidth element 148 is selected according to criteria of compensating for ISI in the transmission link 16 for providing the transit time difference Y and the FSR for best BER where the time difference Y is not the inverse of the channel spacing.

The optical imbalancer 152 includes constructive and destructive variable gain elements 176 and 178 for controlling the optical gains that are applied to the signals from the output ports 166 and 168, respectively, in order to provide a gain imbalance between the constructive and destructive signals to the output ports 143A and 144A. The gains of the elements 176 and 178 may be controlled by the imbalance control algorithm 164 for varying the ratio of the power gains for constructive and destructive paths for providing constructive and destructive transfer functions $g_o(f)$ and $h_o(f)$ according to respective equations 3 and 4. In the equations 3 and 4, the optical gain imbalance, shown with symbol $\beta_o$, varies from minus one to plus one.

$$g_o(f)=1-\beta_o \tag{3}$$

$$h_o(f)=1+\beta_o \tag{4}$$

The imbalance operation may be provided dynamically in a closed loop using active feedback for minimizing the BER from the BER detector 138. Or, the imbalance operation may be "set and forget" (until it is set and forgotten again) after measuring the BER. Or, the imbalance operation may be open loop based on calculations from known or measured characteristics of the link 16. The calculations are shown in a FIG. 11 that is described below. The gain elements 176 and 178 may use variable amplification or variable attenuation for providing the gain ratio. Only one of the gain elements 176 and 178 is required to be variable in order to provide the variable gain ratio.

The detector apparatus 135 includes a constructive photo-detector 182 and a destructive photo-detector 184 for detecting the optical signals for the ports 143A and 144A, respectively, by converting photons to electrons for providing electrical signals to the electrical imbalancer 156. Photo-diodes may be used for the detectors 182 and 184. Each photodiode 182 and 184 produces an electrical signal proportional to detected optical power. The constructive and destructive transfer functions from the input port 165 to the electrical outputs of the detector apparatus 135 include the terms of respective equations 5 and 6.

$$G(f)*g_o(f)=\{[1+\cos(2\pi fY)]/2\}*(1-\beta_o) \tag{5}$$

$$H(f)*h_o(f)=\{[1-\cos(2\pi fY)]/2\}*(1+\beta_o) \tag{6}$$

The FSR phase controller 137 controls the phase delay of the FSR phase element 146 for maximizing a ratio of the optical powers in the constructive and destructive detectors 182 and 184. In one example, FSR phase controller 137 includes a detector 145 for making a power-related measurement for the signals in the constructive and destructive signal paths. The detector 145 measures and then averages the optical powers in the constructive and destructive detectors 182 and 184 by measuring photocurrents $A_C$ and $A_D$, respectively. The photocurrents are the electrical currents in the detectors 182 and 184 that result from the conversions of photons to electrons. The photocurrents are measured by measuring the electrical currents passing through the detectors 182 and 184 and then averaging to remove high frequency components. The high frequency components can be removed with low pass electrical filters with passbands lower than the bandwidth of the optical modulation.

An algorithm in the FSR phase controller 137 controls the phase delay of the FSR phase element 146 in order to maximize a ratio, difference or normalized difference of the transfer functions. The normalized difference is the difference between the constructive and destructive signal path power-related measurements divided by the sum of the constructive and destructive signal path power-related measurement. The FSR phase controller 137 may be constructed in order to maximize the normalized difference $\Delta B$ measured from the average photocurrents as shown in an equation 7.

$$\Delta B=(A_C-A_D)/(A_C+A_D) \tag{7}$$

The receiver 120 may also include a path for signal quality feedback 192. Data for signal quality is processed through the signal quality feedback 192 and passed to the FSR phase controller 137. The FSR phase controller 137 uses the processed signal quality data for fine tuning the phase delay of the FSR phase element 146 in order to improve and optimize the signal quality. Preferably, the FSR phase element 146 is first tuned in a feedback loop for maximizing a constructive-destructive normalized power difference and then fine tuned for minimizing a bit error ratio (BER). The signal quality data may be obtained by measuring BER directly, by measuring an eye opening ratio of a baseband signal and/or by measuring a signal to noise ratio (SNR) of the optical or electrical constructive and destructive path signals.

The electrical imbalancer 156 includes constructive and destructive variable gain elements 186 and 188 for controlling the electrical gains applied to the signals from the constructive and destructive detectors 182 and 184, respectively, and issuing signals from output ports 143B and 144B. The gains of the elements 186 and 188 may be controlled by the imbalance control algorithm 164 for varying the ratio of the gains for constructive and destructive paths for providing constructive and destructive transfer functions $g_e(f)$ and $h_e(f)$ according to respective equations 8 and 9. In the equations 8 and 9, the electrical gain imbalance, shown with symbol $\beta_e$, varies from minus one to plus one.

$$g_e(f)=1-\beta_e \tag{8}$$

$$h_e(f)=1+\beta_e \tag{9}$$

The imbalance operation may be provided dynamically in a closed loop using active feedback for minimizing the BER from the BER detector 138. Or, the imbalance operation may be "set and forget" (until it is set and forgotten again) after measuring the BER. Or, the imbalance operation may be open loop provided based on calculations from known or measured characteristics of the link 16. The calculations are shown in a FIG. 11 that is described below. The gain elements 186 and 188 may use variable amplification or variable attenuation for providing the gain ratio. Only one of the gain elements 186 and 188 is required to be variable in order to provide the variable gain ratio.

The combiner 136 takes the difference between the electrical signals from the constructive and destructive output ports 143B and 144B and passes the difference as a baseband signal to the data estimator 132. The baseband signal is the demodulated signal corresponding to the input signal 24.

The baseband signal has instantaneous signal levels that in a system with no degradation would be exactly representative of the input data at sample times synchronized to a data clock.

For example at the sample times, one signal level would represent a logical "1" and another signal level would represent a logical "0" for the input data. However, various signal degradations, especially intersymbol interference (ISI) due to the filters 26 in the link 16, cause the signal levels of the baseband signal at the sample times to have many levels and occasionally even have levels where a "1" appears to be a "0" and vice versa. The baseband signal synchronized to the data clock and shown over and over again on the same display appears as an eye diagram where the opening of the eye is a measure of the quality of the demodulated signal.

The data estimator 132 recovers frame and data clock signals and uses error detection and correction techniques for making its best estimate of the input data. Its best estimate of the input data is issued as output data. The BER detector 138 uses error detection and correction information from the date estimator 132 and/or programmed knowledge of expected data bits in the output data for estimating a bit error ratio (BER). For dynamic operation, the BER detector 138 passes the BER to the imbalance control algorithm 164 in the demodulator 130. The function of the BER detector 138 for providing BER measurements or feedback may be replaced or augmented with a device for measuring the signal quality of the baseband signal. The signal quality device and/or measurement may be internal to the receiver 120 or external. Test equipment may be used as an external device for measuring signal quality or BER.

A side effect of changing the selection of the FSR delay Z is that the transfer function phase or FSR phase of the transfer functions G($f$) and H($f$) may slide many cycles with respect to the frequency of the input signal 24. In a general rule, whenever the FSR delay is changed, the transfer function phase shift $\Phi$, or phase shifts $\Phi_G$ and $\Phi_H$, must be re-adjusted by the transfer (FSR) phase controller 137 by adjusting the FSR phase element 146 for re-tuning the transfer functions G($f$) and H($f$) to the frequency of the input optical signal 24. On the other hand the effect of changing the phase shift $\Phi$, or phase shifts $\Phi_G$ and $\Phi_H$, on the FSR bandwidth is so small that it is insignificant The receiver 20,120 includes a microprocessor system for operating the receiver 20,120 according to instructions stored in a memory. These instructions include the above described bandwidth (FSR) control algorithm 33,133, the imbalance control algorithm 64,164 and the signal quality feedback 92,192. Signal quality for the receiver 20,120 may be defined in terms of BER, ISI, eye opening ratio, and/or signal to noise ratio (SNR). Typically the minimum BER, the best compensation for ISI, the largest eye openings and the highest signal to noise ratios (SNR)s of the optical and electrical constructive and destructive path signals are optimized, or nearly optimized, for the same selections and adjustments within the receiver 20,120. The algorithm 192 may operate in a feedback loop for minimizing BER.

FIG. 6A illustrates a delay line interferometer (DLI) 150A as an example of the DLI 150. Elements associated with the DLI 150A that are analogous to elements associated with the DLI 150 are denoted by appending the reference identification numbers with the letter "A". The DLI 150A includes structural elements for an input port 165A, a transfer (FSR) phase element 146A, a mechanism or oven 174A, a partially reflecting first mirror 202A, a second mirror 204A, a third mirror 208A, and constructive and destructive output ports 166A and 168A.

The structural elements of DLI 150A are disposed as follows. The input optical signal 24 illuminates the front side of the partially reflecting first mirror 202A. The first mirror 202A is set at an angle to the path of the optical signal 24 so that part of the signal 24 is reflected as a signal 212A and part of the signal 24 is passed through as a signal 214A. The signal 212A is reflected from the second mirror 204A as a signal 216A back to the front side of the first mirror 202A. The signal 214A illuminates the element 146A and emerges after a fine tune phase delay as a signal 218A. The signal 218A reflects from the third mirror 208A as a signal 222A.

The signal 222A illuminates the element 146A and emerges after the phase delay as a signal 224A. The signal 224A illuminates the back side of the first mirror 202A. Part of the signal 224A is reflected from the back side of the first mirror 202A to combine with part of the signal 216A passed through the front side of the first mirror 202A for providing a signal 226A at the constructive output port 166A. Part of the signal 224A passes through the back side of the first mirror 202A to combine with part of the signal 216A reflected from the front side of the first mirror 202A for providing a signal 228A at the destructive output port 168A.

The elements of the DLI 150A split the input signal 24 into a first path 232A and a second path 234A. The transit time of the first path 232A is the sum of the transit times of the signals 212A and 216A. The transit time of the second path 234A is the sum of the transit times of the signals 214A, 218A, 222A and 224A plus two times the phase delay of the element 146A. The difference between the first and second path transit times is the differential transit time Y that is used for demodulation of the input optical signal 24. The time Y is fine tuned by adjusting the signal phase delay in the element 146A in order to adjust the FSR phase of the DLI 150A for adjusting the transfer function phase of the constructive and destructive transfer functions G($f$) and H($f$) (see FIG. 2).

The material for the element 146A is selected to have an optical index that depends upon temperature. The FSR phase controller 137A provides a control signal to adjust the temperature of the oven 174A in order to fine tune the delay of the element 146A for centering the constructive and destructive transfer functions G($f$) and H($f$) of the DLI 150A on the optical carrier frequency of the input optical signal 24.

FIG. 6B illustrates a delay line interferometer (DLI) 150B as an example of the DLI 150. Elements associated with the DLI 150B that are analogous to elements associated with the DLI 150 are denoted by appending the reference identification numbers by the letter "B". The DLI 150B includes structural elements for an input port 165B, a transfer FSR bandwidth element 148B, a transfer (FSR) phase element 146B, a mechanism or oven 174B, a partially reflecting first mirror 202B, a second mirror 204B, a third mirror 208B, and constructive and destructive output ports 166B and 168B.

The structural elements of DLI 150B are disposed as follows. The input optical signal 24 illuminates the front side of the partially reflecting first mirror 202B. The first mirror 202B is set at an angle to the path of the optical signal 24 so that part of the signal 24 is reflected as a signal 212B and part of the signal 24 is passed through as a signal 214B. The signal 212B is reflected from the second mirror 204B as a signal 216B back to the front side of the first mirror 202B. The signal 214B illuminates the element 148B and emerges after the delay Z as a signal 217B. The signal 217B illuminates the element 146B and emerges after a fine tune phase delay as a signal 218B. The signal 218B reflects from the third mirror 208B as a signal 222B.

The signal 222B illuminates the element 146B and emerges after the phase delay as a signal 223B. The signal 223B illuminates the element 148B and emerges after the delay Z as a signal 224B. The signal 224B illuminates the back side of the first mirror 202B. Part of the signal 224B is reflected from the back side of the first mirror 202B to combine with part of the signal 216B passed through the front side of the first mirror 202B for providing a signal 226B at the constructive output port 166B. Part of the signal 224B passes through the back side of the first mirror 202B to combine with part of the signal 216B reflected from the front side of the first mirror 202B for providing a signal 228B at the destructive output port 168B.

The elements of the DLI 150B split the input signal 24 into a first path 232B and a second path 234B. The transit time of the first path 232B is the sum of the transit times of the signals 212B and 216B. The transit time of the second path 234B is the sum of the transit times of the signals 214B, 217B, 218B, 222B, 223B and 224B plus two times the phase delay of the element 146B plus two times the delay Z. The difference between the first and second path transit times is the differential transit time Y that is used for demodulation of the input optical signal 24. The FSR delay Z is a part of the transit time difference Y. A bandwidth (FSR) control algorithm 133B (FIG. 10) provides a calculation or control signal for providing the time Y by selecting or adjusting the delay Z of the element 148B in order to select or adjust the FSR and the bandwidths of the constructive and destructive transfer functions $G(f)$ and $H(f)$ (FIG. 2) for the DLI 150B.

The material for the element 146B is selected to have an optical index that depends upon temperature. The FSR phase controller 137B provides a control signal to adjust the temperature of the oven 174B in order to fine tune the delay of the element 146B for centering the constructive and destructive transfer functions $G(f)$ and $H(f)$ (FIG. 2) of the DLI 150B on the optical carrier frequency of the input optical signal 24.

FIG. 6C illustrates a delay line interferometer (DLI) 150C as an example of the DLI 150. Elements associated with the DLI 150C that are analogous to elements associated with the DLI 150 are denoted by appending the reference identification numbers by the letter "C". The DLI 150C includes structural elements for an input port 165C, a combined transfer FSR bandwidth element and phase element 148C,146C, a mechanism or oven 174C, a partially reflecting first mirror 202C, a second mirror 204C, a third mirror 208C, and constructive and destructive output ports 166C and 168C.

The structural elements of DLI 150C are disposed as follows. The input optical signal 24 illuminates the front side of the partially reflecting first mirror 202C. The first mirror 202C is set at an angle to the path of the optical signal 24 so that part of the signal 24 is reflected as a signal 212C and part of the signal 24 is passed through as a signal 214C. The signal 212C is reflected from the second mirror 204C as a signal 216C back to the front side of the first mirror 202C. The signal 214C illuminates the element 148C,146C and emerges after the delay Z and an adjustment by the fine tune phase delay as a signal 218C. The signal 218C reflects from the third mirror 208C as a signal 222C.

The signal 222C illuminates the element 148C,146C and emerges after the delay Z and an adjustment by the phase delay as a signal 224C. The signal 224C illuminates the back side of the first mirror 202C. Part of the signal 224C is reflected from the back side of the first mirror 202C to combine with part of the signal 216C passed through the front side of the first mirror 202C for providing a signal 226C at the constructive output port 166C. Part of the signal 224C passes through the back side of the first mirror 202C to combine with part of the signal 216C reflected from the front side of the first mirror 202C for providing a signal 228C at the destructive output port 168C.

The elements of the DLI 150C split the input signal 24 into a first path 232C and a second path 234C. The transit time of the first path 232C is the sum of the transit times of the signals 212C and 216C. The transit time of the second path 234C is the sum of the transit times of the signals 214C, 218C, 222C and 224C plus two times the delay Z with the adjustment of the phase delay of the element 148C,146C. The difference between the first and second path transit times is the differential transit time Y that is used for demodulation of the input optical signal 24. The FSR delay Z is a part of the transit time difference Y. A bandwidth (FSR) control algorithm 133C (FIG. 10) provides a calculation or control signal for providing the time Y by selecting or adjusting the delay Z of the element 148C,146C in order to select or adjust the FSR and the bandwidths of the constructive and destructive transfer functions $G(f)$ and $H(f)$ (FIG. 2) for the DLI 150C.

The material for the element 148C,146C is selected to have an optical index that depends upon temperature. The FSR phase controller 137C provides a control signal to adjust the temperature of the oven 174C in order to fine tune the phase delay of the element 146C for centering the constructive and destructive transfer functions $G(f)$ and $H(f)$ (FIG. 2) of the DLI 150C on the optical carrier frequency of the input optical signal 24.

FIG. 6D illustrates a delay line interferometer (DLI) 150D as an example of the DLI 150 having discrete steps for free spectral range. Elements of the DLI 150D that are analogous to elements of the DLI 150 are denoted by appending the reference identification numbers by the letter "D". The DLI 150D includes a transfer FSR bandwidth element 148D. The transfer FSR bandwidth element 148D, also known as the delay element 148D, has a stair step cross section. The element 148D is positionable for providing discrete fixed steps for the delay Z by positioning the element 148D with respect to signals within the DLI 150E.

The DLI 150D includes an input port 165D, a transfer (FSR) phase element 146D, the positionable delay element 148D, a mechanism or oven 174D, a positioning device 175D, a partially reflecting first mirror 202D, a second mirror 204D, a third mirror 208D, and constructive and destructive output ports 166D and 168D disposed as follows. The input optical signal 24 illuminates the front side of the partially reflecting first mirror 202D. The first mirror 202D is set at an angle to the path of the optical signal 24 so that part of the signal 24 is reflected as a signal 212D and part of the signal 24 is passed through as a signal 214D. The signal 212D is reflected from the second mirror 204D as a signal 216D back to the front side of the first mirror 202D. The signal 214D illuminates the element 148D and emerges after the FSR delay Z as a signal 217D. The signal 217D illuminates the element 146D and emerges after an adjustable fine tuning delay as a signal 218D. The signal 218D reflects from the third mirror 208D as a signal 222D.

The signal 222D illuminates the element 146D and emerges after the phase delay as a signal 223D. The signal 223D illuminates the element 148D and emerges after the FSR delay Z as a signal 224D. The signal 224D illuminates the back side of the first mirror 202D. Part of the signal 224D is reflected from the back side of the first mirror 202D to combine with part of the signal 216D passed through the front side of the first mirror 202D for providing a signal 226D at the constructive output port 166D. Part of the signal 224D passes through the back side of the first mirror 202D to combine with part of the signal 216D reflected from the front side of the first mirror 202D for providing a signal 228D at the destructive output port 168D. Typically, the elements 148D and 146D have bulk optical group indices (time delay equals group index multiplied by distance divided by the speed of light in a vacuum) that are much greater than the group indices experienced by the signals 212D, 216D, 214D, 217D, 218D, 222D, 223D and 224D outside of the elements 148D and 146D.

The elements of the DLI 150D split the input signal 24 into a first path 232D and a second path 234D. The transit time of the first path 232D is the sum of the transit times of the signals 212D and 216D. The transit time of the second path 234D is the sum of the transit times of the signals 214D, 217D, 218D, 222D, 223D and 224D plus two times the adjustable delay of the element 146D plus two times the FSR delay Z of the element 148D. The difference between the first and second path transit times is the differential transit time Y that is used for demodulation of the input optical signal 24. Either or both of the elements 146D and 148D may be constructed in two pieces, one in the signal path 232D and one in the signal path 234D, for providing a signal delay that is the difference between the signal delays of the two element pieces.

The element 148D has a stair step cross section having two or more stair risers 242D and stair treads 244D. Alternatively, the element 148D may have segments having different group indices. The positioning device 175D positions the element 148D so that the signal 214D enters the element 148D at one of the risers 242D and the signal 224D emerges from the element 148D at one of the risers 242D. Alternatively, the stairway is on the opposite side of the element 148D so the signal 223D enters and the signal 217D emerges from the element 148D at one of the risers 242D. The delay step sizes are proportional to the physical lengths of the treads 244D.

The positioning device 175D stepwise positions the element 148D in a direction approximately perpendicular to the signals 214D, 217D, 223D and 224D in order to increase or decrease the effective optical length of the element 148D in order to increase or decrease the FSR delay Z. The discrete steps of the delay Z provide discrete steps of the differential transit time Y, thereby providing discrete steps in the FSR bandwidths of the constructive and destructive transfer functions G(f) and H(f) for the DLI 150D. Discrete steps may be beneficial to provide immunity to jitter in the position of the element 148D.

A bandwidth (FSR) control algorithm 133D controls the positioning device 175D for positioning the element 148D. The control algorithm 133D may be external to the receiver 20,120 or included within the receiver 20,120. A technician uses information from the control algorithm 133D to operate the positioning device 175D or the information from the control algorithm 133D is part of a feedback loop for automatic operation of the positioning device 175D.

The material for the element 146D is selected to have a group index that depends upon temperature. The FSR phase controller 137D provides a control signal to adjust the temperature of the oven 174D in order to fine tune the delay of the element 146D for centering the constructive and destructive transfer functions G(f) and H(f) of the DLI 150D on the optical carrier frequency of the input optical signal 24. The functions of the transfer phase element 146D and the stepped FSR delay element 148D may be combined (as shown in the FIG. 6C for the element 146C and 148C) with the use of a material having temperature-dependent group index for the element 148D.

FIG. 6E illustrates a delay line interferometer (DLI) 150E as an example of the DLI 150 having a smooth gradient of adjustment for free spectral range. Elements associated with the DLI 150E that are analogous to elements associated with the DLI 150 are denoted by appending the reference identification numbers by the letter "E". The DLI 150E includes a transfer FSR bandwidth element 148E. The transfer FSR bandwidth element 148E, also known as the delay element 148E, has a cross section having a smooth change or gradient. The element 148E is positionable for providing a continuous variation of the delay Z by positioning the element 148E with respect to signals within the DLI 150E.

The DLI 150E includes an input port 165E, a transfer (FSR) phase element 146E, the positionable delay element 148E, a mechanism or oven 174E, a positioning device 175E, a partially reflecting first mirror 202E, a second mirror 204E, a third mirror 208E, and constructive and destructive output ports 166E and 168E disposed as follows. The input optical signal 24 illuminates the front side of the partially reflecting first mirror 202E. The first mirror 202E is set at an angle to the path of the optical signal 24 so that part of the signal 24 is reflected as a signal 212E and part of the signal 24 is passed through as a signal 214E. The signal 212E is reflected from the second mirror 204E as a signal 216E back to the front side of the first mirror 202E. The signal 214E illuminates the element 148E and emerges after the FSR delay Z as a signal 217E. The signal 217E illuminates the element 146E and emerges after an adjustable fine tuning delay as a signal 218E. The signal 218E reflects from the third mirror 208E as a signal 222E.

The signal 222E illuminates the element 146E and emerges after the phase delay as a signal 223E. The signal 223E illuminates the element 148E and emerges after the FSR delay Z as a signal 224E. The signal 224E illuminates the back side of the first mirror 202E. Part of the signal 224E is reflected from the back side of the first mirror 202E to combine with part of the signal 216E passed through the front side of the first mirror 202E for providing a signal 226E at the constructive output port 166E. Part of the signal 224E passes through the back side of the first mirror 202E to combine with part of the signal 216E reflected from the front side of the first mirror 202E for providing a signal 228E at the destructive output port 168E. Typically, the elements 148E and 146E have bulk group indices that are much greater than the group indices experienced by the signals 212E, 216E, 214E, 217E, 218E, 222E, 223E and 224E outside the delay elements 148E and 146E.

The elements of the DLI 150E split the input signal 24 into a first path 232E and a second path 234E. The transit time of the first path 232E is the sum of the transit times of the signals 212E and 216E. The transit time of the second path 234E is the sum of the transit times of the signals 214E, 217E, 218E, 222E, 223E and 224E plus two times the adjustable delay of the element 146E plus two times the FSR delay Z of the element 148E. The difference between the first and second path transit times is the differential transit time Y that is used for demodulation of the input optical signal 24. Either or both of the elements 146E and 148E may be constructed in two pieces, one in the signal path 232E and one in the signal path 234E, for providing a signal delay that is the difference between the signal delays of the two element pieces.

The element 148E has a cross section having a smooth change or gradient of physical length in order to provide a continuously variable optical delay. Alternatively, the element 148E may have a smooth gradient of optical group index. The positioning device 175E moves the element 148E in a direction perpendicular to the signals 214E, 217E, 223E and 224E in order to increase or decrease the effective optical length of the element 148E in order to increase or decrease the FSR delay Z. The continuously variable FSR delay Z provides a continuously variable differential transit time Y, thereby providing a smooth, continuously variable FSR bandwidth for the constructive and destructive transfer functions G(f) and H(f) for the DLI 150E.

A bandwidth (FSR) control algorithm 133E controls the positioning device 175E for positioning the element 148E. The control algorithm 133E may be external to the receiver 20,120 or included within the receiver 20,120. A technician uses information from the control algorithm 133E to operate the positioning device 175E or the information from the control algorithm 133E operates the positioning device 175E automatically to move the element 148E more or less perpendicular to the optical signals 214E, 217E, 223E and 224E.

The material for the element 146E is selected to have an optical group index that depends upon temperature. The FSR phase controller 137E provides a control signal to adjust the temperature of the oven 174E in order to fine tune the delay of the element 146E for centering the constructive and destructive transfer functions $G(f)$ and $H(f)$ of the DLI 150E on the optical carrier frequency of the input optical signal 24.

The elements 148E and 146E may be combined (as shown in FIG. 6C for the elements 146C and 148C) into a single element having an effective optical length for providing the FSR delay Z of the element 148E and the fine tuned FSR phase adjustment of the element 146E. Further, the device positioner 175E may provide the fine phase delay control by finely positioning the element 148E.

FIG. 6F illustrates a delay line interferometer (DLI) 150F as an example of the DLI 150 having a movable mirror 208F for selection or adjustment of free spectral range. Elements associated with the DLI 150F that are analogous to elements associated with the DLI 150 are denoted by appending the reference identification numbers by the letter "F". The movable mirror 208F acts as a transfer FSR bandwidth element by providing a selectable optical length in a signal path in the DLI 150F. The adjustment in the optical length provides control of the free spectral range of the DLI 150F by controlling the delay Z between the two signal paths in the DLI 150F. The delay Z is selected by selecting a position 246F of the mirror 208F with respect to the signal path.

The DLI 150F includes an input port 165F, a transfer (FSR) phase element 146F, a mechanism or oven 174F, a positioning device 175F, a partially reflecting first mirror 202F, a second mirror 204F, the movable third mirror 208F, and constructive and destructive output ports 166F and 168F disposed as follows. The input optical signal 24 illuminates the front side of the partially reflecting first mirror 202F. The first mirror 202F is set at an angle to the path of the optical signal 24 so that part of the signal 24 is reflected as a signal 212F and part of the signal 24 is passed through as a signal 214F. The signal 212F is reflected from the second mirror 204F as a signal 216F back to the front side of the first mirror 202F. The signal 214F illuminates the element 146F and emerges after a fine tune signal delay as a signal 218F. The signal 218F passes through the delay Z to reflect from the third mirror 208F as a signal 222F.

The signal 222F passes through the delay Z to illuminate the element 146F and emerges after the phase delay as a signal 224F. Part of the signal 224F is reflected from the back side of the first mirror 202F to combine with part of the signal 216F passed through the front side of the first mirror 202F for providing a signal 226F at the constructive output port 166F. Part of the signal 224F passes through the back side of the first mirror 202F to combine with part of the signal 216F reflected from the front side of the first mirror 202F for providing a signal 228F at the destructive output port 168F. Typically, the element 146F has a group index much greater than the group indices experienced by the signals 212F, 216F, 214F, 218F, 222F and 224F outside the delay element 146F.

The elements of the DLI 150F split the input signal 24 into a first path 232F and a second path 234F. The transit time of the first path 232F is the sum of the transit times of the signals 212F and 216F. The transit time of the second path 234F is the sum of the transit times of the signals 214F, 218F, 222F and 224F plus two times the phase delay of the element 146F plus two times the FSR delay Z of the mechanical length adjustment of the movable mirror 208F. The difference between the first and second path transit times is the differential transit time Y that is used for demodulation of the input optical signal 24. The element 146F may have one piece in the signal path 232F and one piece in the signal path 234F for fine tuning a signal delay that is the difference between the signal delays in the two paths 232F and 234F. Either or both of the mirror 204F and 208F may be constructed as moving mirrors having a selectable position 246F.

The positioning device 175F moves the mirror 208F in the direction of the signals 218F and 222F in order to increase or decrease the effective optical length between the signal paths 232F and 234F of the DLI 150F in order to increase or decrease the FSR delay Z. The continuously variable FSR delay Z provides a continuously variable differential transit time Y, thereby providing a smooth, continuously variable FSR bandwidth for the constructive and destructive transfer functions $G(f)$ and $H(f)$ for the DLI 150F.

A bandwidth (FSR) control algorithm 133F controls the positioning device 175F for positioning the mirror 208F. The control algorithm 133F may be external to the receiver 20,120 or included within the receiver 20,120. A technician uses information from the control algorithm 133F to operate the positioning device 175F or the information from the control algorithm 133F operates the positioning device 175F automatically to move the element 148F to shorten or lengthen the distance traveled by the optical signals 218F and 222F. The positioning device 175F may be constructed in a manner similar to the construction described below for the positioning device 175D.

The material for the element 146F is selected to have an optical group index that depends upon temperature. The FSR phase controller 137F provides a control signal to adjust the temperature of the oven 174F in order to fine tune the delay of the element 146F for centering the constructive and destructive transfer functions $G(f)$ and $H(f)$ of the DLI 150F on the optical carrier frequency of the input optical signal 24. The movable mirror 208F may combine the functions for selecting the FSR delay Z and fine tuning the FSR phase.

Figure 7:
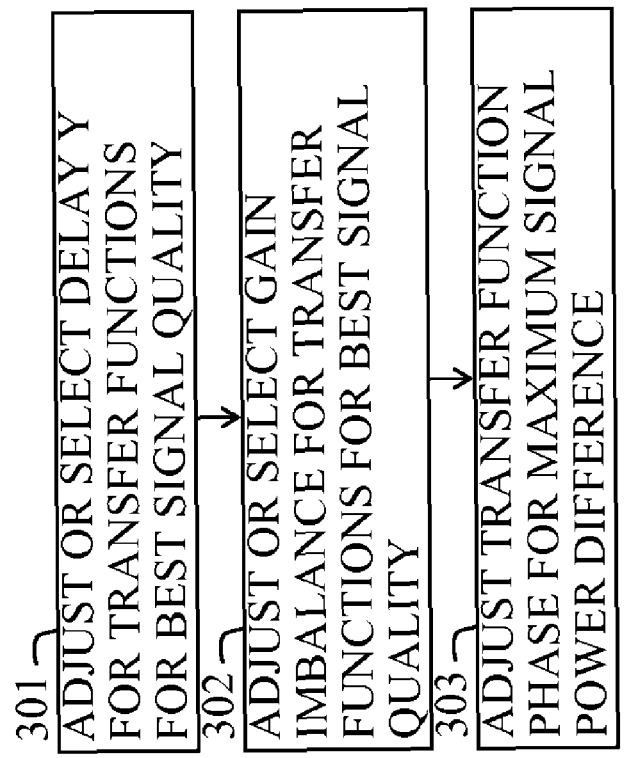
FIG. 7 is a simplified flow chart of an exemplary method for receiving a modulated optical signal.

FIG. 7 is a simplified flow chart of an example of a method for receiving a differential phase shift keyed (DPSK) optical signal transmitted through a transmission link channel. One or any combination of these steps may be stored on a tangible medium 300 in a computer-readable form as instructions to a computer for carrying out the steps.

In a step 301 constructive and destructive transfer functions are calculated, looked up in a table based on calculations, or actively tuned for minimizing the effect of intersymbol interference (ISI) for improving signal quality. The transfer functions may be implemented by selecting a delay Z in a signal path of a delay line interferometer (DLI) in order to select the free spectral range (FSR) of the DLI. The delay Z contributes to a differential time Y, in general not equal to a DPSK symbol time T, for providing differential demodulation. The signal quality may be determined in terms of bit error ratio (BER) for output data. In a first embodiment the delay Z is selected by dynamically adjusting the delay Z with feedback from a signal quality measurement in order to minimize the BER. In a second embodiment the delay Z is selected by trial and error in order to minimize a measured BER. In a third embodiment the delay Z is selected based upon a BER measurement on another optical transmission link channel where the other channel is known to have the same channel bandwidth. In a fourth embodiment the delay Z is selected by calculating from a known channel or spectrum bandwidth. In a fifth embodiment the delay Z is selected from a table having calculations based on channel bandwidth or spectrum for minimizing BER. The calculations for FSR are shown in the chart of FIG. 10. Signal quality analysis and measurements other than BER, such as measurements of eye openings, may be used in place of, or to augment BER detection for the selection, adjustment or control of the delay Z. The user should be aware that the receiver 20 may lose lock on the input signal 24 when a new FSR delay Z is selected.

Figure 11:
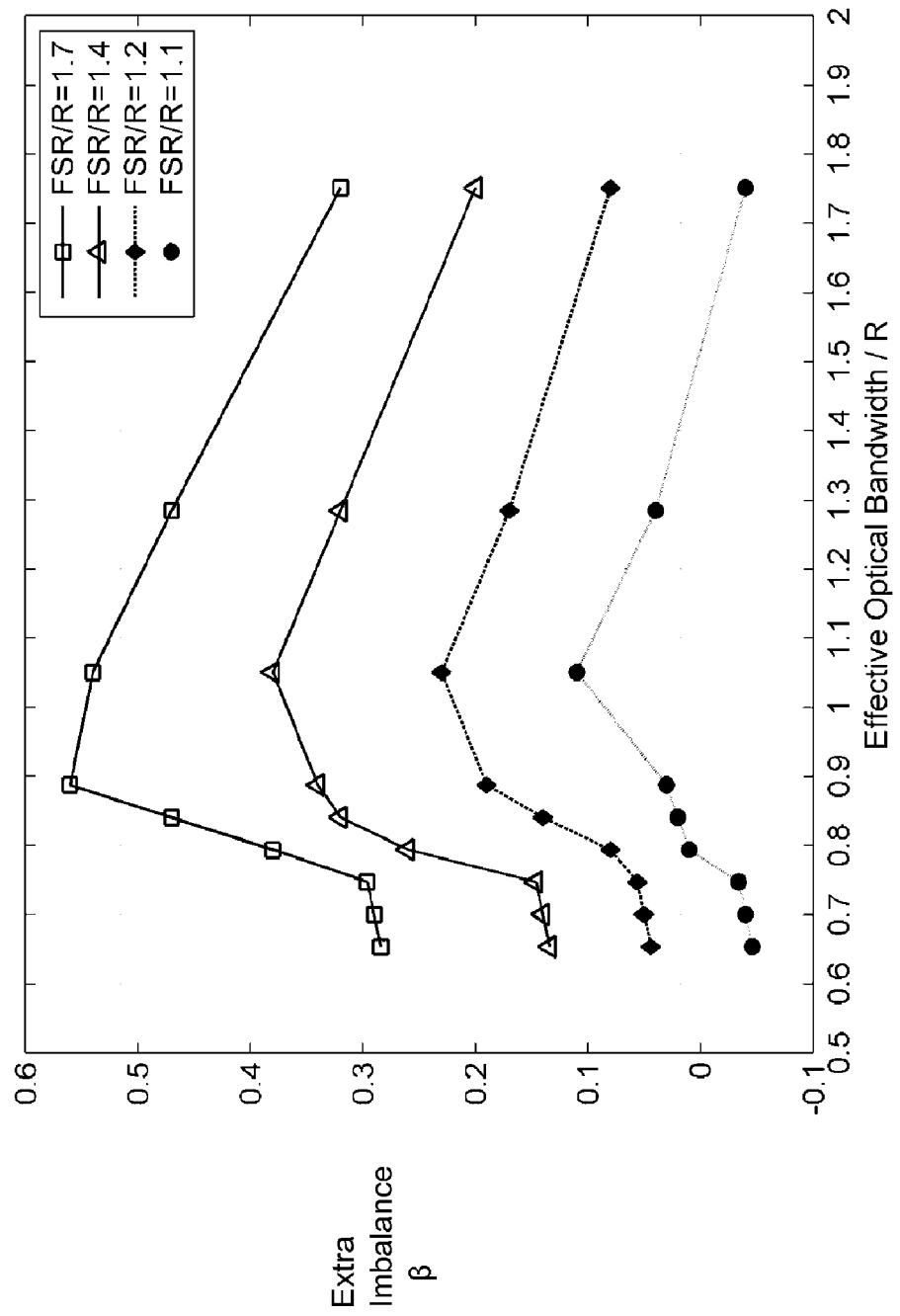
FIG. 11 is a chart showing a calculation of gain imbalance based on system bandwidth and FSR in order to compensate for the ISI in the system of FIG. 3.

In a step 302 an optical gain imbalance between constructive and destructive output port signals is selected (as described above for the FSR delay Z) for best signal quality. The calculations for gain imbalance are shown in FIG. 11. The signal quality may be determined as described above.

In a step 303 the phase of the constructive and destructive transfer functions is adjusted for maximizing the signal power difference between optical constructive and destructive path signals. The transfer function phases may be adjusted as FSR phases while the system is in operation for providing output data without overly degrading the output data by fine tuning the delay of a signal delay element in a signal path in the DLI. Optionally, the FSR phase is further tuned for best signal quality. The FSR phase adjustment tunes the constructive and destructive transfer functions relative to the carrier frequency of the input optical signal.

Figure 8:
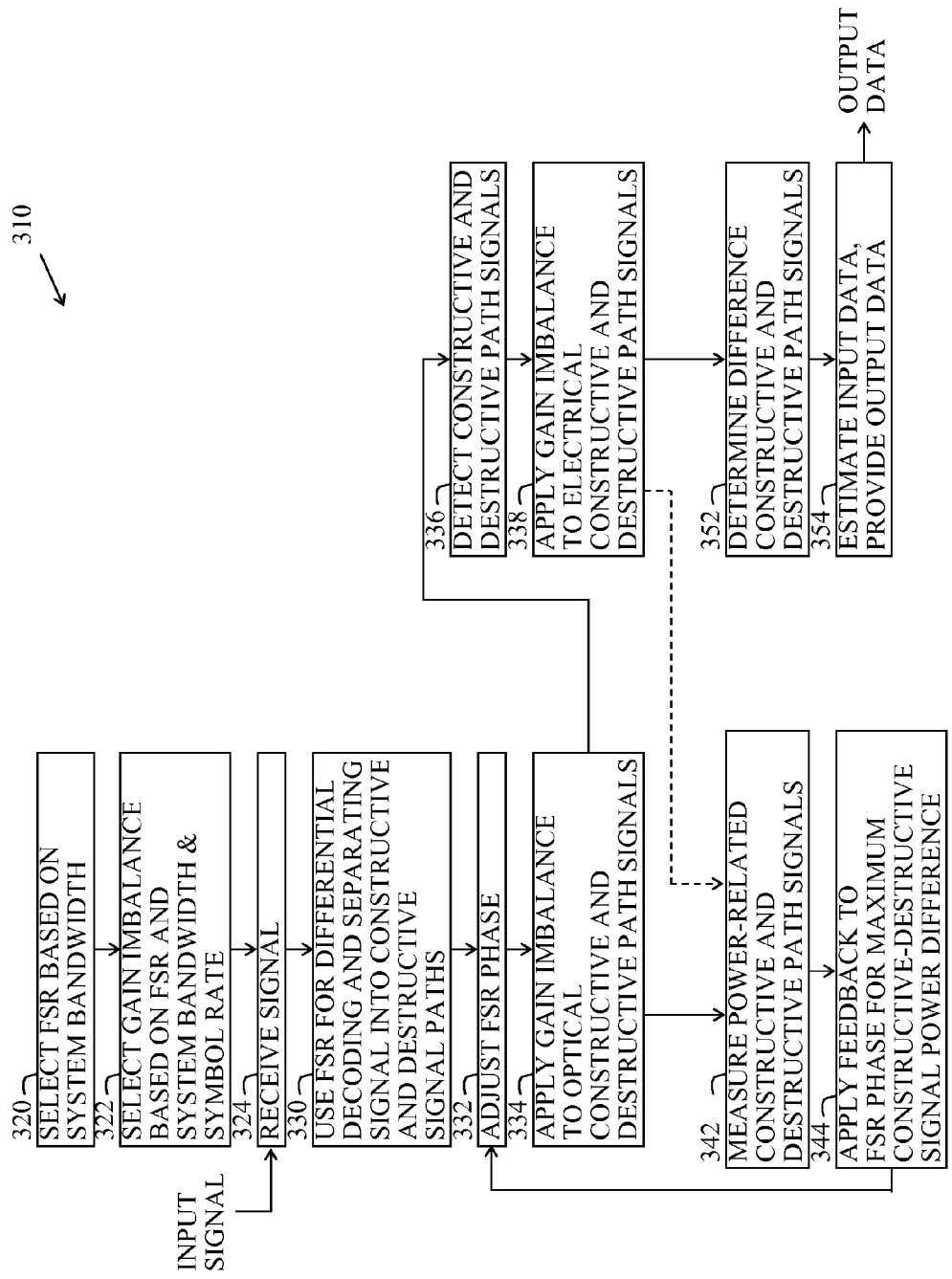
FIG. 8 is a flow chart of an exemplary method using a calculated FSR and a calculated gain imbalance.

FIG. 8 is a flow chart of an example of a method using a calculated FSR and a calculated gain imbalance for receiving a differential phase shift keyed (DPSK) optical signal transmitted through a transmission link channel. Any one or more of these steps may be stored on a tangible medium 310 in a computer-readable form as instructions that may be read by a computer for carrying out the steps. The reader may refer to the descriptions of the system 10 and optical receivers 20 and 120 for further details of the following steps.

Either during design, test or installation in a step 320 a free spectral range (FSR) of a delay line interferometer (DLI) is calculated based on characteristics, particularly the bandwidth of the link 16, for the transmission system 10 for obtaining the best signal quality and/or lowest bit error ratio (BER). In a step 322 optical and/or electrical gain imbalances are calculated based on the FSR of the DLI, the symbol rate R, and the characteristics of the transmission system 10, particularly the bandwidth of the filters 26, for obtaining the best signal quality and/or lowest bit error ratio (BER).

In operation the receiver 20,120 receives the modulated input signal 24 in a step 324. In a step 330 the DLI having the pre-calculated FSR differentially decodes the signal 24 and uses optical interference for separating the signal into constructive and destructive signal paths. In a step 332 the FSR phase is adjusted for tuning the FSR transfer functions relative to the carrier of the signal 24. In a step 334 the optical gain imbalance is applied to the signals in the constructive and destructive signal paths for providing optical constructive and destructive signal outputs.

The modulations of the signals at the optical constructive and destructive signal outputs are converted to electrical signals in a step 336. In a step 338 the electrical gain imbalance is applied to the signals in the constructive and destructive signal paths for providing electrical constructive and destructive signal outputs.

Power-related measurements are detected in a step 342 for the signals at the constructive and destructive signal outputs. When the gain imbalance is applied to the electrical signals, the electrical output signals are measured. When the gain imbalance is applied to the optical signals but not the electrical signals, either the optical or the electrical output signals may be measured. In one embodiment, the gain is applied to the optical signals and the power-related detections are measurements of the average photocurrents for converting the optical modulation to electrical signals. In a step 344 a normalized difference between the power-related measurements is applied to adjust the FSR phase for the step 332. In a step 352 the electrical constructive and destructive path signals are combined by taking the difference of the signals. The difference is issued as a baseband signal. Finally, in a step 354 the input data from the transmitter 12 is estimated from the baseband signal for providing output data.

Figure 9:
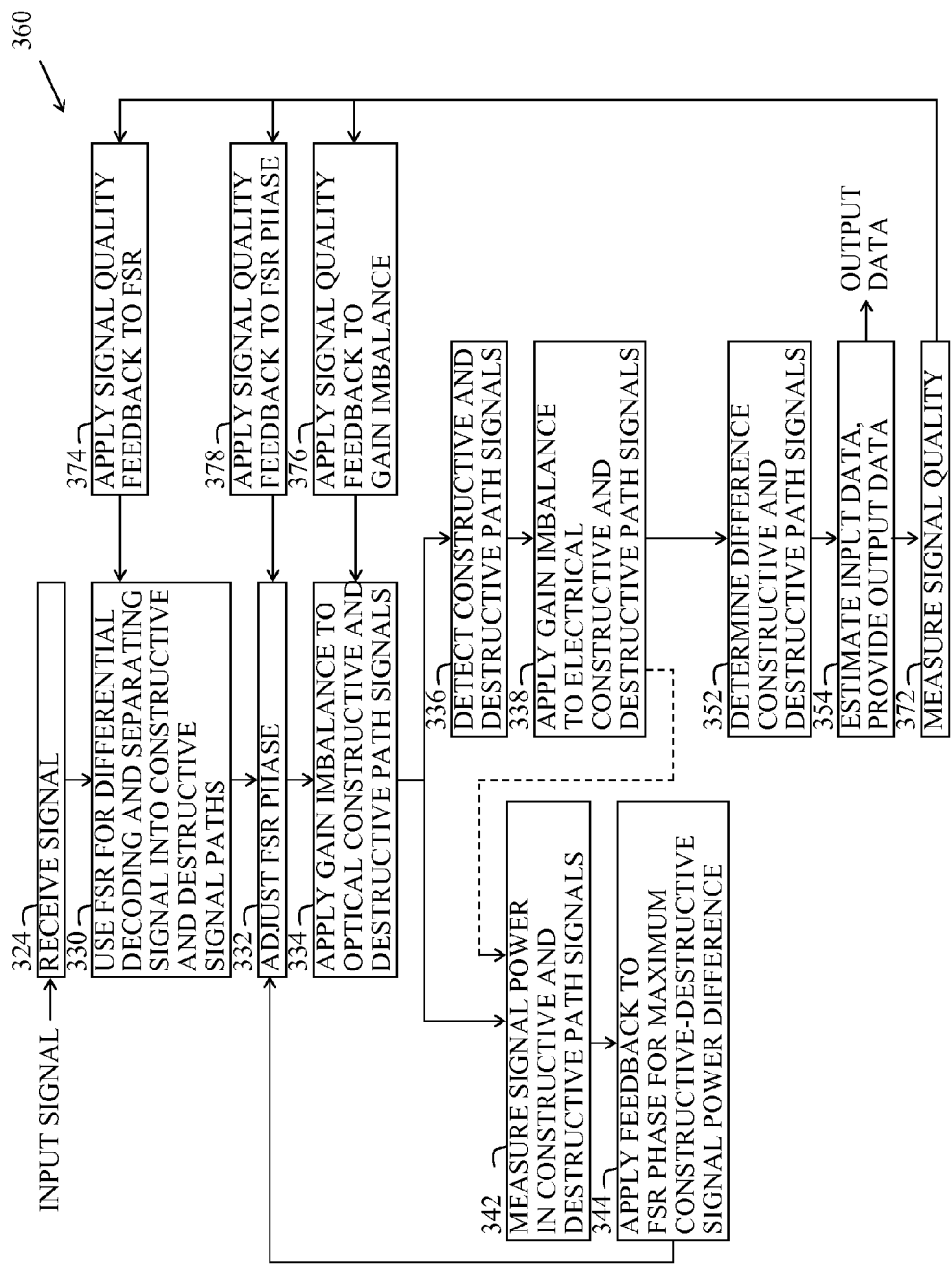
FIG. 9 is a flow chart of an exemplary method where the FSR and the gain imbalance are adjusted for best signal quality.

FIG. 9 is a flow chart of an example of a dynamic method where the FSR and the gain imbalance are adjusted according to BER for receiving a differential phase shift keyed (DPSK) optical signal transmitted through a transmission link channel while attempts are being made for transmitting data through the system 10. Any one or more of these steps may be stored on a tangible medium 360 in a computer-readable form as instructions that may be read by a computer for carrying out the steps. The reader may refer to the descriptions of the system 10 and optical receivers 20 and 120 for further details of the following steps. It should be noted that the data may require several re-transmissions as the receiver 20,120 is being adjusted.

The input signal 24 is received at the start in the step 324. In the step 330 the DLI differentially decodes the signal 24 and uses optical interference for separating the signal into constructive and destructive signal paths. In the step 332 the FSR phase is adjusted for tuning the FSR transfer functions relative to the carrier of the signal 24. For a symmetrical signal spectrum, the FSR phase is tuned for centering the FSR transfer functions to the carrier of the signal 24. In the step 334 the optical gain imbalance is applied to the signals in the constructive and destructive signal paths for providing optical constructive and destructive signal outputs.

The modulations of the signals at the optical constructive and destructive signal outputs are converted to electrical signals in the step 336. In the step 338 the electrical gain imbalance is applied to the signals in the constructive and destructive signal paths for providing electrical constructive and destructive signal outputs.

Power-related measurements are detected in the step 342 for the signals at the constructive and destructive signal outputs. When the gain imbalance is applied to the electrical signals, the electrical output signals are measured. When gain imbalance is applied to the optical signals but not the electrical signals, either the optical or the electrical output signals may be measured. In one embodiment, the gain is applied to the optical signals and the power-related detections are measurements of the average photocurrents for converting the optical modulation to electrical signals. In the step 344 a normalized difference between the power-related measurements is applied to adjust the FSR phase for the step 332. In a step 352 the electrical constructive and destructive path signals are combined by taking the difference of the signals. The difference is issued as a baseband signal.

The difference of the constructive and destructive electrical signal outputs is determined in the step 352 for providing a baseband signal. In the step 354 the input data from the transmitter 12 is estimated from the baseband signal for providing output data.

A signal quality determined from the optical or electrical signals, or a bit error ratio (BER), is measured for the output data in a step 372. In a step 374, feedback for the signal quality or BER is applied to adjust the FSR used in the step 330. In a step 376 feedback for the signal quality is applied to adjust the optical and/or gain imbalance for the step 334. And optionally, in a step 378 feedback for the signal quality is applied to adjust the FSR phase for the step 332. The steps 330, 332 and/or 334 may be iterated until no further improvement in signal quality is detected. Whenever the FSR is changed due to a new selection or adjustment in the step 330, the FSR phase must be re-tuned in the step 332.

FIG. 10 is an exemplary chart for the bandwidth (FSR) control algorithms 33 and 133 for calculating the optimum FSR for the DLI 150 (FIGS. 4, 5 and 6A-C) based on the effective optical bandwidth of the system 10. The FSR and the bandwidth are normalized to the symbol rate R (the inverse of the symbol time T) of the system 10. It can be seen that the optimum FSR is at least 10% greater than the symbol rate R. It can also be seen that the optimum FSR is at least 20% greater than the symbol rate R when the effective optical bandwidth of the system 10 is less than the symbol rate R. It should be noted that the FSR/R levels of 1, 1.1, 1.2, 1.3, 1.4, 1.5, 1.6, 1.7, 1.8, 1.9 and 2 are provided by differential demodulation transit times of about 90.9%, 83.3%, 76.9%, 71.4%, 66.7%, 62.5%, 58.8%, 55.6%, 52.6% and 50%, respectively, of the symbol time T for the modulated optical input signal 24.

FIG. 11 is an exemplary chart for the gain imbalance control algorithms 64 and 164 for the calculating the extra gain imbalance to be applied by the optical imbalancer 152 and/or the electrical imbalancer 156. The gain imbalance term $\beta$ is calculated from the FSR for the DLI 150, the effective optical bandwidth of the system 10, and the symbol rate R of the system 10.

FIGS. 12A-E illustrate examples of the stepped and smooth gradient delay elements 148D and 148E, respectively. Signals 400 in a first direction 402 traverse the effective optical lengths of the elements 148D and 148E. The element 148D has a stepped gradient of effective optical length for providing discrete increments of the delay Z. The element 148E has a smooth gradient of effective optical length for providing the delay Z as a continuously variable quantity.

The elements 148D and 148E are positioned in a second direction 404 by the positioning devices 175D and 175E for selecting the delay Z for providing a desired transit time difference Y between the signal paths 232D and 234D in the DLI 150D or the signal paths 232E and 234E in the DLI 150E. The second direction 404 is about perpendicular to the first direction 402. The term "gradient" denotes the change of signal delay of the element 148D,148E with respect to a change in position of the element 148D,148E in the second direction 404. In various embodiments the delay Z can be varied over a range of one, two, five, ten or twenty picoseconds. The delay steps of the element 148D are typically about one-quarter to five picoseconds for a channel bandwidth of 50 GHz but may be as small as 20 femtoseconds (fs) or even less. In terms of a modulation symbol time, the delay steps are typically one to twenty percent of the modulation symbol time for the modulated optical input signal but may be as small as 0.025% or even less. With respect to the channel bandwidth or modulation bandwidth for the modulated optical input signal 24, the delay steps are typically one to twenty percent but may be as small as 0.025% or even less of the inverse of the bandwidth.

The positioning device 175D has a means of nudging or positioning the elements 148D and 148E in the second direction 404. For good position control, the positioning device 175D may have a screw 423. Manual operation by a technician or a stepping motor 424 controls a rotation 433 of the screw 423 to push or pull the element 148D in the second direction 404 based information from the bandwidth FSR control algorithm 133D. Brackets 426 retain the screw 423 and the motor 424 in a DLI housing with respect to the signals 400. The positioning device 175E may be constructed in a similar way. Some fixing means, such as tie down straps, fix the elements 148D and 148E once the elements 148D are 148E are properly positioned. The fixing means and/or brackets 426 may require shock absorption material to isolate the element 148D and 148E from mechanical vibration of the DLI housing.

FIG. 12A illustrates the delay element 148D (FIG. 6D) with stair steps 406 having risers 242D perpendicular to the first direction 402 and treads 244D about parallel to the first direction 402. The signals 400 traverse the element 148D with entry or exit points at the risers 242D. The sizes of the steps of the delay Z are proportional to the lengths of the treads 244D projected into the first direction 402. A side 408 of the element 148D opposite to the risers 242D is parallel to the risers 242D in order to minimize jitter in the delay Z that might occur due to mechanical vibration of the receiver 20,120. Increasing the heights of the risers 242D increases immunity to mechanical shocks or large amplitude vibrations for the delay Z.

FIG. 12B illustrates a variation of the stepped delay element 148D denoted as an element 148D1. The element 148D1 has segments 242D1 disposed one above the other in the second direction 404 having different optical group indices; where the optical delay Z in a segment 242D1 is proportional to the physical length of the element 148D1 traversed by the signals 400 multiplied by the group index of the segment 242D1. The sides of the element 148D1 where the signals 400 enter and exit the element 148D1 are parallel in order to minimize the jitter in the delay Z caused by mechanical vibration of the receiver 20,120. Increasing the heights of the segments 242D1 in the second direction 404 increases immunity for the delay Z to mechanical shocks or large amplitude vibrations.

FIG. 12C illustrates the delay element 148E having a triangular cross section. A continuous smooth variation of the position of the element 148E in the second direction 404 provides a continuous smooth variation of the delay Z.

FIG. 12D illustrates a variation of the delay element 148E, denoted as an element 148E1, having a trapezoidal cross section. A continuous smooth variation of the position of the element 148E in the second direction 404 provides a continuous smooth variation of the delay Z.

FIG. 12E illustrates a variation of the delay element 148E, denoted as an element 148E2, having two elements 409 and 410 having triangular cross sections that are inverted with respect to each other. The element 409 has a fixed position and the element 410 is positionable in the second direction 404. The signals 400 pass through both elements 409 and 410 in the first direction 402 for a combined delay Z.

The elements 409 and 410 induce wavelength dependent beam deviation angles 411 and 412, respectively, due to the refractive indices of the materials and the gradient angles between the sides of the materials and the signals 400. The materials and the gradient angles may be selected so that the wavelength dependence of the beam deviation angle 411 compensates for the wavelength dependence of the beam deviation angle 412 for providing a signal path that is largely independent of wavelength.

First and second sides of the fixed element 409 are denoted as sides 413 and 414 and first and second sides of the positionable element 410 are denoted as sides 415 and 416. For the same material for the elements 409 and 410, the sides 413 and 415 may be about parallel and the sides 414 and 416 may be about parallel. However, the element 410 may be allowed a small rotation with respect to the element 409. A continuous smooth variation of the position of the movable part 410 in the second direction 404 while the fixed part 409 remains stationary in the second direction 404 provides a continuous smooth variation of the delay Z.

FIG. 13 illustrates a transfer FSR phase element 446 using a tilt angle 448 for fine tuning a signal delay for adjusting phase of the transfer functions G($f$) and H($f$), described above. The element 446 may be used in the receivers 20 and 120 as elements 46 and 146; and may be used in the DLIs 150A-F in place of the elements 146A-F.

A portion of one of the two signal paths 232A-F or 234A-F (FIG. 6A-F) is denoted as a signal path 434. Signals 450 in the signal path 434 pass through the element 446 for providing a signal delay for adjusting the FSR phase for the transfer functions G($f$) and H($f$). The element 446 is provided with a higher optical index than the optical index of the signals in the signal path 434 outside the element 446.

The adjustable tilt angle 448 is adjusted with respect to the directions of the signals 450 by a mechanical mechanism 474. The mechanism 474 is controlled by a transfer (FSR) phase controller 437 in the manner described above for the transfer FSR controllers 37, 137 and 137A-F. Adjusting the tilt angle 448 of the element 446 with respect to the signals 450 provides a fine adjustment to the delay of the signals 450 by changing the physical length traversed by the signals 450. The element 446 may be constructed with a material having an optical index having minimal temperature dependence.

General Considerations

The signal delay provided by the transfer (FSR) phase elements 46, 146, 146A-F and 446 must be adjustable over a range of at least one cycle period at the carrier frequency of the optical input signal 24 for providing the transfer function phase adjustment. Its tuning resolution and stability should be better than 1% of the carrier cycle period. If the FSR phase adjustment is tuned by temperature, the thermal expansion coefficient and the thermal group index coefficient will determine the scale factor between temperature change and FSR phase change. For example, a tuning plate made of LaSFN9 (by Schott AG of Mainz, Germany), the group index is approximately 1.8 and the sum of the thermal coefficients is approximately $9 \times 10^{-6}$/K (Kelvin). The propagation delay through a plate of thickness 3 mm is approximately 18 picoseconds, and the thermal tuning range is 0.162 fs/K. At a carrier frequency of 200 terahertz (THz) the optical period is 5 femtoseconds (fs), so a change in FSR phase of one period would require a temperature change of 31 K, held to a stability of 0.31 K. This is a practical result.

In contrast, the desired differential transit time Y (controlled by selecting the signal delay Z provided by the FSR bandwidth elements 48, 148 and 148A-F is many cycles of the carrier frequency. In terms of cycles of the carrier frequency, the desired time Y may be calculated from the modulation system time divided by the carrier cycle time divided by the desired FSR/R, the FSR/R that correctly compensates for intersymbol interference (ISI) in the modulated optical input signal 24. For example for a modulation symbol time of 23.3 picoseconds, a carrier cycle time of 5 fs and a desired FSR/R of 1.01, the time Y is equivalent to 4613.86 cycles. For the same modulation symbol and carrier cycle times and a desired FSR/R of two, the time Y is equivalent to 2330 cycles. It is not be practical to combine the transfer (FSR) phase element and the FSR bandwidth element for the following reasons.

Taking the above example, for the thermally tuned transfer (FSR) phase element to provide the differential time Y, the phase element would have a delay range of about 2300 carrier cycle periods or 11.5 picoseconds (ps) in order to provide the FSR/R range from 1.01 to 2. This would require an impractical temperature range of 71000 K. The delay Z of the FSR bandwidth element 48, 148 and 148A-F need not provide all of the differential transit time Y. For example the time Y can be composed of the sum of the delay Z and a fixed differential transit time between the signal paths 232A-F and 234A-F, respectively. However, even if the range of the delay Z is limited to one picosecond, the temperature the required temperature tuning range is an impractical 7100 K.

It should be noted that the delay Z described throughout this application is the time for two transits (roundtrip time) through of the transfer function (FSR) bandwidth elements 48, 148 and 148A-F and the transfer (FSR) phase signal delay described throughout this application through the transfer (FSR) phase elements 46, 146, 146A-F and 446 is the time for two transits (roundtrip time). However, the receivers 20 and 120, and DLIs 150 and 150A-F could be constructed for single signal transits through either or both of the bandwidth and phase elements whereby the delay Z and/or the transfer (FSR) phase signal delay are provided by the times for single transits.

FIG. 6G illustrates a Gires-Tournois (GT) decoder 150G as an example of the delay line interferometer (DLI) 150. The GT decoder 150G operates as delay line interferometer where a filter implemented as a Gires-Tournois etalon 250G acts as a reflector in one of the signal paths. The etalon 250G is a periodic phase filter of frequencies having a periodic phase response for a reflected signal. The frequency filtering in the reflected signal from the etalon 250G alters and reconstructs the constructive and destructive transfer functions G($f$) and H($f$) of the naturally occurring free spectral range for a delay line interferometer into which the etalon 250G is embedded.

The etalon 250G has a partially reflective front surface PR and a highly reflective rear surface HR. The reflection coefficient of the partially reflective surface PR and the thickness, optical index and internal angle of incidence for the etalon 250G are selected in order to modify the bandwidths of the constructive and destructive transfer functions of the GT decoder 150G to compensate for intersymbol interference in the optical input signal 24 and minimize the bit error ratio of output data without affecting the differential transit time Y for differentially demodulating the input signal 24.

The GT decoder 150G has an input port 165G, a beam splitter cube 252G having a partially reflecting first mirror 202G, a second mirror 204G, a compensation spacer 253G, a first intermediate spacer 254G, the GT elation 250G including an etalon phase tuning element 256G, an FSR phase tuning spacer 258G having an air gap 259G, a second intermediate spacer 262G, and constructive and destructive output ports 166G and 168G. An FSR phase tuning element 446G is mounted in the air gap 259G of the spacer 258G. Elements of the GT decoder 150G that are analogous to elements of the DLI's 150A-F use the same base reference numbers, for example the first mirror 202G is functionally analogous to the first mirrors 202A-F.

For descriptive purposes, the two signal paths within the DLI 150G are referred to as a vertical signal path 232G and a horizontal signal path 234G. The intermediate spacers 254G and 262G are constructed to have matching signal delays. The compensation spacer 253G compensates for the thickness of the FSR phase tuning spacer 258G so that the optical lengths from the mirror 202G to the second mirror 204G and from the second mirror 202G to the partially reflective surface PR are equal except for the effective optical length of the FSR phase tuning element 446G. The GT etalon 250G provides the differential transit time Y for differentially demodulating the input signal 24.

The optical interfaces between the cube 252G and the compensation 253G and between the differential spacer 148G and the intermediate spacer 254G for the horizontal signal path 234G are antireflective surfaces AR. The optical interface between the intermediate spacer 254G and the etalon 250G for the horizontal signal path 234G is the partially reflective surface PR. The back side of the etalon 250G is the highly reflective surface HR for reflecting signals within the etalon 150G. The optical interfaces between the cube 252G and the spacer 258G and between the spacer 258G and the intermediate spacer 262G for the vertical signal path 232G are antireflective surfaces AR. The back side of the intermediate spacer 262G is a highly reflective surface HR acting as the second mirror 204G for reflecting the vertical signal path 232G.

The input optical signal 24 enters the splitter cube 252G at the input port 165G and illuminates the front side of the partially reflecting first mirror 202G. The first mirror 202G is set at an angle to the optical signal 24 so that part of the signal 24 reflects into the vertical signal path 232G and part of the signal 24 is passes through the mirror 202G into the horizontal signal path 234G. The horizontal signal path 234G continues through cube 252G, the spacer 253G and the intermediate spacer 254G to the etalon 250G. The etalon 250G reflects a signal in the horizontal signal path 234G according to its selected reflection coefficient, thickness, index and internal incident angle back through the intermediate spacer 254G and the spacer 253G. The reflected signal in the horizontal signal path 234G reenters the cube 252G where part reflects from the back side of the first mirror 202G to the constructive output port 166G and part passes through the back side of the mirror 202G to the destructive output port 168G.

The vertical signal path 232G passes from cube 252G through the spacer 258G and the intermediate spacer 262G to the second mirror 204G. The second mirror 204G reflects a signal in the vertical signal path 232G back through the intermediate spacer 262G and the spacer 258G back into the cube 252G. Part of the reflected signal in the vertical signal path 232G passes through the front side of the first mirror 202G to the constructive output port 166G and part of the reflected signal in the vertical signal path 232G reflects from the front side of the first mirror 202G to the destructive output port 168G.

The FSR phase tuning element 446G in the air gap 282G of the spacer 258G uses a tilt angle 448G for fine tuning a signal delay for adjusting the FSR phase of the natural transfer functions G($f$) and H($f$) for the GT decoder 150G. The element 446G is provided with a higher optical index than the optical indices of the signals in the vertical signal path 232G immediately outside the element 446G. Adjusting the tilt angle 448G with respect to the directions of the signals of the vertical signal path 232G provides a fine adjustment to the delay of the signals 232G by changing the physical length within the element 446G traversed by the signals in the vertical signal path 232G. The tilt angle 448G is controlled by a mechanism 474G controlled by a transfer (FSR) phase controller 437G. The controller 437G may operate as described above for controllers 37, 137, 137A-F or 437. Or, the tilt angle 448G may be adjusted by the mechanism 474G with the use of vector network analyzer test equipment to obtain a desired phase of a periodic transfer function of power versus frequency. In an alternative embodiment the element 446G has a temperature sensitive optical index and the mechanism 474G an oven for controlling the effective optical length of the element 246G by controlling its temperature.

The etalon phase tuning element 256G uses a tilt angle 268G for fine tuning a periodic phase response of a reflection function versus frequency for the GT etalon 250G so that the phase response is approximately symmetrical about the carrier frequency of the input signal 24. The element 256G is provided with a higher optical index than the optical indices of the signals of the horizontal signal path 234G immediately outside the element 256G. Adjusting the tilt angle 268G with respect to the directions of the signals within the etalon 250G provides a fine signal delay adjustment by changing the physical length traversed by the signals within the element 256G. The tilt angle 268G is controlled by a mechanism 272G controlled by an etalon frequency controller 274G. In an alternative embodiment the element 256G has a temperature sensitive optical index and the mechanism 272G an oven for controlling the effective optical length of the element 256G by controlling its temperature.

The GT decoder 150G has separate alignment of the filter phase response of the GT etalon 250G and the FSR phase for the free spectral range for the interferometer action of the GT decoder 150G. To align the GT etalon 250G, a beam blocker 283G is inserted into the air gap 259G to disconnect or absorb signals in the vertical signal path 232G. A piece of paper may be used for the beam blocker. The reflective filter periodic phase response of the GT etalon 250G is aligned with the carrier of the input signal 24 while the vertical signal path 232G is blocked. After the GT etalon 250G is aligned, the beam blocker 283G is removed for aligning the FSR phase for the GT decoder 150G and for normal operation.

FIG. 6H illustrates a Gires-Tournois (GT) decoder 150H an example of the delay line interferometer (DLI) 150. The GT decoder 150H operates as delay line interferometer where a filter implemented as a Gires-Tournois etalon 250H acts as a reflector in one of the signal paths. The etalon 250H is a periodic phase filter of frequencies having a periodic phase response for a reflected signal. The frequency filtering in the reflected signal from the etalon 250H alters and reconstructs the constructive and destructive transfer functions G($f$) and H($f$) of the naturally occurring free spectral range for a delay line interferometer into which the etalon 250H is embedded.

The etalon 250H has a partially reflective front surface shown as PR and a highly reflective rear surface shown as HR. The reflection coefficient of the partially reflective surface PR and the thickness, optical index and internal angle of incidence for the etalon 250H are selected in order to modify the bandwidths of the constructive and destructive transfer functions of the DLI 150H to compensate for intersymbol interference in the optical input signal 24 and minimize the bit error ratio of output data without affecting the differential transit time Y for differentially demodulating the input signal 24.

The DLI 150H has an input port 165H, a beam splitter cube 252H having a partially reflecting first mirror 202H, a second mirror 204H, a differential spacer 148H including an air gap 259H, the GT elation 250H including an etalon phase tuning element 256H, and constructive and destructive output ports 166G and 168G. An FSR phase tuning element 446H is mounted in the air gap 259H of the spacer 148H. Elements of the GT decoder 150H that are analogous to elements of the DLI's 150A-F use the same base reference numbers, for example the first mirror 202H is functionally analogous to the first mirrors 202A-F.

For descriptive purposes, the two signal paths within the DLI 150G are referred to as a vertical signal path 232H and a horizontal signal path 234H. The differential spacer 148H provides the differential transit time Y for differentially demodulating the input signal 24 and has additional delay to compensate the signal delay in the etalon 150H.

The optical interface between the cube 252H and the differential spacer 148H in the vertical signal path 232H is an antireflective surface AR. The back side of the differential spacer 148H is a highly reflective surface HR acting as the second mirror 204H for reflecting the vertical signal path 232H. The optical interface between the cube 252H and the etalon 250H in the horizontal signal path 234H is the partially reflective surface PR. The back side of the etalon 250H is the highly reflective surface HR for reflecting signals within the etalon 250H.

The input optical signal 24 enters the splitter cube 252H at the input port 165H and illuminates the front side of the partially reflecting first mirror 202H. The first mirror 202H is set at an angle to the optical signal 24 so that part of the signal 24 is reflected into the vertical signal path 232H and part of the signal 24 is passed through the mirror 202H into the horizontal signal path 234H. The horizontal signal path 234H passes from cube 252H to the etalon 250H. The etalon 250H reflects the horizontal signal path 234H according to its selected reflection coefficient, thickness, index and internal incident angle back into the cube 252H where part reflects from the back side of the first mirror 202H to the constructive output port 166H and part passes through the back side of the mirror 202H to the destructive output port 168H.

The vertical signal path 232H passes from cube 252H through the differential spacer 148H to the second mirror 204H. The second mirror 204H reflects the vertical signal path 232H back through the differential spacer 148H into the cube 252H where part passes through the front side of the first mirror 202H to the constructive output port 166H and part reflects from the front side of the first mirror 202H to the destructive output port 168H.

The differential transit time Y for differentially demodulating the input signal 24 is the difference in transit times between the vertical and horizontal signal paths 232G and 234H controlled by the difference in effective optical length between the differential spacer 148H and the etalon 250H.

The FSR phase tuning element 446H in the differential spacer 148H uses a tilt angle 448H for fine tuning a signal delay for adjusting the FSR phase of the natural transfer functions G($f$) and H($f$) for the GT decoder 150H. The element 446H is provided with a higher optical index than the optical indices of the signals in the vertical signal path 232H immediately outside the element 446H. Adjusting the tilt angle 448H with respect to the directions of the signals of the vertical signal path 232H provides a fine adjustment to the delay of the signals 232H by changing the physical length within the element 446G traversed by the vertical signal path 232H. The tilt angle 448H is controlled be a mechanism 474H controlled by a transfer (FSR) phase controller 437H. The controller 437H may operate as described above for controllers 37, 137, 137A-F or 437. Or, the tilt angle 448H may be adjusted by the mechanism 474H with the use of vector network analyzer test equipment to obtain a desired phase for a periodic transfer function for power versus frequency. In an alternative embodiment the element 446H has a temperature sensitive optical index and the mechanism 474H an oven for controlling the effective optical length of the element 446H by controlling its temperature.

The etalon phase tuning element 256H uses a tilt angle 268H for fine tuning the phase of the reflection function versus frequency of the GT etalon 250H so that the periodic phase response of the reflection function is symmetrical about the carrier frequency of the input signal 24. The element 256H is provided with a higher optical index than the optical indices of the signals within the etalon 250H immediately outside the element 256H. Adjusting the tilt angle 268H with respect to the directions of the signals within the etalon 250H provides a fine delay adjustment by changing the physical length within the element 446H traversed by the signals within the etalon 250H. The tilt angle 268H is controlled by a mechanism 272H controlled by an etalon frequency controller 274H. In an alternative embodiment the element 256H has a temperature sensitive optical index and the mechanism 272H an oven for controlling the effective optical length of the element 256H by controlling its temperature.

The GT decoder 150H has separate alignment of the filter phase response of the GT etalon 250H and the FSR phase for the free spectral range for the interferometer action of the GT decoder 150H. To align the GT etalon 250H, a beam blocker 283H is inserted into the air gap 259H to disconnect or absorb signals in the vertical signal path 232H. A piece of paper may be used for the beam blocker. The reflective filter periodic phase response of the GT etalon 250H is aligned with the carrier of the input signal 24 while the vertical signal path 232H is blocked. After the GT etalon 250H is aligned, the beam blocker 283H is removed for aligning the FSR phase for the GT decoder 150H and for normal operation.

FIG. 14 is a chart of the periodic phase response versus frequency of the signal reflection from the GT etalon 250G or 250H according to an equation shown below for $r_{sum}$ where $r_{sum}$ is the field of the reflected signal divided by the field of the incident signal. In the equation for $r_{sum}$, the $r_1$ is the field reflection coefficient for the partially reflective PR surface of the etalon 250G or 250H, the n is an optical index of the material for the etalon 250G or 250H, the $k=2\pi/\lambda=2\pi v/c$ is an angular wave number where the $\lambda$ is the optical wavelength or the v is the optical frequency of the input signal 24, the L is a thickness for the etalon 250G or 250H, and the $\theta$ is an internal angle of incidence for the etalon 250G or 250H.

$$r_{sum} = \frac{E_{reflected}}{E_{incident}} = \frac{1 + r_1 \text{Exp}(-i2nkL\cos\theta)}{1 + r_1 \text{Exp}(i2nkL\cos\theta)}$$

The period of the reflection phase is provided by the interaction of the index n, the thickness L and the angle $\theta$. The $|r_{sum}|^2$ versus frequency is constant except for the effects of diffraction and residual losses. The bandwidth of the GT decoder 150G or 150H depends upon the phase response reflection of the GT etalon 250G or 250H which depends upon the reflection coefficient $r_1$ of a coating for the PR surface. The chart shows the phase response reflection $r_{sum}$ for field reflection coefficients $r_1$ of 0.4, 0.7 and 0.99.

The appropriate coating for the coefficient $r_1$ is selected in order to modify the natural FSR bandwidth for providing the reconfigured bandwidth of the transfer function of the GT decoder 150G or 150H to compensate for intersymbol interference or minimize bit error ratio based on the optical channel or modulation bandwidth for a particular end user. At the same time the free spectral range of the interferometer operation of the GT decoder 250G or 250H may be held constant, for example at 50 GHz, to match a standard ITU channel plan.

A simulation program is used during design and development based on parameters and characteristics of the transmitter 12, channel 16 and the receiver 20 or 120 for the system 10 for providing computer simulations for eye diagrams, bit error ratios and other results. The parameters for the reflection coefficient $r_1$ are adjusted with the computer simulations for optimizing the performance of the system 10 by obtaining the widest eye opening, the least degradation effect from intersymbol interference, or the lowest bit error ratio. Such computer simulation program is available as a Photonic Design Automation (PDA) program from VPIphotonics a division of VPIsystems of Holmdel, N.J., or Photonic Design Software program from Optiwave Systems Inc. of Ottawa, Ontario, Canada.

The reflection coefficient $r_1$ of the partially reflective PR surface for the GT etalon 250G or 250H can be tuned using an approach described by Lawrence H. Domash at Aegis Semiconductor, Inc. of Woburn, Wash., for the Optical Society of America in 2004. The partially reflective PR surface is made as a flexible homogenous coating in a thin film PECVD process with hydrogenated amorphous silicon (a-Si—H) having a thermo-optic characteristic. The thermo-optic characteristic enables the reflection coefficient $r_1$ to be controlled by controlling its temperature with an oven.

The term "etalon" comes from a French word étalon meaning "measuring gauge" or "standard". A Fabry-Pérot etalon is typically made of a transparent plate with two reflecting surfaces. Its transmission spectrum as a function of wavelength exhibits a periodic transmission response corresponding to resonances of the etalon. In the Fabry-Pérot etalon the front and back surfaces are partially reflective. The Gires-Tournois etalon is a special case of the Fabry-Pérot etalon where one of the surfaces is highly reflective.

FIG. 15 is a flow chart of a tuning adjustment method for the GT decoders 150G and 150H. One or any combination of these steps for this method may be stored on a tangible medium 500 in a computer-readable form as instructions to a computer for carrying out the step or steps.

As described above one of the reflecting mirrors in a delay line interferometer is replaced by a Gires-Tournois (GT) etalon to create a GT decoder. Such GT decoder may be considered to have two transfer function phases—the phase of the transfer function for the free spectral range of the delay line interferometer corresponding to the differential delay for demodulation of a differentially modulated signal and the phase of the transfer function of the reflection of the GT etalon. In practice it might be difficult to construct such GT decoder having the proper transfer function phases with respect to the carrier frequency of an input signal or the carrier frequencies of several channels for the input signal unless the phases are adjustable. In the GT decoders 150G and 150H the FSR phase is adjusted by adjusting the optical signal delay in the elements 446G and 446H and the GT etalon phase is adjusted by adjusting the optical signal delay in the elements 256G and 256H.

A method of adjusting the two phases uses test equipment for measuring optical amplitude (or power) and phase versus frequency. Such test equipment is commercially available as an optical vector network analyzer from Luna Technologies of Blacksburg, Va.

Step 502: Connect the GT decoder to the network analyzer so that light is launched from the analyzer into the input port of the GT decoder and received in the analyzer from one of the decoder output ports (either one).

Step 504: Insert a beam-blocker in the non-GT arm (blocking the vertical signal paths 232G and 232H for the GT decoders 150G and 150H) of the GT decoder to stop any reflection from that arm of the GT decoder to the decoder output port.

Step 506: While measuring optical signal phase versus frequency, adjust the transfer function frequency response (by adjusting the effective optical length of the elements 256G or 256H) of the etalon so that the widest linear part of the phase response is centered about the desired optical carrier wavelength. Lock the tuning for this adjustment.

Step 508: Remove the beam-blocker from the non-GT arm.

Step 510: While using the analyzer to measure optical power (or amplitude) versus frequency, adjust the FSR phase tuning of the non-GT arm to center the decoder's delay line interferometer transfer function of power (or amplitude) on the desired optical carrier wavelength. Lock the tuning for this adjustment. The GT etalon is now ready for normal operation.

FIGS. 16A and 16B are charts showing exemplary optical transfer functions for a standard delay line interferometer and an interferometer constructed as the GT decoder 150G or 150H. The vertical axes show power transmission and the horizontal axes show frequency of the input signal 24 with a center frequency at 194 terahertz.

FIG. 16A shows the constructive and destructive transfer functions $G(f)$ and $H(f)$ for the free spectral range of a delay line interferometer for the transit time difference Y of 20 picoseconds for differential demodulation of the input signal 24. The cyclic (in the frequency domain) response of the transfer functions $G(f)$ and $H(f)$ is the natural characteristic of the free spectral range of a delay line interferometer where the differential spacers 148G and 148H provide signal delays of one-half the differential transit time Y (the signals in the decoders 150G and 150H have two transits through the spacer 148G or 148H). It is noted that the spacer 148H provides an additional signal delay to compensate a signal delay in the etalon 250H. The transit time difference Y defines the natural free spectral range (FSR) period and bandwidth for the transfer functions $G(f)$ and $H(f)$ for the delay line interferometer.

FIG. 16B shows the constructive and destructive transfer functions for the GT decoders 150G and 150H for the same transit time difference Y of 20 picoseconds. The natural constructive and destructive transfer functions $G(f)$ and $H(f)$ are altered by the periodic phase filtering action of the GT etalon 250G or 250H in order to reconfigure, and in most cases increase, the bandwidths of the transfer functions. This may be beneficial because the same GT decoder 150G or 150H can be matched for the FSR phase for the system 10 having several channels without readjusting the FSR phase for each channel. For example, a differential transit time Y of 20 picoseconds in a system having 50 GHz channel spacing can be used for providing a constant FSR phase alignment for all channels while separately selecting transfer function bandwidths in the GT decoder 150G or 150H according to an algorithm or dynamic feedback for compensating for intersymbol interference and minimizing bit error ratio.

FIG. 17 is a detailed block diagram of an example of an optical receiver referred to with a reference number 620. The receiver 620 is an example of the receiver 20 described above for the system 10. Elements of the receiver 620 that are analogous to or embodiments of elements of the receiver 20 are denoted by incrementing the reference identification numbers of the receiver 20 by 600.

The receiver 620 includes a demodulator 630, a data estimator 632 and a bit error ratio (BER) detector 638. The demodulator 630 receives the optical input signal 24 at the port 142, differentially demodulates and converts the optical signal to an electrical baseband signal, and issues the baseband signal to the data estimator 632.

The demodulator 630 includes a signal processor 634, a detector apparatus 635 and a combiner 636. The signal processor 634 has an optical signal processor section 634A having a delay line interferometer (DLI) 150I and an optical stopband filter 676; and an optional electrical signal processor section 634B for processing signals in constructive and destructive signal paths referenced as 667 and 669, respectively. The optical signal processor 634A receives the modulated optical input signal 24 at the port 142, differentially decodes the modulation on the signal 24, and issues signals having differentially decoded modulation from constructive and destructive optical output ports 143A and 144A.

The detector apparatus 635 includes constructive and destructive signal path detectors 682 and 684 for converting the modulation on the signals from the ports 143A and 144A, respectively, into electrical signals. The electrical signal processor 634B applies filtering or gain imbalance and passes the electrical constructive and destructive signals from the detectors 682 and 684 to the output ports 143B and 144B, respectively. The combiner 636 takes a difference between the instantaneous signal level of the constructive path signal at the port 143B and the instantaneous signal level of the destructive path signal at the port 144B for providing a demodulated electrical signal as a baseband signal.

The data estimator 632 operates on the baseband signal for recovering frame and data clock signals and detecting and correcting errors, making a best estimate of the input data at the transmitter 12, and issuing the best estimate as the output data. In a variation of the receiver 620, the data estimator 632 operates directly on the signals at the ports 143B and 144B for estimating the output data. The BER detector 638 uses error detection and correction data from the date estimator 632 and/or a comparison of the output data to known input data for determining bit error ratios without interrupting the normal operation of the system 10 while the system 10 is transmitting data.

The demodulator 630 may use the bit error ratio data for feedback for making dynamic adjustments within the demodulator 630 during normal system operation, or the bit error ratio data may be measured during design, test or installation and then used for determining configurations for the demodulator 630 that are fixed for normal system operation.

The demodulator 630 passes the input signal 24 from the port 142 to an input port 165 of the DLI 150I. An optical amplifier 628 amplifies the signal 24 at the front end of the receiver 620. When the system 10 has wavelength division multiplexed (WDM) channels, an optical input filter 629 is placed before the receiver 620 for selecting the signal 24 for a single optical channel. The input optical filter 629 is considered as one of the filters 26 in the link 16 for determining the modulation bandwidth (BWch) for the system 10.

The DLI 150I receives the optical input signal 24 at the port 165, separates the signal into two signal paths, differentially decodes the signal using the signal transit time difference Y between the two paths, and provides differentially decoded optical interference signals at constructive and destructive output ports 166 and 168. It should be noted that the differential signal paths within the DLI 150I are not the same as the constructive and destructive interference signal paths 667 and 669.

The time difference Y is controlled by a spacer element 148I. The inverse of the time difference Y defines the free spectral range ($FSR_{dli}$) of the DLI 150I. The transmission transfer function for the DLI 150I between the input port 165 and its constructive output port 166 is the above-described G($f$) of the equation 1. The transmission transfer function for the DLI 150I between the input port 165 and its destructive output port 168 is above-described H($f$) of the equation 2.

The DLI 150I includes the transfer (FSR) phase element 446 (or 146, FIG. 5)) described above for shifting the phase of the transfer functions G($f$) and H($f$) with respect to the carrier frequency of the optical input signal 24 in order to align and center the $FSR_{dli}$ to or near to the carrier frequency of the input signal 24. Alternatively, the DLI 150I is manufactured with very tight mechanical tolerances to align and center its free spectral range $FSR_{dli}$ relative to the carrier frequency without the need for the FSR phase element 446 (or 146). In cases where there is asymmetric modulation by the transmitter 12 or the concatenated filters 26 in the link 16 are asymmetric about the carrier frequency the $FSR_{dli}$ may be centered on the spectrum.

The FSR phase element 446 (or 146) is used for fine tuning the FSR phase of the periodic frequency response of the transfer functions G($f$) and H($f$) relative to the carrier frequencies of the channels of the communication system 10. The angle 448 (FIG. 13) of FSR phase element 446 with respect to the direction of the signal in the DLI 150I is physically controlled by the mechanical mechanism 474 (FIG. 13). The mechanism 474 is controlled according to electrical signals from an $FSR_{dli}$ phase controller 637 for providing a fine adjustment to the delay of the signals 434 (FIG. 13) by changing the physical length traversed by the signals. Alternatively, the $FSR_{dli}$ phase may be adjusted by adjusting the temperature of the element 146 (FIG. 5) with the oven 174 under control of the controller 637.

Dynamic adjustment of the FSR phase may be provided in the above-described manner using a normalized power difference based on measurements $A_C$ and $A_D$ from the constructive and destructive detectors 682 and 684 for the signals. Dynamic adjustment control for the element 446 or 146 may also be provided by signal quality feedback based on the bit error ratios measured by the BER detector 638 or other signal quality measurements without interrupting the operation of the system 10. Signal quality measurements for the receiver 620 may be defined in terms of BER, ISI, eye opening ratio, and/or signal to noise ratio (SNR). Typically the minimum BER, the best compensation for ISI, the largest eye openings and the highest signal to noise ratios (SNR)s of the optical and electrical constructive and destructive signal paths are optimized, or nearly optimized, for the same configurations within the receiver 620.

The optical filter 676 can be implemented in at least one of the two optical paths: the constructive interference signal path 667 and the destructive interference signal path 669. In certain optical receivers, the optical filter 679 may be implemented in each of the two signal paths 667 and 669. In the illustrated example, the optical filter 676 is a part of an optical imbalancer 652 in the constructive interference signal path 667. The filter 676 has a stopband centered relative to the carrier frequency of the input signal 24 for filtering the signal from the DLI constructive output port 166 and passing the filtered signal to the constructive output port 143A. The stopband of the filter 676 is not intended to stop all transmission and can be partially optical transmissive. The filter 676 typically has an attenuation in a range of a half a decibel dB to about ten dB at its transmission minima depending on the modulation bandwidth BWch for the input signal 24. The filter 676 can be implemented in various optical filter configurations, such as a Fabry-Pérot (FP) etalon filter.

The optical imbalancer in this example also includes a compensation attenuator 678 in the destructive interference signal path 669. This compensation attenuator 678 is adjustable by a control signal to change the amplitude of the optical signal in the destructive interference signal path 669.

A bandwidth configuration algorithm 631 is used to configure the filter 676 to a stopband bandwidth based on the channel bandwidth BWch of the system 10 for the link 16, the data rate R and the channel spacing CH of the system 10 in order to compensate for ISI degradation in the system 10 and improve the quality of the output data. The filter 676 may be constructed with layers of a dielectric stack or with color absorption lines for providing transmission stopbands at particular carrier frequencies. In some implementations, the filter 676 can be advantageously constructed as a Fabry-Pérot (FP) etalon. The etalon 676 has a free spectral range (FSR$_{etalon}$) related to its thickness. The stopband of the etalon filter 676 is periodic having a period of the free spectral range FSR$_{etalon}$. An FSR$_{etalon}$ phase configuration algorithm 674 is used to align the phase of the frequency spectral range of the etalon filter 676 to the carrier frequency of the input signal 24. The stopband bandwidth of the etalon filter 676 can be fixed at a desired value by properly selecting the reflectivities of both surfaces of the etalon filter 676. The reflectivities of the two surfaces can be found according to the relations shown in FIG. 21 and FIG. 22, as outlined in the descriptions of FIGS. 21-24. As a specific example, the etalon filter 676 can be constructed to optimize the ISI for a channel of optical bandwidth 35 GHz carrying a DPSK signal modulated at 43 Gbit/s in a system where the channel spacing is 50 GHz. FIG. 21 shows 2BWopt/R to be 1.4, so that the optimum receiver bandwidth is BWopt=(43 GHz) 1.4/2=30.1 GHz. In FIG. 22, the ratio of BWopt/CH=30.1 GHz/50 GHz=0.602 corresponds to a power reflectivity of 0.16 for each surface of the etalon filter 676.

The filter compensation attenuator 678 attenuates the optical signal from the DLI destructive output port 168 and passes the attenuated signal to the destructive output port 144A. The attenuation is calculated to compensate for the attenuation for the stopband of the filter 676. Greater or lesser attenuation for the attenuator 678 may also be used for providing a gain imbalance calculated according to an imbalance configuration algorithm 664 for minimizing ISI degradation in the system 10.

Attenuators 686 and 688, analogous to variable gain elements 186 and 188 (FIG. 5), are optional for an electrical imbalancer 656 in an electrical signal processor section 634B for applying a gain imbalance to electrical signals passed from the detectors 682 and 684 to the constructive and destructive output ports 143B and 144B. The attenuators 686 and 688 may be used to provide an electric gain imbalance in the constructive and destructive signal paths 667 and 669 determined with the imbalance configuration algorithm 664 for minimizing ISI degradation in the system 10.

The overall transfer function of the signal processor 634 for the constructive interference signal path 667 from the input port 142 to the constructive output port 143B includes the constructive transfer function G($f$) of the DLI 150I and the transmission transfer functions of the optical filter 676, the detector 682, and the electrical attenuator 686. Similarly, the overall transfer function of the signal processor 634 for the destructive interference signal path 669 from the input port 142 to the destructive output port 144B includes the destructive transfer function H($f$) of the DLI 150I and the transmission transfer functions of the optical attenuator 678, the detector 684, and the electrical attenuator 688.

The bandwidth configuration algorithm 631 and the imbalance configuration algorithm 664 operate in a manner that is analogous to operation of the above-described bandwidth (FSR) control algorithm 133 (FIG. 5) and imbalance control algorithm 164, respectively, for determining or selecting the bandwidth of the constructive interference signal path 667 and the gain imbalance between the constructive and destructive paths 667 and 669 based on the known or measured modulation bandwidth BWch, the data rate R of the modulation on the input signal 24, and the channel spacing of the system 10 for improving the performance of the system 10, and especially for reducing the signal quality degradation due to intersymbol interference (ISI) caused by the filters 26. The FSR$_{etalon}$ phase configuration algorithm 674 is used to configure the etalon 676 to align the phase for its free spectral range FSR$_{etalon}$ to the carrier frequency of the input signal 24.

The receiver 620 includes a microprocessor system for operating the receiver 620 according to instructions stored in a memory. The algorithms 631, 674 and 664 may be implemented in the microprocessor system or an external computer.

FIG. 6I illustrates an example of the delay line interferometer 150 referred to with a reference identification 150I. The DLI 150I has naturally occurring free spectral range FSR$_{dli}$ for constructive and destructive transfer functions G($f$) and H($f$) from an input port 165 to constructive and destructive output ports 166 and 168.

The DLI 150I includes a beam splitter cube 252I having a first mirror 202I having front and back partially reflective surfaces, a second mirror 204I having a highly reflective surface HR, a differential spacer element 148I having a thickness for providing the differential transit time Y for decoding differential modulation on the input signal 24 and defining the FSR$_{dli}$, and a third mirror 208I having a highly reflective surface HR. The transit time Y is the time for a two way transit through the spacer element 148I.

The thickness of the spacer element 148I is constructed to provide the DLI 150I with a free spectral range FSR$_{dli}$ equal to the channel spacing CH of the system 10. This is beneficial when the system 10 is a WDM system because the same receiver 620 may be manufactured, stocked and installed for any of the channels the WDM system with only the addition of an input filter 629 for receiving a particular channel of interest.

The spacer element 148I has a front glass having an anti-reflective coating AR, an air gap 283I, and a back glass having highly reflective coating HR. The highly reflective HR back glass of the spacer element 148I provides the third mirror 208I. Elements of the DLI 150I that are analogous to and/or operate in a similar manner to elements of the DLI's 150A-H use the same base reference numbers, for example the first mirror 202I is functionally analogous to and operates in similar manner to the first mirrors 202A-H.

The DLI 150I has two signal paths referred to as a vertical signal path 232I and a horizontal signal path 234I. The input optical signal 24 enters the beam splitter cube 252I at the input port 165 and illuminates the front side of the partially reflecting first mirror 202I. The first mirror 202I is set at an angle to the signal so part of the signal reflects into the vertical signal path 232I and part of the signal passes through the mirror 202I into the horizontal signal path 234I.

The signal in the vertical signal path 232I passes up through the cube 252I and reflects from the second mirror 204I back down through the cube 252I to the first mirror 202I. Part of the reflected signal from the second mirror 204I in the vertical signal path 232I passes through the front side of the first mirror 202I to the constructive output port 166 and part reflects from the front side of the first mirror 202I to the destructive output port 168.

The signal in the horizontal signal path 234I continues through cube 252I and through the spacer element 148I to the third mirror 208I. The third mirror 208I reflects the signal back through the spacer element 148I and the cube 252I to the first mirror 202I. Part of the reflected signal from the third mirror 208I in the horizontal signal path 234I reflects from the back side of the first mirror 202I to the constructive output port 166 and part passes through the back side of the mirror 202I to the destructive output port 168.

The above-described transfer FSR phase element 446 is disposed in the air gap 283I for the spacer element 148I. The element 446 has an adjustable tilt angle 448 for fine tuning an optical signal delay in the horizontal signal path 234I in order to align the constructive and destructive transfer functions G(f) and H(f) of the DLI 150I to the carrier of the input signal 24. Adjusting the tilt angle 448 with respect to the directions of the signals in the horizontal signal path 234I changes the effective optical delay for signals by changing the physical length within the element 446 that is traversed by the signals. The tilt angle 448 is physically adjusted by the mechanical mechanism 474. The mechanism 474 operates according to control of the $FSR_{dli}$ phase controller 637.

The controller 637 may operate as described above for controllers 37, 137, 137A-F or 437 for dynamic control of the $FSR_{dli}$ phase while the system 10 is on-line. Or, the tilt angle 448 may be adjusted off-line by the mechanism 474 with the use of vector network analyzer test equipment to obtain the desired $FSR_{dli}$ phase. The element 446 and mechanism 474 may be replaced by an element having a temperature sensitive optical index and an oven as described above for the elements 146A-F and ovens 174A-F. Alternatively, the cube 252I and the spacer element 148I may be manufactured with precise tolerances to align the $FSR_{dli}$ phase so that dynamic adjustment is not required.

The designation of which of the ports 166 and 168 provides the constructive interference signal and which provides the destructive interference signal can be determined based on the specific designs and the designation may be interchanged by changing the effective optical length difference between the two signal paths 232I and 234I by ½ wavelength at the carrier frequency (adjusting the $FSR_{dli}$ phase by 180°). The constructive interference signal is the signal from the port 166 or 168 that has a transmission passband centered for passing the spectrum of the input signal 24.

FIGS. 18A, B and C illustrate first, second and third examples 676A, 676B and 676C of the etalon stopband filter 676. The etalon filters 676A, 676B and 676C are constructed as Fabry-Pérot (FP) etalons having thickness 677A, 677B and 677C, respectively, and front and rear partially reflecting glass surfaces $PR_1$ and $PR_2$. The signal from the DLI constructive output port 166 illuminates the first surface $PR_1$, passes through the air gap 677A, B or C and issues from the second surface $PR_2$ to the output port 143A.

The thicknesses 677A, 677B and 677C are determined and configured by the configuration algorithm 674 to make the free spectral range $FSR_{etalon}$ for the etalons 676A, 676B and 676C equal to the channel spacing for the system 10. This is beneficial when the system 10 is a WDM system because the same receiver 620 may be manufactured, stocked and installed for any of the channels the WDM system with only the addition of an input filter 629 for selecting the particular channel of interest.

The reflectivity's $R_1$ and $R_2$ of the front and rear surfaces $PR_1$ and $PR_2$ are determined and configured by the bandwidth configuration algorithm 631 based on the modulation bandwidth BWch of the input signal 24 in order to provide the optimum bandwidth BWopt for compensating for ISI degradation in the system 10.

Referring to FIG. 18A, the air gap 677A for the etalon 676A is precisely manufactured for the exact thickness, including the thicknesses of the glass surfaces $PR_1$ and $PR_2$, to have the exact optical length for aligning the phase of the periodic transmission transfer function for the $FSR_{etalon}$ of the etalon 676A to the carrier frequencies of the channels for the system 10 in order to center the stopbands of the transfer functions at the carrier frequencies.

Referring to FIG. 18B, the etalon 676B includes a transfer function phase adjustment element 675 having an optical index that is greater than air disposed in the air gap 677B. The effective electrical length the etalon 676B is precisely configured by an etalon frequency controller 274B to align the phase of the etalon's free spectral range $FSR_{etalon}$ to position the etalon stopbands relative to the carrier frequencies of the system channels by tilting the element 675 to an angle 668B with respect to the signal. The tilt angle 668B may be fixed in place after it is adjusted based on measurements of an optical network analyzer or may be under dynamic control. The dynamic control may be based on signal quality or normalized differential power measurements as described above by a mechanical tilt mechanism 272B under control of the controller 274B.

Referring to FIG. 18C, the effective electrical length the etalon 676C is precisely configured by an etalon frequency controller 274C to align the phase of the etalon's free spectral range $FSR_{etalon}$ to position the etalon stopbands relative to the carrier frequencies of the system channels by tilting the entire etalon 676C to an angle 668C with respect to the signal. The tilt angle 668C may be fixed in place after it is adjusted based on measurements of an optical network analyzer or may be under dynamic control. The dynamic control may be based on signal quality or normalized differential power measurements as described above by a mechanical tilt mechanism 272C under control of the controller 274C.

FIG. 19A is a flow chart of an example of a method for configuring the optical receiver 620 to minimize intersymbol interference ISI for the system 10. The steps of the method may be embedded in a tangible medium 700 in a computer-readable form for instructing a computer device for carrying out the steps.

In a step 702 the method starts with the knowledge of the channel spacing CH, symbol rate R, carrier frequencies CF's and the modulation bandwidths BWch for the system 10.

In a step 704 a delay line interferometer (DLI) is constructed for a free spectral range $FSR_{dli}$ about equal (preferably within one or two percent) to the channel spacing CH. In a step 708 a Fabry-Pérot (FP) etalon is disposed for filtering a constructive interference signal issued from the DLI.

In a step 712 the etalon is constructed with a thickness for providing an effective optical length to configure the etalon for a free spectral range $FSR_{etalon}$ about equal to the channel spacing CH. In a step 714 the thickness is precisely shaved or augmented so that the phase of the periodic transfer function for the free spectral range $FSR_{etalon}$ is aligned to the carrier frequencies CF's and the transfer function has minimum transmissions at the carrier frequencies CF's.

In a step 716 an optimum constructive interference signal path bandwidth BWopt (including both the DLI and the etalon) is computed based on the modulation bandwidth BWch and the symbol rate R for minimizing the ISI degradation in the system 10. In a step 718 the power reflection coefficients $R_1$ and $R_2$ (or magnitude reflection coefficients $r_1$ and $r_2$) for the front and rear surfaces for the etalon are configured based on the optimum bandwidth BWopt and the channel spacing CH to minimize ISI.

In a step 730 the DLI is constructed or adjusted to align the $FSR_{dli}$ phase to center the constructive interference signal transmission passband at the carrier frequency CF's.

FIG. 19B is a flow chart for the step 730 for adjusting the $FSR_{dli}$ phase. In a step 732 an $FSR_{dli}$ phase adjustment element is disposed in the DLI for providing a fine adjustment of signal delay between the two differential signal paths in the DLI. In a step 734 data is transmitted though the communication system. And then in a step 736 normalized signal power measurements of the constructive and destructive interference signals or signal quality measurements are fed back to the $FSR_{dli}$ phase element to align the $FSR_{dli}$ phase so that the transmission passband for the constructive interference signal is centered for the carrier frequencies CF's.

FIG. 19C is a flow chart of an example of a method for receiving a differentially modulated optical signal and then mitigating the effect of intersymbol interference ISI in a communication system. The steps of the method may be embedded in a tangible medium 750 in a computer-readable form for instructing a computer device for carrying out the steps.

In a step 752 the modulated optical signal is received and differentially decoded in a delay line interferometer (DLI) having a free spectral range $FSR_{dli}$ equal to the channel spacing CH for the system 10. In a step 754 the $FSR_{dli}$ phase is tuned to align the phases of the constructive and destructive interference transfer functions through the DLI so that the constructive interference signal has transmission passbands centered at the carrier frequencies CF's of the channels of the system 10. In a step 756 the DLI issues constructive and destructive interference signals.

In a step 762 the constructive interference signal is filtered by an FP etalon having a free spectral range $FSR_{etalon}$ equal to the channel spacing CH for the system 10, an $FSR_{etalon}$ phase aligned to center the transmission stopbands to the carrier frequencies CF's of the system channels, and configured to have a bandwidth optimized to minimize intersymbol interference (ISI).

In a step 766 the destructive interference signal from the DLI is attenuated to compensate for the loss of the etalon stopband at the optimized bandwidth and optionally to apply an imbalance to the gains of the constructive and destructive interference signals in order to further minimize ISI. In a step 772 a best estimate of the data carried on the input signal is made based on a difference between signals derived from the etalon filtered constructive interference signal and the attenuated destructive interference signal.

FIG. 20 is a chart of power transmission transfer functions versus frequency for constructive and destructive interference signal paths in the receiver 620 for an exemplary channel spacing CH of 50 gigahertz (GHz) and exemplary carrier frequencies CF's of 193.95, 194 and 194.05 terahertz (THz). The optimum bandwidth BWopt for the transfer function for the constructive interference signal is shown for one-half power transmission. The transfer function for the destructive interference signal path is the above-described transfer function H(f) of the equation 2 for the DLI 150I where the differential transit time Y is the inverse of the channel spacing CH. For this case, it can be seen that the optimum bandwidth BWopt for the constructive interference signal is wider than the bandwidth for the transfer function for the destructive interference signal.

FIG. 21 is a chart of an example of a bandwidth configuration algorithm for determining the optimum bandwidth BWopt for the constructive interference signal for the receiver 620. The configuration algorithm determines the optimum bandwidth BWopt based on the modulation bandwidths BWch in the channels of the system 10 in order to minimize ISI degradation in the system 10. The R is the symbol rate for the input signal 24.

FIG. 22 is chart for the bandwidth configuration algorithm 631 for determining the reflection coefficients $R_1$ and $R_2$ for the front and rear surfaces $PR_1$ and $PR_2$ for the etalon filter 676 in the receiver 620. The configuration algorithm 631 determines and configures the reflection coefficients $R_1$ and $R_2$ based on the optimum bandwidth BWopt in the receiver 620 for the constructive interference signal and the channel spacing CH of the system 10 in order to minimize ISI degradation in the system 10. Equal coefficients $R_1$ and $R_2$ may be used for minimizing the loss of the etalon 676.

FIG. 23 is a chart of power transmission transfer functions versus frequency for the etalon 676 for examples of the system 10 having channel spacing CH of 50 gigahertz (GHz) and carrier frequencies CF's of 193.95, 194 and 194.05 terahertz (THz). The field reflection coefficient magnitudes r ($r=r_1$ and $r=r_2$) for the front and rear surfaces $PR_1$ and $PR_2$ of the etalon 676 are shown for the examples. The reflection coefficients $r_1$ and $r_2$ of 0.1, 0.25, 0.4 and 0.55 configure the stopband transmission bandwidths of the etalon 676 to etalon bandwidths BWetalon1, BWetalon2, BWetalon3 and BWetalon4, respectively. It can be seen that a larger reflection coefficient configures the etalon 676 to a wider stopband bandwidth.

FIG. 24 is a chart of power transmission transfer functions versus frequency for the constructive interference signal path in the receiver 620 for examples of the system 10 having channel spacing CH of 50 gigahertz (GHz) and carrier frequencies CF's of 193.95, 194 and 194.05 terahertz (THz). The field reflection coefficient magnitudes $r_1$ and $r_2$ for the front and rear surfaces $PR_1$ and $PR_2$ of the etalon 676 are shown for the examples. The reflection coefficients r ($r=r_1$ and $r=r_2$) of 0.1, 0.25, 0.4 and 0.55 for the front and rear surfaces $PR_1$ and $PR_2$ of the etalon 676 configure the bandwidth of the elation 676 so that the transmission transfer function of the constructive interference signal are optimum bandwidths BWopt1, BWopt2, BWopt3 and BWopt4, respectively. It can be seen that a larger reflection coefficient configures the constructive interference signal path of the receiver 620 to a wider optimum bandwidth BWopt.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results.

Thus, particular embodiments have been described. Other embodiments are within the scope of the following claims.

What is claimed is:

1. An optical receiver configured to estimate data carried by a modulated optical input signal through a communication system having carrier frequencies separated by a channel spacing, the optical receiver comprising:
   a delay line interferometer (DLI) modified to include two etalons that form respective two reflectors of the DLI, each of the etalons configured to have a free spectral range about equal to said channel spacing such that the modified DLI is configured to issue a differentially decoded constructive interference signal having periodic transmission passbands approximately centered at said carrier frequencies, such that the periodic transmission passbands are broader than half said channel spacing; and a data estimator configured to use said issued differentially decoded constructive interference signal to estimate said data.

2. The receiver of claim 1, wherein:
each of the etalons is further configured to have a transmission stopband bandwidth selected according to a modulation bandwidth of said input signal.

3. An optical receiver configured to estimate data carried by a modulated optical input signal through a communication system having carrier frequencies separated by a channel spacing, the optical receiver comprising:
a delay line interferometer (DLI) modified to include an etalon that forms one of two reflectors of the DLI, the etalon configured to have a free spectral range about equal to said channel spacing such that the modified DLI is configured to receive said input signal and issue a differentially decoded constructive interference signal having a transmission passband approximately centered at a carrier frequency from among said carrier frequencies of said input signal, such that the transmission passband is broader than half said channel spacing; and
a data estimator configured to use said issued differentially decoded constructive interference signal to estimate said data.

4. The receiver of claim 3, wherein the etalon has a stopband transmission bandwidth configured according to a modulation bandwidth of said input signal.

5. The receiver of claim 3, wherein the etalon has a stopband transmission bandwidth configured to minimize intersymbol interference for said input signal.

6. The receiver of claim 3, wherein said etalon includes a surface having a reflection coefficient configured according to a modulation bandwidth of said input signal.

7. The receiver of claim 3, wherein said etalon includes a surface having a reflection coefficient configured to minimize intersymbol interference for said input signal.

8. The receiver of claim 3, wherein said etalon's thickness is configured to provide an etalon free spectral range about equal to said channel spacing.

9. The receiver of claim 8, wherein said etalon's thickness is further configured to align a phase of said etalon free spectral range to center a transmission stopband relative to said carrier frequency.

10. The receiver of claim 9, wherein said etalon includes
an element traversed by said constructive interference signal and
a mechanism to adjust an effective optical length of said element based on feedback from a measurement of signal quality to fine tune said phase.

11. The receiver of claim 3, wherein:
the modified DLI includes first and second signal paths and a differential delay in the first signal path with respect to the second signal path about equal to an inverse of said channel spacing for differentially decoding said input signal to provide said constructive interference signal; and
the modified DLI includes an FSR phase element to align said transmission passband relative to said carrier frequency by fine tuning said differential delay based on feedback derived at least in part from said issued differentially decoded constructive interference signal.

12. The receiver of claim 3, further comprising:
an attenuator to attenuate a differentially decoded destructive interference signal by an attenuation based on one or both of a modulation bandwidth of said input signal and feedback from a measurement of signal quality; and
wherein:
the modified DLI is further configured to issue said destructive interference signal; and
the data estimator is configured to estimate said data further based on said attenuated destructive interference signal.

13. A method for estimating data carried by a modulated optical input signal through a communication system having carrier frequencies separated by a channel spacing, the method comprising:
differentially decoding said input signal with a delay line interferometer (DLI) modified to include two etalons forming respective two reflectors of the DLI, each of the two etalons having a free spectral range about equal to said channel spacing, the modified DLI issuing a differentially decoded constructive interference signal having periodic transmission passbands approximately centered at said carrier frequencies, the periodic transmission passbands being broader than half said channel spacing; and
using said issued differentially decoded constructive interference signal for estimating said data.

14. The method of claim 13, wherein each of the two etalons has a stopband transmission bandwidth configured according to a modulation bandwidth of said input signal.

15. A method for estimating data carried by a modulated optical input signal through a communication system having carrier frequencies separated by a channel spacing, the method comprising:
differentially decoding said input signal with a delay line interferometer (DLI) modified to include an etalon forming one of two reflectors of the DLI, the etalon having a free spectral range about equal to said channel spacing, the modified DLI issuing a differentially decoded constructive interference signal having a transmission passband approximately centered at one of said carrier frequencies of said input signal, the transmission passband being broader than half said channel spacing; and
using said issued differentially decoded constructive interference signal for estimating said data.

16. The method of claim 15, wherein the etalon has a stopband transmission bandwidth configured according to a modulation bandwidth of said input signal.

17. The method of claim 15, wherein the etalon has a stopband transmission bandwidth configured to minimize intersymbol interference for said input signal.

18. The method of claim 15, wherein etalon has a surface reflection coefficient configured according to a modulation bandwidth of said input signal.

19. The method of claim 15, wherein etalon has a surface reflection coefficient configured to minimize intersymbol interference for said input signal.

20. The method of claim 15, wherein said etalon's thickness is configured for providing an etalon free spectral range about equal to said channel spacing.

21. The method of claim 20, wherein:
said thickness is further configured to align a phase of said etalon free spectral range to center a transmission stopband relative to said carrier frequency.

22. The method of claim 21, further comprising:
fine tuning said phase by adjusting an effective optical length of an element traversed by said constructive interference signal based on feedback from a measurement of signal quality.

23. The method of claim 15, wherein said differentially decoding said input signal with said modified DLI includes:
- splitting said input signal into a first and second signal paths and applying a differential delay about equal to an inverse of said channel spacing in the first signal path with respect to the second signal path for differentially decoding said input signal; and
- aligning said transmission passband to said carrier frequency by fine tuning said differential delay based on feedback at least in part derived from said issued differentially decoded constructive interference signal.

24. The method of claim 15, wherein:
- said differentially decoding said input signal with said modified DLI includes issuing a differentially decoded destructive interference signal; and
- said estimating said data further includes
  - attenuating said destructive interference signal with an attenuation based on one or both of a modulation bandwidth of said input signal and feedback from a measurement of signal quality; and
  - using said attenuated destructive interference signal with said issued differentially decoded constructive interference signal for estimating said data.

25. An optical receiver for receiving an optical transmission signal in optical communications, comprising:
- an etalon-based optical delay interferometer comprising:
  - an optical splitter to split the received optical transmission signal into a first optical signal and a second optical signal,
  - a first optical path to receive the first optical signal, the first optical path including an etalon that forms a reflector of the first optical path, the etalon configured to have a free spectral range about equal to a channel spacing of multiple carrier frequencies of optical transmission signals,
  - a second optical path to receive the second optical signal,
  - an optical coupler that combines the first and second optical paths to cause optical interference between the first and second optical path to produce an optically constructive interference signal and an optically destructive interference signal,
  - a constructive output port that receives the optically constructive interference signal,
  - a destructive output port that receives the optically destructive interference signal, and
  - a mechanism to control a relative phase delay between the first and second optical paths to make the optically constructive interference signal have a transmission passband at a carrier frequency of said optical transmission signal, said carrier frequency from among said multiple carrier frequencies of optical transmission signals;
- the etalon-based optical delay interferometer configured to issue said optically constructive and destructive interference signals such that said transmission passband of the optically constructive interference signal is broader than half of said channel spacing;
- a first optical detector to convert the optically constructive interference signal issued by the etalon-based optical delay interferometer into a first electrical detector output;
- a second optical detector to convert the optically destructive interference signal issued by the etalon-based optical delay interferometer into a second electrical detector output; and
- an electrical signal combiner in communication with the first and second optical detectors to receive the first and second electrical detector outputs and to produce a difference between the first and second electrical detector outputs as an electrical signal that carries data carried in the optical transmission signal.

* * * * *